United States Patent
Xu et al.

(10) Patent No.: US 10,380,881 B2
(45) Date of Patent: Aug. 13, 2019

(54) METHOD, APPARATUS, AND SYSTEMS FOR WIRELESS EVENT DETECTION AND MONITORING

(71) Applicant: ORIGIN WIRELESS, INC., Greenbelt, MD (US)

(72) Inventors: Qinyi Xu, Greenbelt, MD (US); Feng Zhang, Greenbelt, MD (US); Chen Chen, College Park, MD (US); Beibei Wang, Clarksville, MD (US); Zoltan Safar, Ellicott City, MD (US); Yi Han, Ellicott City, MD (US); Hung-Quoc Duc Lai, Parkville, MD (US); K. J. Ray Liu, Potomac, MD (US)

(73) Assignee: Origin Wireless, Inc., Greenbelt, MD (US)

( * ) Notice: Subject to any disclaimer, the term of this patent is extended or adjusted under 35 U.S.C. 154(b) by 0 days.

(21) Appl. No.: 16/060,710

(22) PCT Filed: Dec. 9, 2016

(86) PCT No.: PCT/US2016/066015
§ 371 (c)(1),
(2) Date: Jun. 8, 2018

(87) PCT Pub. No.: WO2017/100706
PCT Pub. Date: Jun. 15, 2017

(65) Prior Publication Data
US 2018/0365975 A1     Dec. 20, 2018

Related U.S. Application Data

(60) Provisional application No. 62/411,504, filed on Oct. 21, 2016, provisional application No. 62/383,235, (Continued)

(51) Int. Cl.
*G08B 13/18* (2006.01)
*G08B 29/18* (2006.01)
(Continued)

(52) U.S. Cl.
CPC .......... *G08B 29/185* (2013.01); *G01S 13/003* (2013.01); *G01S 13/04* (2013.01);
(Continued)

(58) Field of Classification Search
CPC .... G08B 29/185; G08B 13/181; G08B 13/08; G08B 13/187; G01S 13/56; G01S 13/536;
(Continued)

(56) References Cited

U.S. PATENT DOCUMENTS

| 2,933,702 A | 4/1960 | Bogert |
| 3,767,855 A | 10/1973 | Ueno et al. |

(Continued)

FOREIGN PATENT DOCUMENTS

| EP | 2 571 214 A1 | 11/2012 |
| WO | WO 2007/031088 | 3/2007 |

(Continued)

OTHER PUBLICATIONS

Abbasi-Moghadam, D. et al., "A SIMO one-bit time reversal for UWB communication systems", EURASIP J. Wireless Comm. and Networking, 2012:113, 2012.

(Continued)

*Primary Examiner* — Tanmay K Shah
(74) *Attorney, Agent, or Firm* — Fish & Richardson P.C.

(57) ABSTRACT

An apparatus for detecting events includes a processor and a storage device storing instructions that when executed by the processor cause the processor to train a classifier for classifying channel state information (CSI) and detecting an event based on the classification of the CSI obtained during a monitoring phase. The training of the classifier includes: for each of the known events to be detected, during a time period in which the known event occurs in a venue, obtain training CSI of a wireless multipath channel between a wireless transmitter and a wireless receiver in the venue, in which the training CSI is derived from one or more probing signals sent from the transmitter through the wireless multipath channel to the receiver, and train the classifier based on the known events and the training CSI associated with each of the events.

19 Claims, 57 Drawing Sheets

Related U.S. Application Data filed on Sep. 2, 2016, provisional application No. 62/316,850, filed on Apr. 1, 2016, provisional application No. 62/307,081, filed on Mar. 11, 2016, provisional application No. 62/265,155, filed on Dec. 9, 2015.

(51) Int. Cl.

| | | |
|---|---|---|
| *G01S 13/04* | (2006.01) | |
| *G08B 13/08* | (2006.01) | |
| *G08B 13/187* | (2006.01) | |
| *G01S 13/00* | (2006.01) | |
| *G01S 13/536* | (2006.01) | |
| *G01S 13/88* | (2006.01) | |
| *G01S 13/56* | (2006.01) | |
| *G08B 13/181* | (2006.01) | |
| *H04B 7/06* | (2006.01) | |
| *H04W 4/80* | (2018.01) | |
| *H04W 84/12* | (2009.01) | |

(52) U.S. Cl.
CPC ............ *G01S 13/536* (2013.01); *G01S 13/56* (2013.01); *G01S 13/88* (2013.01); *G08B 13/08* (2013.01); *G08B 13/181* (2013.01); *G08B 13/187* (2013.01); *H04B 7/0626* (2013.01); *H04W 4/80* (2018.02); *H04W 84/12* (2013.01)

(58) Field of Classification Search
CPC ........ G01S 13/003; G01S 13/88; G01S 13/04; H04B 7/0626; H04W 84/12; H04W 4/80
USPC ......................................................... 340/552
See application file for complete search history.

(56) References Cited

U.S. PATENT DOCUMENTS

| | | | |
|---|---|---|---|
| 5,092,336 | A | 3/1992 | Fink |
| 5,155,742 | A | 10/1992 | Ariyavisitakul et al. |
| 5,428,999 | A | 7/1995 | Fink |
| 5,926,768 | A | 7/1999 | Lewiner et al. |
| 6,301,291 | B1 | 10/2001 | Rouphael et al. |
| 6,490,469 | B2 | 12/2002 | Candy |
| 6,862,326 | B1 | 3/2005 | Eran et al. |
| 7,362,815 | B2 | 4/2008 | Lindskog et al. |
| 7,440,766 | B1 | 10/2008 | Tuovinen et al. |
| 7,460,605 | B2 | 12/2008 | Candy et al. |
| 7,463,690 | B2 | 12/2008 | Candy et al. |
| 7,587,291 | B1 | 9/2009 | Sarvazyan et al. |
| 7,768,876 | B2 | 8/2010 | Dahl et al. |
| 8,195,112 | B1 | 6/2012 | Zhang et al. |
| 8,346,197 | B2 | 1/2013 | Huy et al. |
| 8,411,765 | B2 | 4/2013 | Smith et al. |
| 8,451,181 | B2 | 5/2013 | Huy et al. |
| 8,457,217 | B2 | 6/2013 | Huy et al. |
| 8,498,658 | B2 | 7/2013 | Smith et al. |
| 8,593,998 | B2 | 11/2013 | Huy et al. |
| 8,743,976 | B2 | 6/2014 | Smith et al. |
| 8,792,396 | B2 | 7/2014 | Huy et al. |
| 8,831,164 | B2 | 9/2014 | Lu |
| 9,078,153 | B1 * | 7/2015 | Schelstraete ......... H04W 88/08 |
| 9,119,236 | B1 | 8/2015 | Martin |
| 9,226,304 | B2 | 12/2015 | Chen et al. |
| 9,313,020 | B2 | 4/2016 | Ma et al. |
| 9,402,245 | B2 | 7/2016 | Chen et al. |
| 9,407,306 | B2 | 8/2016 | Yang et al. |
| 9,559,874 | B2 | 1/2017 | Han et al. |
| 9,686,054 | B2 | 6/2017 | Yang et al. |
| 9,736,002 | B2 | 8/2017 | Yang et al. |
| 9,781,700 | B2 | 10/2017 | Chen et al. |
| 9,794,156 | B2 | 10/2017 | Ma et al. |
| 9,825,838 | B2 | 11/2017 | Ma et al. |
| 9,883,511 | B1 | 1/2018 | Yang et al. |
| 2003/0138053 | A1 | 7/2003 | Candy et al. |
| 2004/0156443 | A1 | 8/2004 | Dent |
| 2006/0036403 | A1 | 2/2006 | Wegerich et al. |
| 2006/0098746 | A1 | 5/2006 | Candy et al. |
| 2006/0115031 | A1 | 6/2006 | Lindskog et al. |
| 2010/0302977 | A1 | 12/2010 | Huy et al. |
| 2010/0309829 | A1 | 12/2010 | Huy et al. |
| 2012/0077468 | A1 * | 3/2012 | Fan .................... G07C 9/00309 455/414.1 |
| 2012/0155515 | A1 | 6/2012 | Smith et al. |
| 2012/0183037 | A1 | 7/2012 | Allpress et al. |
| 2012/0207234 | A1 | 8/2012 | De Rosny et al. |
| 2012/0257660 | A1 | 10/2012 | Smith et al. |
| 2012/0263056 | A1 | 10/2012 | Smith et al. |
| 2012/0328037 | A1 | 12/2012 | Hsu et al. |
| 2013/0201958 | A1 | 8/2013 | Huy et al. |
| 2013/0223503 | A1 | 8/2013 | Smith et al. |
| 2014/0022128 | A1 | 1/2014 | Smith |
| 2014/0126567 | A1 | 5/2014 | Husain et al. |
| 2014/0185596 | A1 | 7/2014 | Han et al. |
| 2014/0266669 | A1 * | 9/2014 | Fadell .................. G05B 19/042 340/501 |
| 2015/0049745 | A1 | 2/2015 | Han et al. |
| 2015/0049792 | A1 | 2/2015 | Han et al. |
| 2015/0163121 | A1 * | 6/2015 | Mahaffey ............ G06F 11/0766 707/687 |
| 2015/0256379 | A1 * | 9/2015 | Dhayni ............... H04L 27/2662 375/348 |
| 2016/0018508 | A1 | 1/2016 | Chen et al. |
| 2016/0205569 | A1 | 7/2016 | Han et al. |

FOREIGN PATENT DOCUMENTS

| | | |
|---|---|---|
| WO | WO 2011/029072 | 3/2011 |
| WO | WO 2011/029075 | 3/2011 |
| WO | WO 2012/151316 | 11/2012 |
| WO | WO 2013/126054 | 8/2013 |
| WO | WO 2016/011433 | 1/2016 |

OTHER PUBLICATIONS

Albert, D. G. et al., "Time Reversal processing for source location in an urban environment (L)", J. Acoust. Soc. Am., vol. 118(2):616-619, Aug. 2005.

Brysev, A. P. et al., "Wave phase conjugation in ultrasonic beams", Physics-Uspekhi, vol. 41(8):793-805, 1998.

Chang, Y.-H. et al., "Ultrawideband Transceiver Design Using Channel Phase Precoding", IEEE Trans. Sig. Proc., vol. 55(7):3807-3822, Jul. 2007.

Chen, Y. et al., "Time-reversal wideband communications," IEEE Signal Processing Letters, vol. 20(12):1219-1222, Dec. 2013.

Chen, Y. et al., "Time-Reversal Wireless Paradigm for Green Internet of Things: An Overview", IEEE Internet of Things Journal, vol. 1(1):81-98, Feb. 2014.

Daniels, R.C. et al., "Improving on Time-reversal with MISO Precoding," Proceedings of the Eighth International Symposium on Wireless Personal Communications Conference, Aalborg, Denmark, 5 pages, Sep. 18-22, 2005.

Daniels, R.C. et al., "MISO Precoding for Temporal and Spatial Focusing" in the Proceedings of the Eighth International Symposium on Wireless Personal Communications Conference, Aalborg, Denmark, 6 pages, Sep. 18-22, 2005.

De Rosny, J. et al., "Theory of Electromagnetic Time-Reversal Mirrors", IEEE Trans. Antennas Propag., vol. 58(10):3139-3149, Oct. 2010.

Derode, A. et al., "Ultrasonic pulse compression with one-bit time reversal through multiple scattering", J. Appl. Phys., vol. 85(9):6343-6352, May 1999.

Derode, A. et al., "Taking Advantage of Multiple Scattering to Communicate with Time-Reversal Antennas", Phys. Rev. Lett., vol. 90(1): 014301-1-4, Jan. 2003.

Derode, A. et al., "Robust Acoustic Time Reversal and High-Order Multiple Scattering", Phys. Rev. Lett., vol. 75(23):4206-4210, Dec. 1995.

(56) References Cited

OTHER PUBLICATIONS

Dorme, C. et al., "Focusing in transmit-receive mode through inhomogeneous media: The time reversal matched filter approach", J. Acoust. Soc. Am., vol. 98(2):1155-1162, Pt. 1, Aug. 1995.
Edelmann, G.F. et al., "An Initial Demonstration of Underwater Acoustic Communication Using Time Reversal", IEEE Journal of Oceanic Engineering, vol. 27(3):602-609, Jul. 2002.
Emami, M. et al., "Matched Filtering with Rate Back-off for Low Complexity Communications in Very Large Delay Spread Channels," 38th Asilomar Conference on Signals, Systems and Computers, pp. 218-222, 2004.
Emami, S.M. et al., "Predicted Time Reversal Performance in Wireless Communications using Channel Measurements", IEEE COMLET, 2002.
Fink, M. et al., "Acoustic Time-Reversal Mirrors", Inverse Problems, vol. 17:R1-R38, 2001.
Fink, M., "Time Reversal of Ultrasonic Fields—Part I: Basic Principals", IEEE Trans. Ultrasonics, Ferroelectrics and Freq. Contr., vol. 39(5):555-566, Sep. 1992.
Fink, M., "Time-Reversal Mirrors", J. Phys. D: Appl. Phys., vol. 26:1333-1350, 1993.
Fink, M., "Time-Reversed Acoustics", Scientific American, pp. 91-97, Nov. 1999.
Fink, M. et al., "Self focusing in inhomogeneous media with time reversal acoustic mirrors," IEEE Ultrasonics Symposium, vol. 1:681-686, 1989.
Fontana, R.J. et al., "Ultra-Wideband Precision Asset Location System", Proc. of the IEEE Conf. on UWB Sys. and Tech., pp. 147-150, 2002.
Guo, N. et al., "Reduced-Complexity UWB Time-Reversal Techniques and Experimental Results", IEEE Trans. on Wireless Comm., vol. 6(12):4221-4226, Dec. 2007.
Han, F. et al., "A multiuser TRDMA uplink system with 2D parallel interference cancellation," IEEE Transactions on Communications, vol. 62(3):1011-1022, Mar. 2014.
Han, F. et al., "An Interference Cancellation Scheme for the Multiuser TRDMA Uplink System," Global Telecommunications Conference, pp. 3583-3588, 2013.
Han, F., "Energy Efficient Optimization in Green Wireless Networks", University of Maryland Ph. D. Dissertation, 2013.
Han, F., et al., "Time-reversal division multiple access in multi-path channels," Global Telecommunications Conference, pp. 1-5, Dec. 2011.
Han, F. et al., "Time-reversal division multiple access over multi-path channels," IEEE Transactions on Communications, vol. 60(7):1953-1965, Jul. 2012.
Han, Y. et al., "Time-Reversal with Limited Signature Precision: Tradeoff Between Complexity and Performance", Proc. IEEE Global Conference on Signal and Information Processing (GlobalSIP), Atlanta, Dec. 2014.
Henty, B.E. and D.D. Stancil, "Multipath-Enabled Super-Resolution for RF and Microwave Communication using Phase-Conjugate Arrays", Phys. Rev. Lett., vol. 93, 243904, Dec. 2004.
Jin, Y. et al., "Time-Reversal Detection Using Antenna Arrays", IEEE Trans. Signal Processing, vol. 57(4):1396-1414, Apr. 2009.
Jin, Y. et al., "Adaptive time reversal beamforming in dense multipath communication networks," 2008 42nd Asilomar Conference on Signals, Systems and Computers, pp. 2027-2031, Oct. 2008.
Khalegi, A. et al., "Demonstration of Time-Reversal in Indoor Ultra-Wideband Communication: Time Domain Measurement", IEEE Proc. of ISWCS, pp. 465-468, 2007.
Kuperman, W.A. et al., "Phase conjugation in the ocean: Experimental demonstration of an acoustic time-reversal mirror", J. Acoust. Soc. Am., vol. 103(1), pp. 25-40, Jan. 1998.
Kyritsi, P. et al., "One-bit Time Reversal for WLAN Applications", IEEE 16th Intern. Symp. on Personal, Indoor and Mobile Radio Comm., pp. 532-536, 2005.
Kyritsi, P. et al., "Time reversal and zero-forcing equalization for fixed wireless access channels," 39th Asilomar Conference on Signals, Systems and Computers, pp. 1297-1301, 2005.
Kyritsi, P. et al., "Time reversal techniques for wireless communications," IEEE Vehicular Technology Conference, vol. 1:47-51, 2004.
Lemoult, F. et al., "Manipulating Spatiotemporal Degrees of Freedom in Waves of Random Media", Phys. Rev. Lett., vol. 103, 173902, Oct. 2009.
Lemoult, F. et al., "Resonant Metalenses for Breaking the Diffraction Barrier", Phys. Rev. Lett., vol. 104, 203901, May 2010.
Lerosey, G. et al., "Time Reversal of Electromagnetic Waves and Telecommunication", Radio Science, vol. 40, RS6S12, 2005.
Lerosey, G. et al., "Time Reversal of Electromagnetic Waves", Phys. Rev. Lett., vol. 92(19), 193904, May 2004.
Lerosey, G. et al., "Time Reversal of Wideband Microwaves", Appl. Phys. Lett., vol. 88, 154101, Apr. 2006.
Lerosey, G. et al., "Focusing beyond the diffraction limit with far-field time reversal", Science, vol. 315:1120-1122, Feb. 2007.
Lienard, M. et al., "Focusing gain model of time-reversed signals in dense multipath channels," IEEE Antennas and Wireless Propagation Letters, vol. 11:1064-1067, 2012.
Ma, H. et al., "Interference-Mitigating Broadband Secondary User Downlink System: A Time-Reversal Solution", Global Telecommunications Conference, pp. 884-889, 2013.
Montaldo, G. et al., "Telecommunication in a disordered environment with iterative time reversal", Waves Random Media, vol. 14:287-302, 2004.
Moura, J.M.F. and Y. Jin, "Detection by Time Reversal: Single Antenna", IEEE Trans. on Signal Process., vol. 55(1):187-201, Jan. 2007.
Moura, J.M.F. and Y. Jin, "Time Reversal Imaging by Adaptive Interference Canceling", IEEE Trans. on Signal Process., vol. 56(1):233-247, Jan. 2008.
Naqvi, I.H., et al., "Performance Enhancement of Multiuser Time Reversal UWB Communication System", Proc. of IEEE ISWCS, pp. 567-571, 2007.
Naqvi, I.H. et al., "Experimental validation of time reversal ultra wide-band communication system for high data rates", IET Microw. Antennas Propag., vol. 4(Iss. 5):643-650, 2010.
Naqvi, I.H. et al., "Effects of Time Variant Channel on a Time Reversal UWB System", Global Telecommunications Conference, 2009.
Nguyen, H. T., "On the performance of one bit time reversal for multi-user wireless communications", IEEE Proc. of ISWCS, pp. 672-676, 2007.
Nguyen, H. et al., "Antenna Selection for Time Reversal MIMO UWB Systems", IEEE Vehicle Technology Conference, pp. 1-5, 2009.
Nguyen, H. et al. "On the MSI Mitigation for MIMO UWB Time Reversal Systems", Proc. of IEEE International Conference on Ultra-Wideband, pp. 295-299, 2009.
Nguyen, H. et al., "Preequalizer Design for Spatial Multiplexing SIMO-UWB TR Systems", IEEE Trans. on Vehicular Tech., vol. 59(8):3798-3805, Oct. 2010.
Nguyen, H.T., "Partial one bit time reversal for UWB impulse radio multi-user communications", IEEE Proc. of ICCE, 2008.
Nguyen, H.T., Kovacs, I.Z., Eggers, P.C.F., "A time reversal transmission approach for multiuser UWB communications", IEEE Trans. Antennas and Propagation, vol. 54(11):3216-3224, Nov. 2006.
Nguyen, T.K., H. Nguyen, F. Zheng and T. Kaiser, "Spatial Correlation in SM-MIMO-UWB Systems Using a Pre-Equalizer and Pre-Rake Filter", Proc. of IEEE International Conference on Ultra-Wideband, pp. 1-4, 2010.
Nguyen, T.K., H. Nguyen, F. Zheng, and T. Kaiser, "Spatial Correlation in the Broadcast MU-MIMO UWB System Using a Pre-Equalizer and Time Reversal Pre-Filter", Proc. of IEEE ICPCS, 2010.
Oestges, C., A.D. Kim, G. Papanicolaou, and A.J. Paulraj, "Characterization of Space-Time Focusing in Time Reversed Random Fields", IEEE Trans. Antennas and Propag., pp. 1-9, 2005.

(56) References Cited

OTHER PUBLICATIONS

Parvulescu, A. and Clay, C. S., "Reproducibility of Signal Transmissions in the Ocean", The Radio and Electronic Engineer, pp. 223-228, Apr. 1965.
Phan-Huy, D. T., S.B. Halima, M. Helard, "Frequency Division Duplex Time Reversal", Global Telecommunications Conference, (2011).
Pitarokoilis, A., Mohammed, S. K., Larsson, E.G., "Uplink performance of time-reversal MRC in massive MIMO systems subject to phase noise", IEEE Trans. Wireless Communications, pp. 711-723, Sep. 2014.
Porcino, D., "Ultra-Wideband Radio Technology: Potential and Challenges Ahead", IEEE Communications Mag., pp. 66-74, Jul. 2003.
Prada, C., F. Wu, and M. Fink, "The iterative time reversal mirror: A solution to self-focusing in the pulse echo mode," J. Acoustic Society of America, vol. 90, pp. 1119-1129, 1991.
Price, R., "A Communication Technique for Multipath Channels", Proceeding of the IRE, pp. 555-570, 1958.
Qiu, R. C. et al., "Time reversal with miso for ultra-wideband communications: Experimental results," IEEE Antenna and Wireless Propagation Letters, vol. 5:269-273 (2006).
Rode, J. P., M.J. Hsu, D. Smith and A. Hussain, "Collaborative Beamfocusing Radio (COBRA)", Proc. of SPIE, vol. 8753, pp. 87530J-1-87530J-11, 2013.
Rouseff, D., D.R. Jackson, W.L.J. Fox, C.D. Jones, J.A. Ritcey, and D.R. Dowling, "Underwater Acoustic Communication by Passive-Phase Conjugation: Theory and Experimental Results", IEEE J. Oceanic Eng., vol. 26, No. 4, pp. 821-831, Oct. 2001.
Saghir, H., M. Heddebaut, F. Elbahhar, A. Rivenq, J.M. Rouvaen, "Time-Reversal UWB Wireless Communication-Based Train Control in Tunnel", J. of Comm., vol. 4, No. 4, pp. 248-256, May 2009.
Song, H. C., W.A. Kuperman, W.S. Hodgkiss, T. Akal, and C. Ferla, "Iterative time reversal on the ocean", J. Acoust. Soc. Am, vol. 105, No. 6, pp. 3176-3184, Jun. 1999.
Song, H. C., W.S. Hodgkiss, W.A. Kuperman, T. Akal, and M. Stevenson, "Multiuser Communications Using Passive Time Reversal", IEEE J. Oceanic Eng., vol. 32, No. 4, pp. 915-926, Oct. 2007.
Strohmer, T., M. Emami, J. Hansen, G. Papanicolaou and A.J. Paulraj, "Application of Time-Reversal with MMSE Equalizer to UWB Communications", Global Telecommunications Conference, pp. 3123-3127, (2004).
Viteri-Mera, C. A., Teixeira, F. L., "Interference-Nulling Time-Reversal Beamforming for mm-Wave Massive MIMO in Multi-User Frequency-Selective Indoor Channels", arXiv:1506.05143 [cs.IT], Jun. 18, 2015.
Wang, B. et al., "Green wireless communications: A time-reversal paradigm," IEEE Journal of Selected Areas in Communications, vol. 29:1698-1710 (2011).
Wu, F., J.L. Thomas, and M. Fink, "Time Reversal of Ultrasonic Fields—Part II: Experimental Results", IEEE Trans. Ultrasonics, Ferroelectrics and Freq. Contr., vol. 39(5):567-578, Sep. 1992.
Wu, Z.H., Han, Y., Chen, Y., and Liu, K.J.R., "A Time-Reversal Paradigm for Indoor Positioning System", IEEE Transactions on Vehicular Technology, vol. 64(4):1331-1339, special section on Indoor localization, tracking, and mapping with heterogeneous technologies, Apr. 2015.
Xiao, S. Q., J. Chen, B.Z. Wang, and X.F. Liu, "A Numerical Study on Time-Reversal Electromagnetic Wave for Indoor Ultra-Wideband Signal Transmission", Progress in Electromagnetics Research, PIER 77, pp. 329-342, 2007.
Yang, Y. H., "Waveform Design and Network Selection in Wideband Small Cell Networks", University of Maryland Ph. D. Thesis, 2013.
Yang, Y. H., B. Wang and K.J.R. Liu, "Waveform Design for Sum Rate Optimization in Time-Reversal Multiuser Downlink Systems", Global Telecommunications Conference, (2011).
Yang, Y.-H., Wang, B., Lin, W.S., Liu, K.J.R., "Near-Optimal Waveform Design for Sum Rate Optimization in Time-Reversal Multiuser Downlink Systems", IEEE Trans Wireless Communications, vol. 12(1):346-357, Jan. 2013.
Zhou, X., P.C.F. Eggers, P. Kyritsi, J.B. Andersen, G.F. Pedersen and J.O. Nilsen, "Spatial Focusing and Interference Reduction using MISO Time Reversal in an Indoor Application", IEEE Proc. of SSP, pp. 307-311, 2007.
Notification of Transmittal of the International Search Report and the Written Opinion of the International Searching Authority, or the Declaration for corresponding International Application No. PCT/US16/66015, dated Apr. 13, 2017, 19 pages.

\* cited by examiner

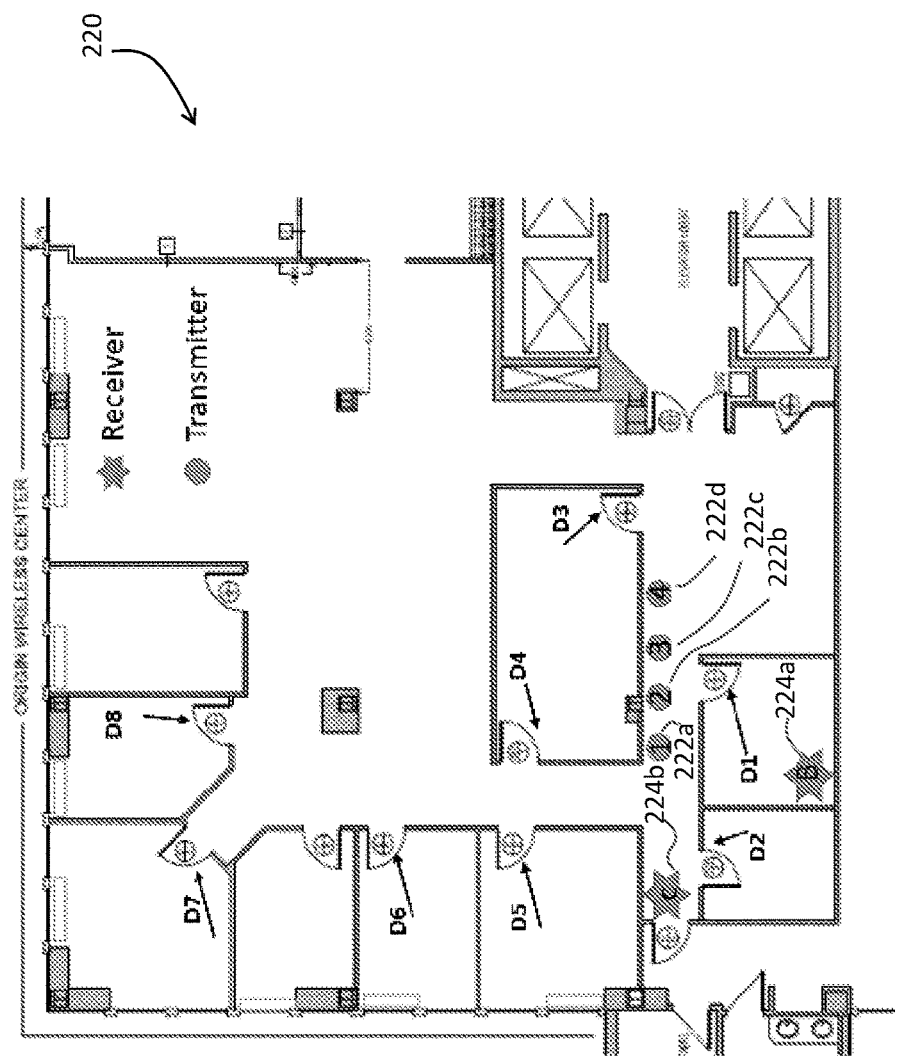
FIG. 2A: Experimental setting.

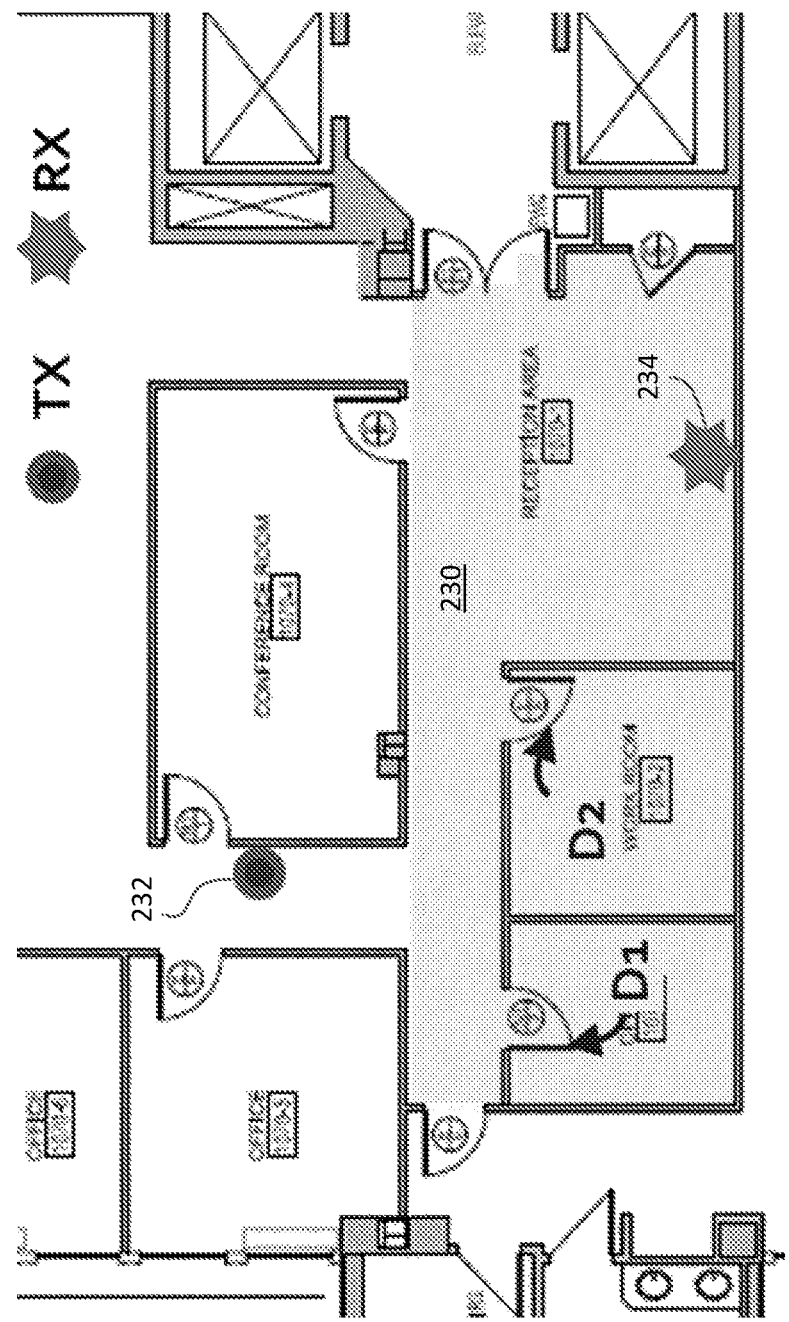
FIG. 2B: Experiment setting for study on human movements.

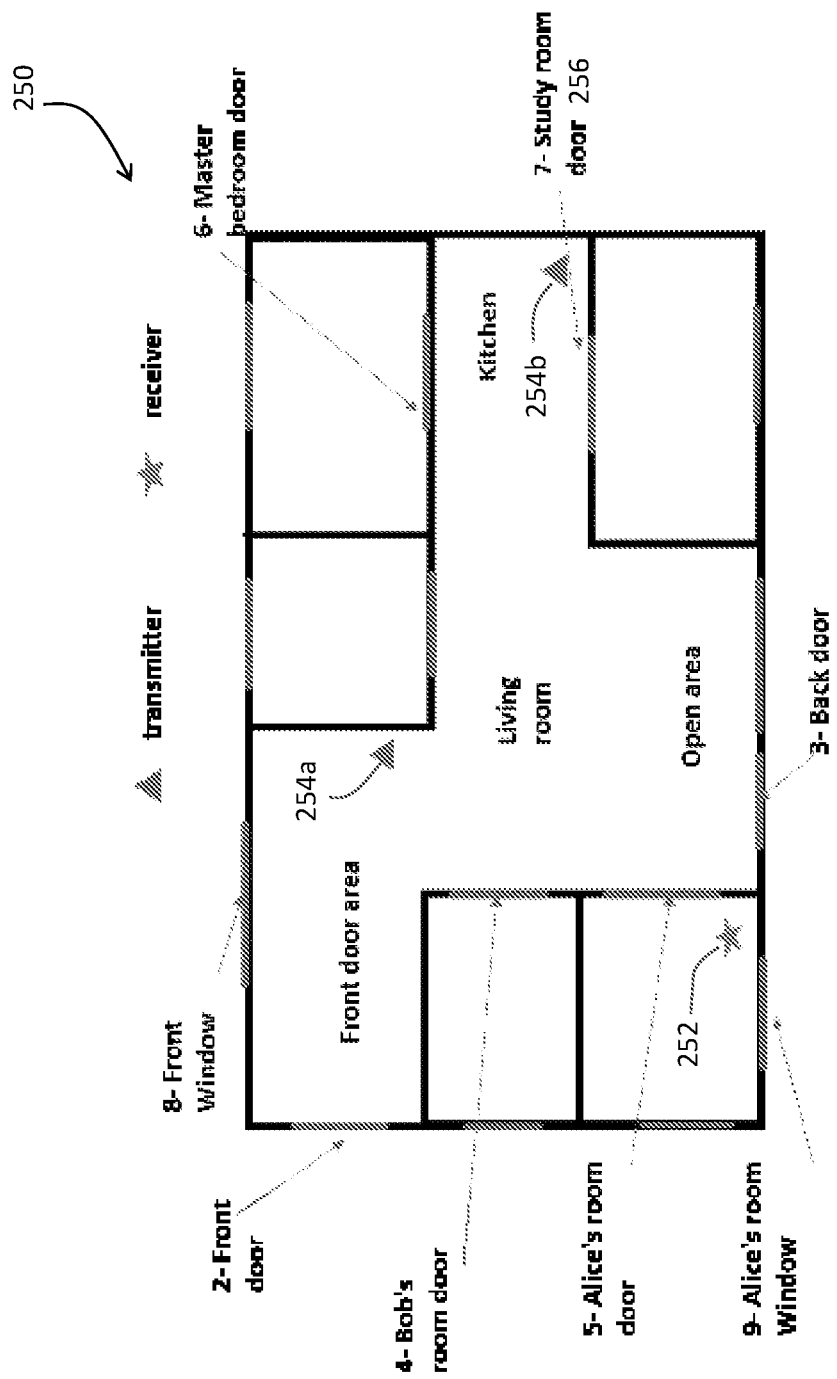
Figure 3: Floorplan for the testing environment

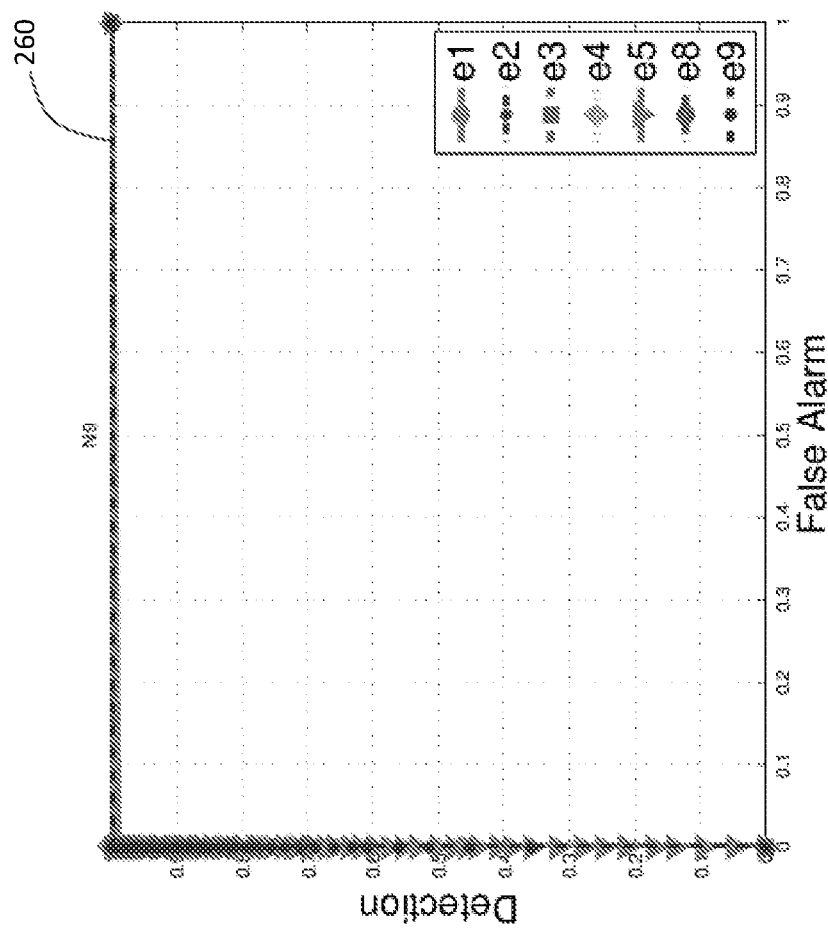
Figure 4A: ROC for target events for TX-RX configuration I.

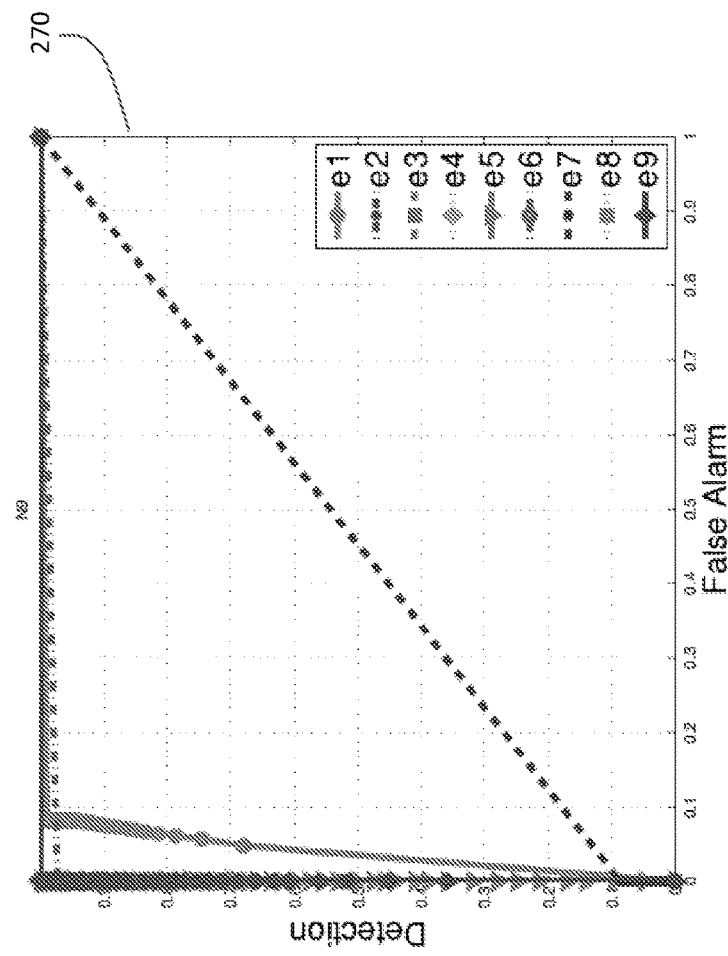
Figure 4B: ROC for all indoor events for TX-RX configuration I.

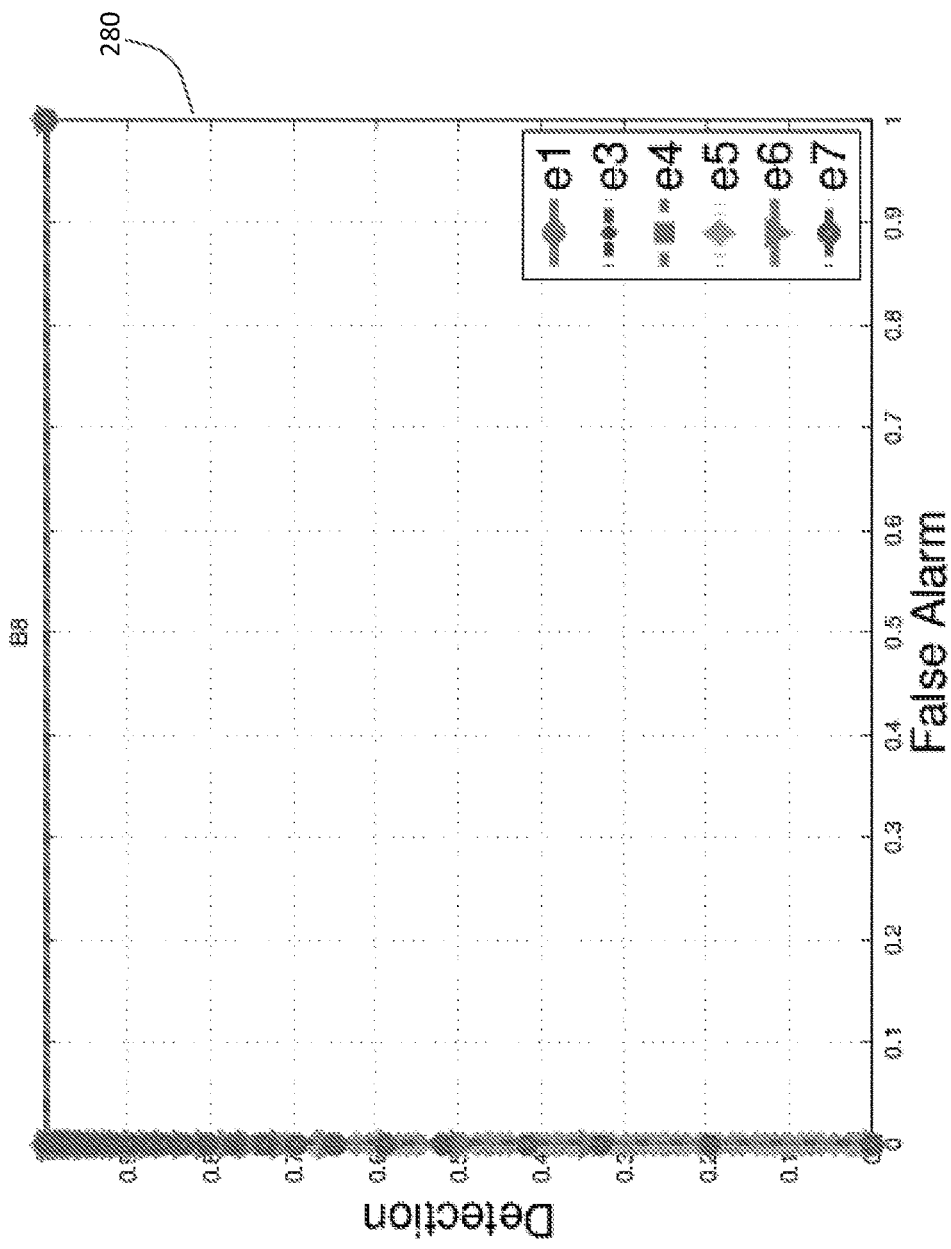
Figure 5A: ROC for target events for TX-RX configuration II.

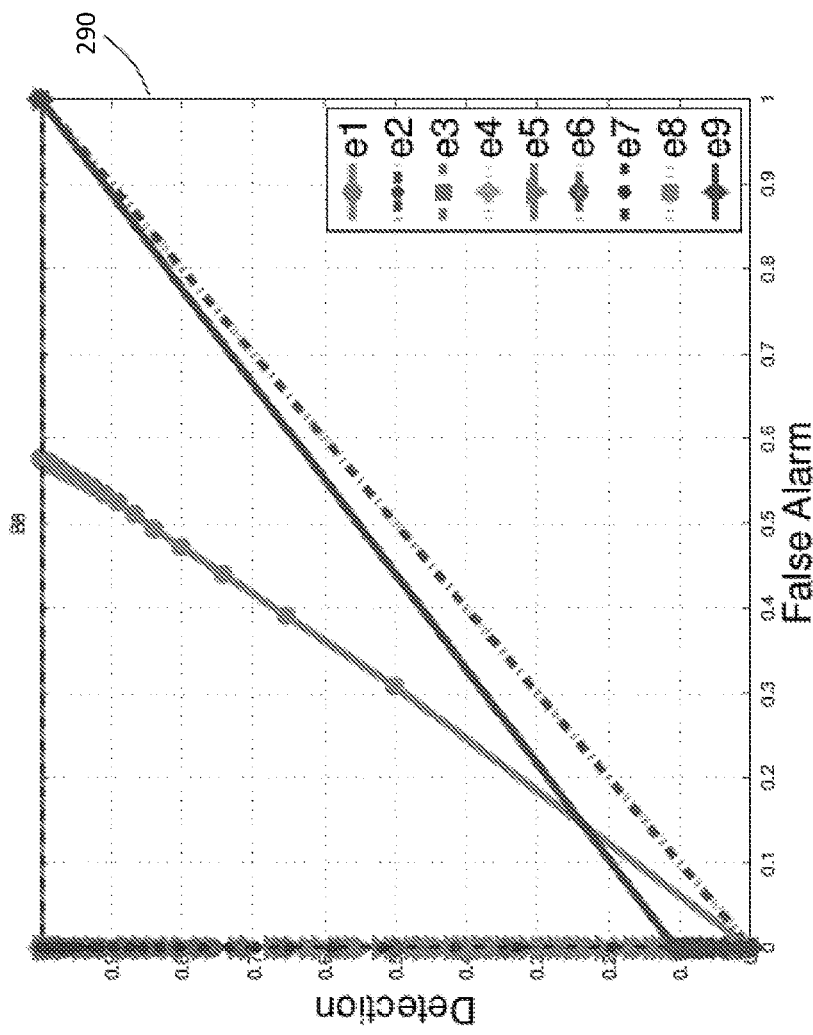
Figure 5B: ROC for all indoor events for TX-RX configuration II.

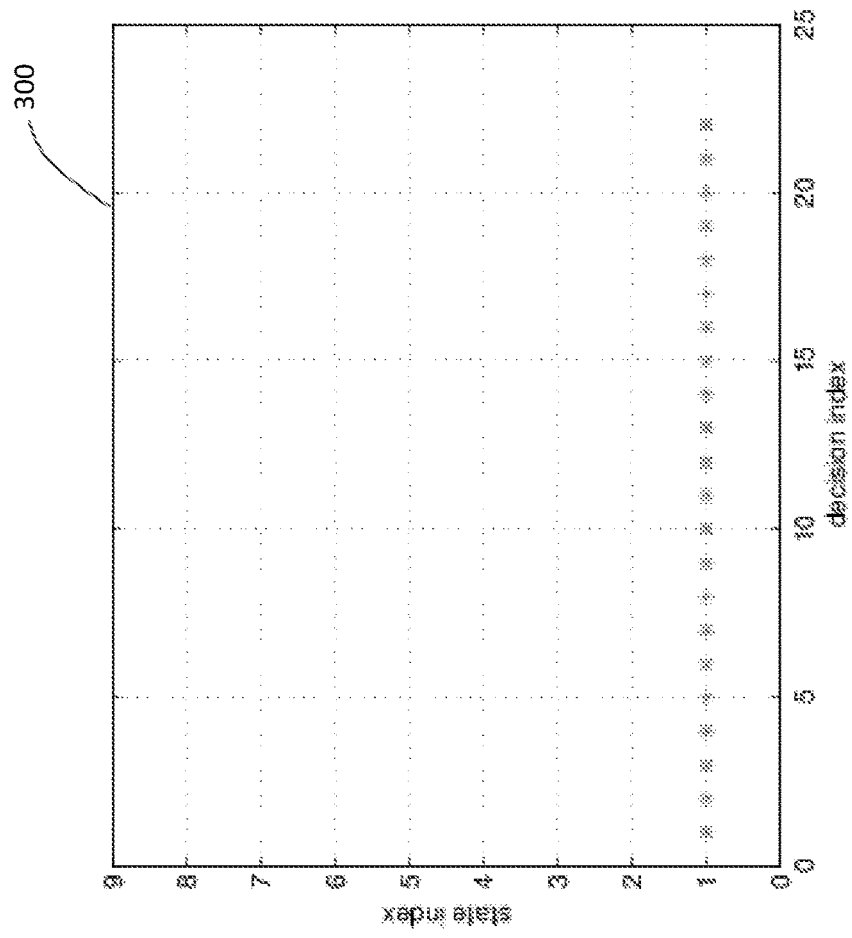
Figure 6A: e1: all doors are closed.

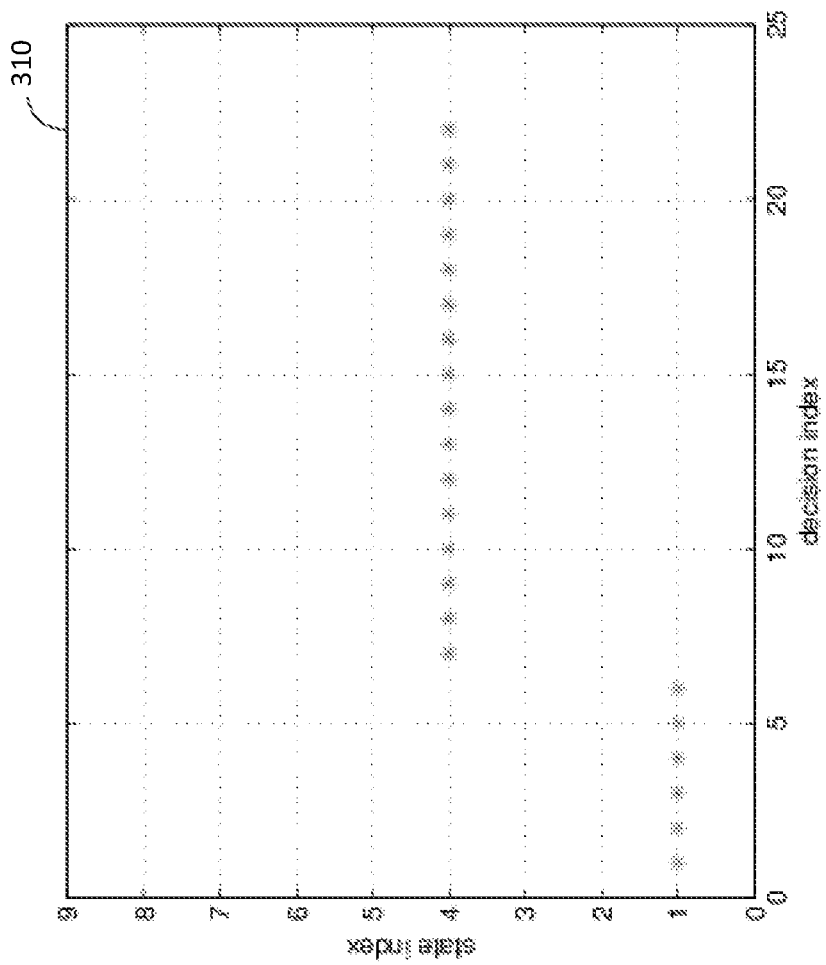
Figure 6B: e4: open the room door

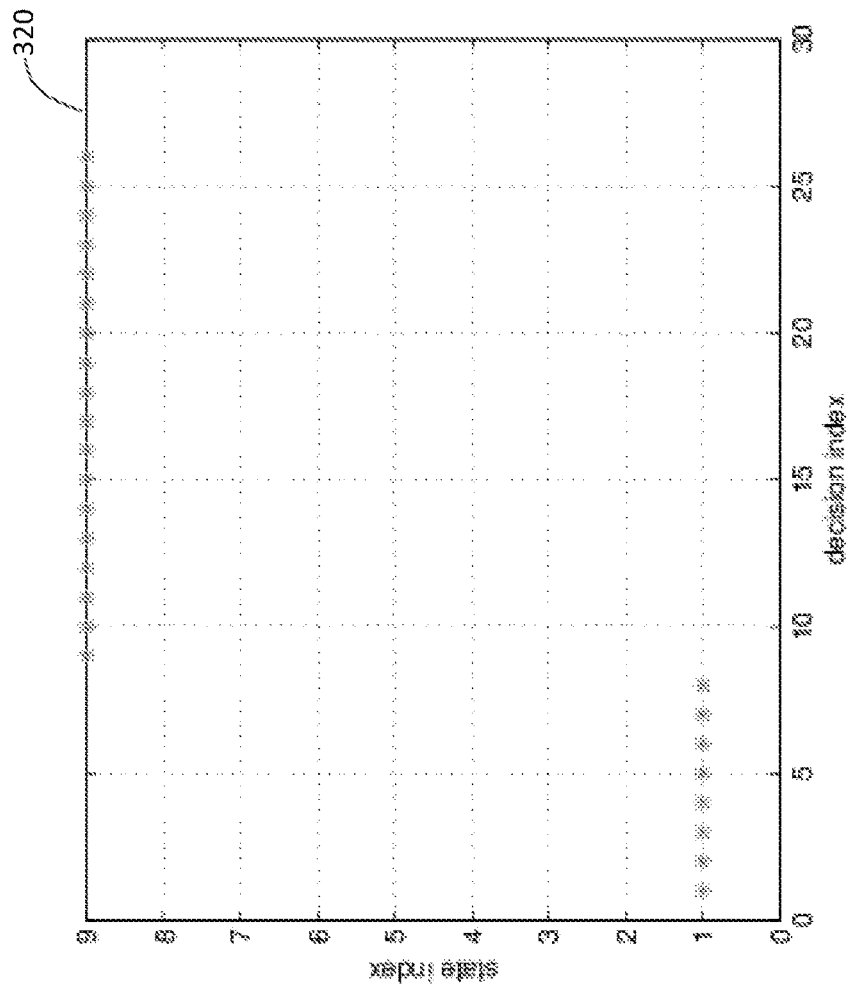
Figure 6C: e9: open the window.

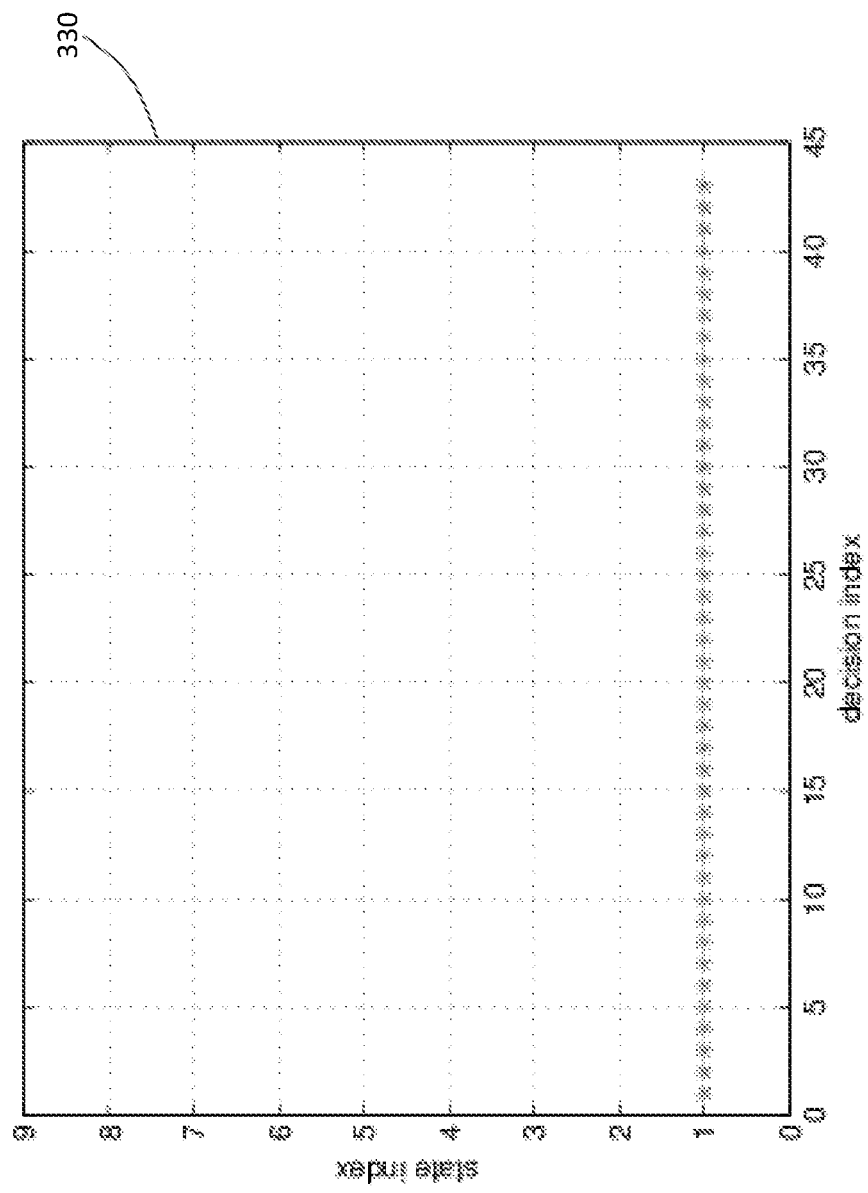
Figure 7A: Walking outside the front door

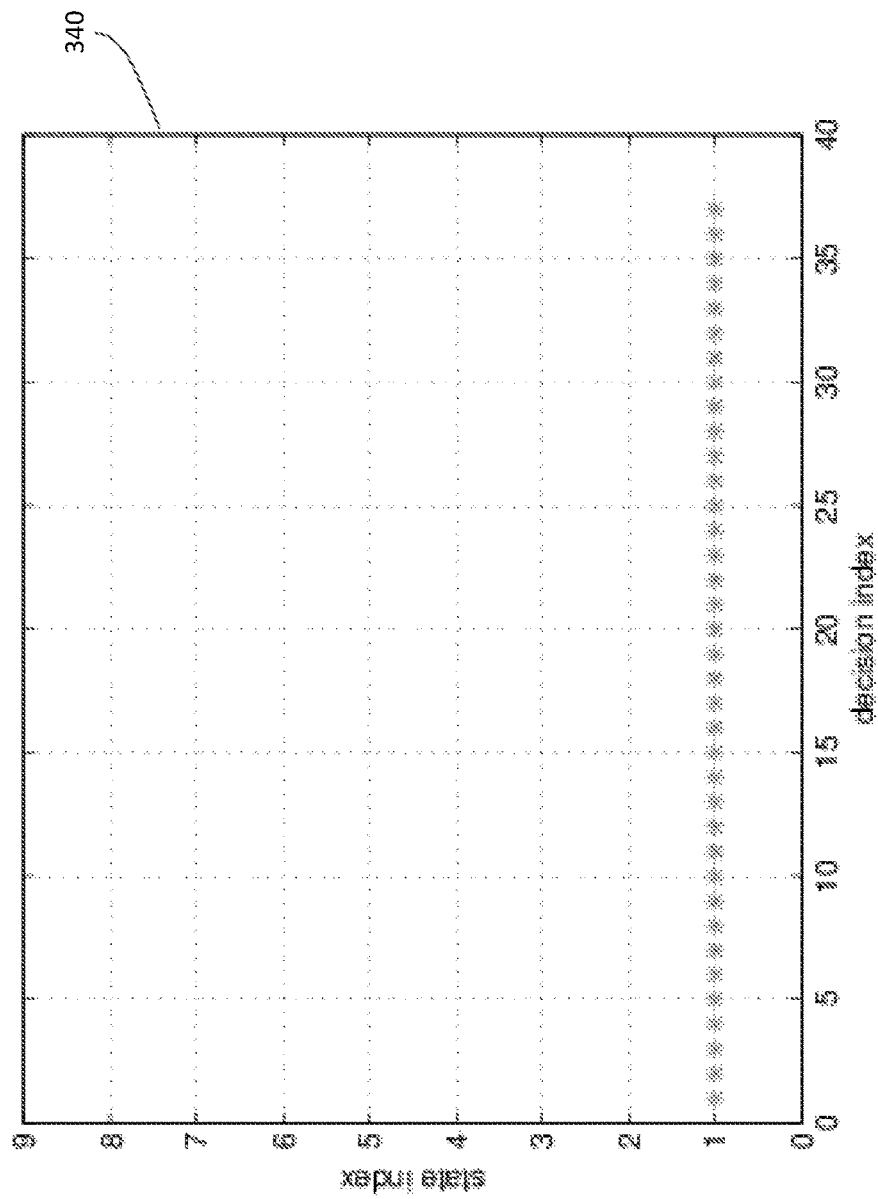
Figure 7B: Walking outside the back door.

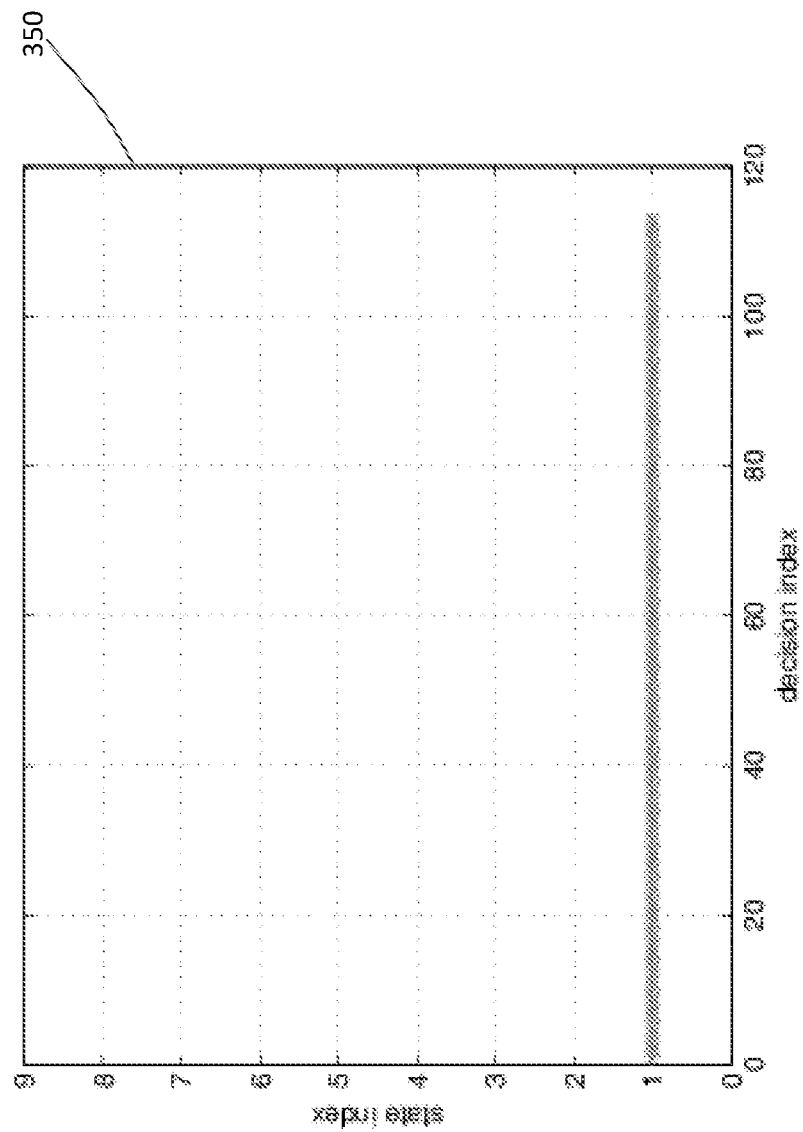
Figure 7C: Driving outside the house.

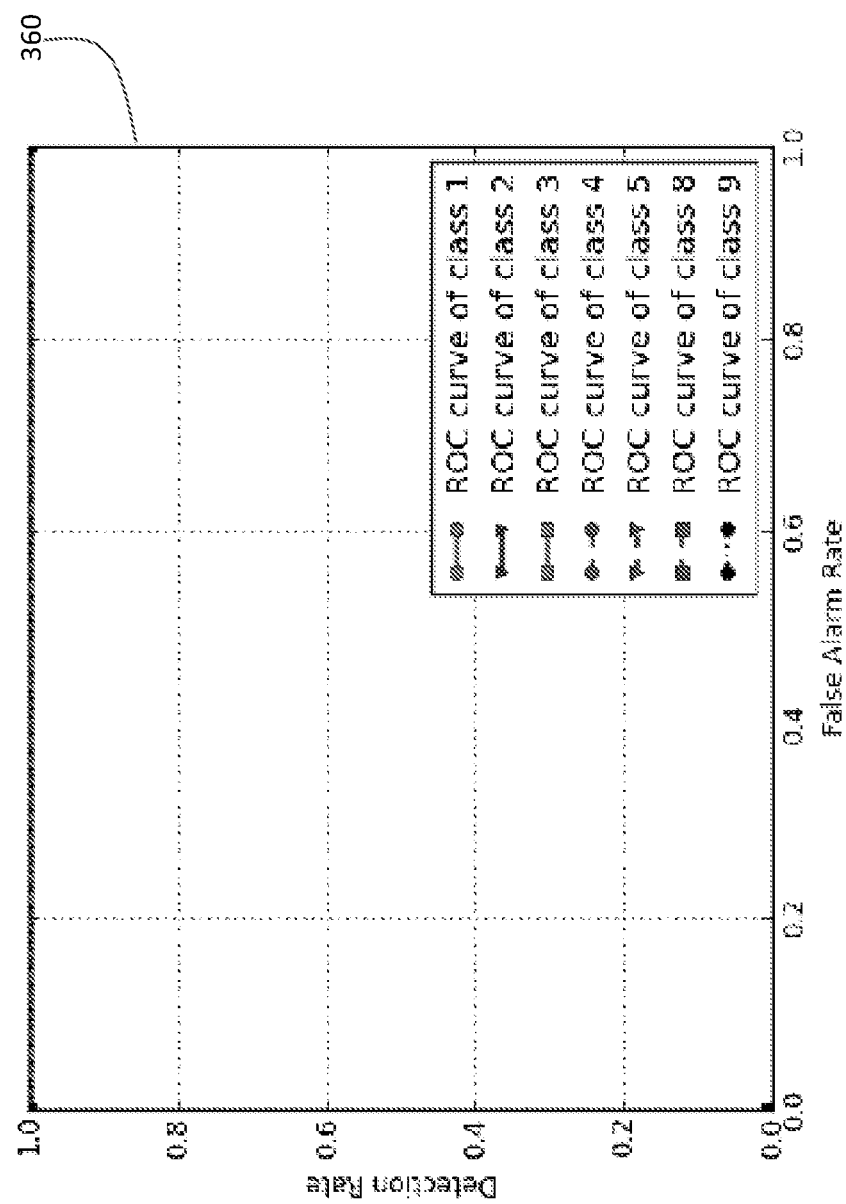
Figure 8A: ROC for target events.

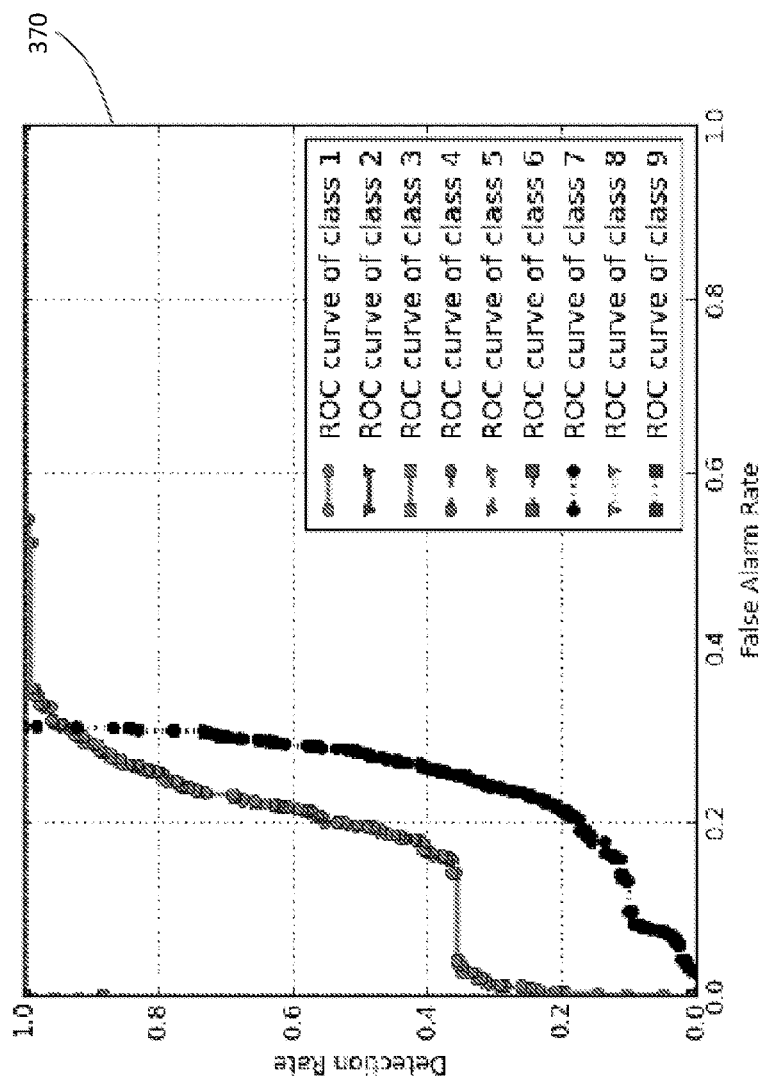
Figure 8B: ROC for all indoor events.

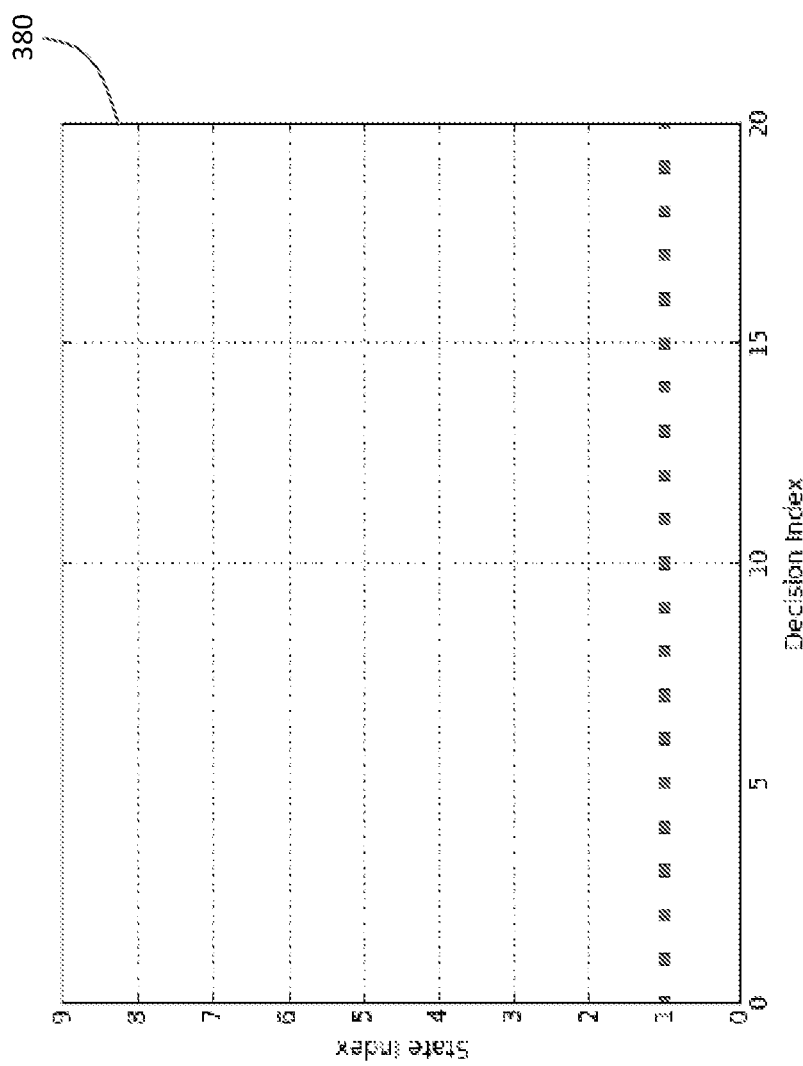
Figure 9A: e1: all doors are closed.

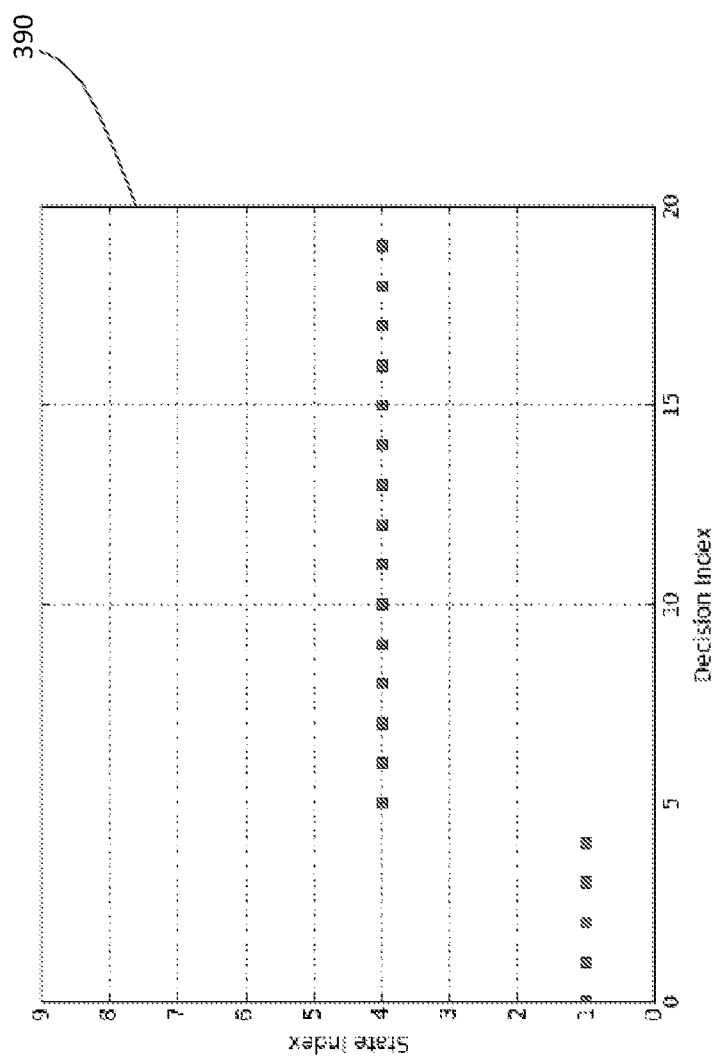
Figure 9B: e4: open the room door.

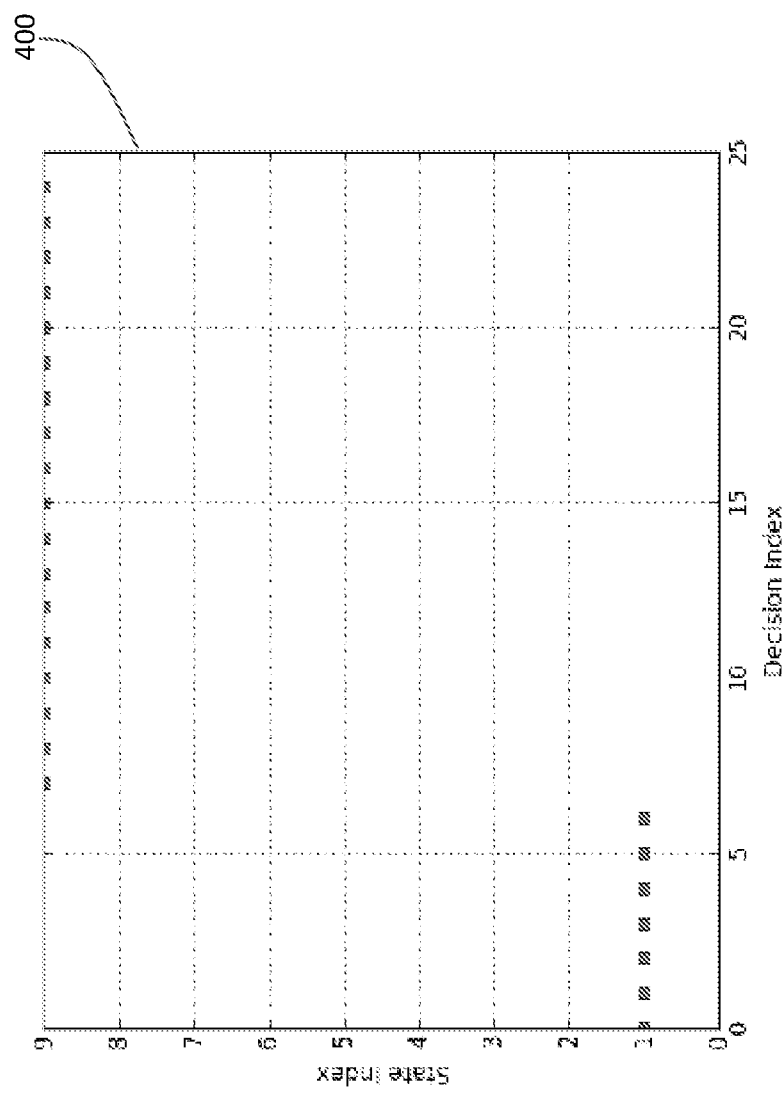
Figure 9C: e9: open the window.

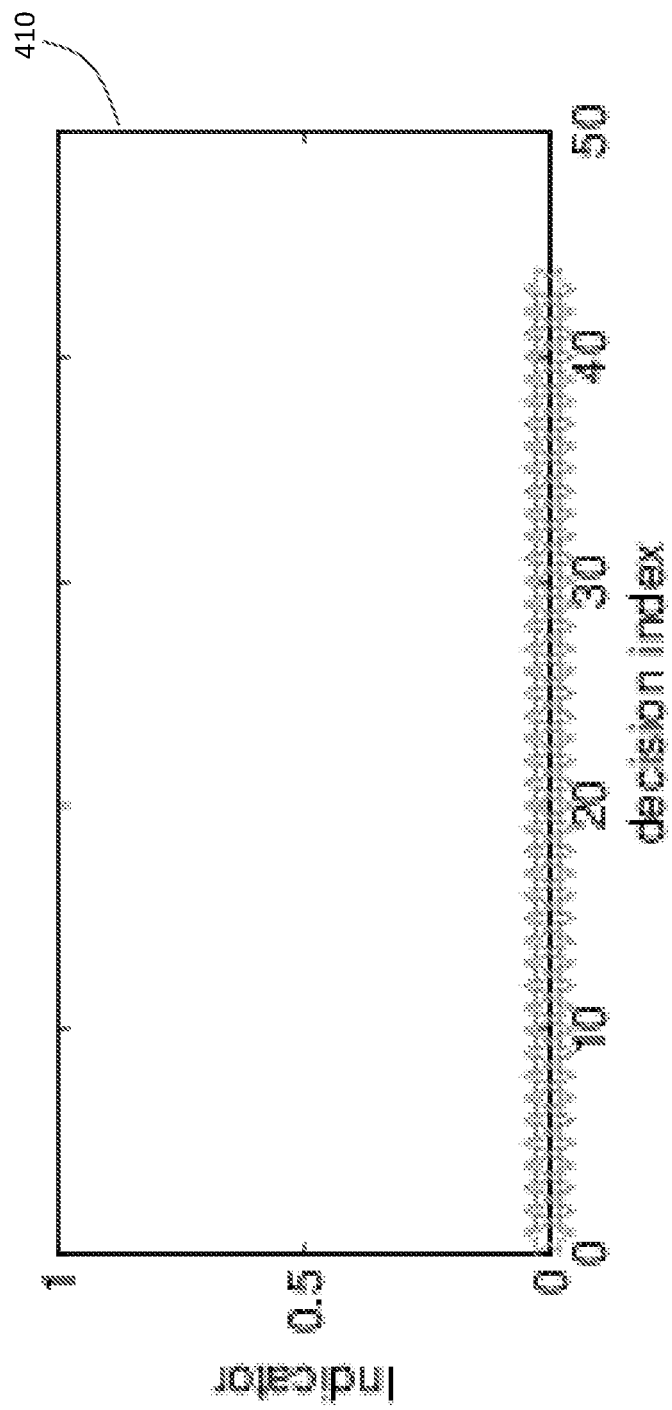
Figure 10A: No Walking.

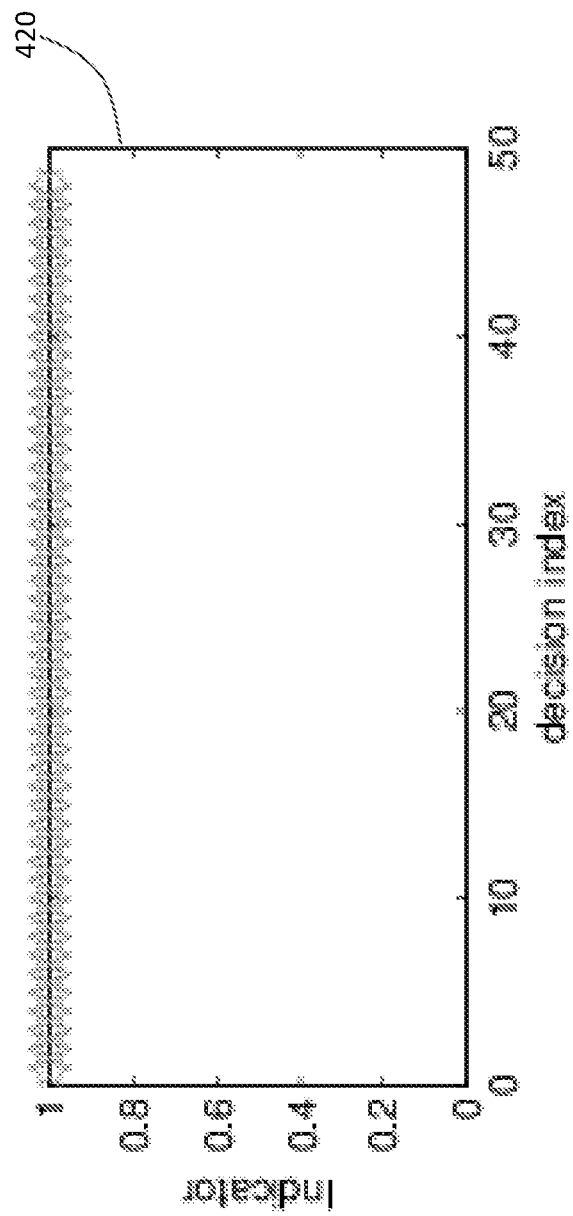
Figure 10B: Walking in the front door area.

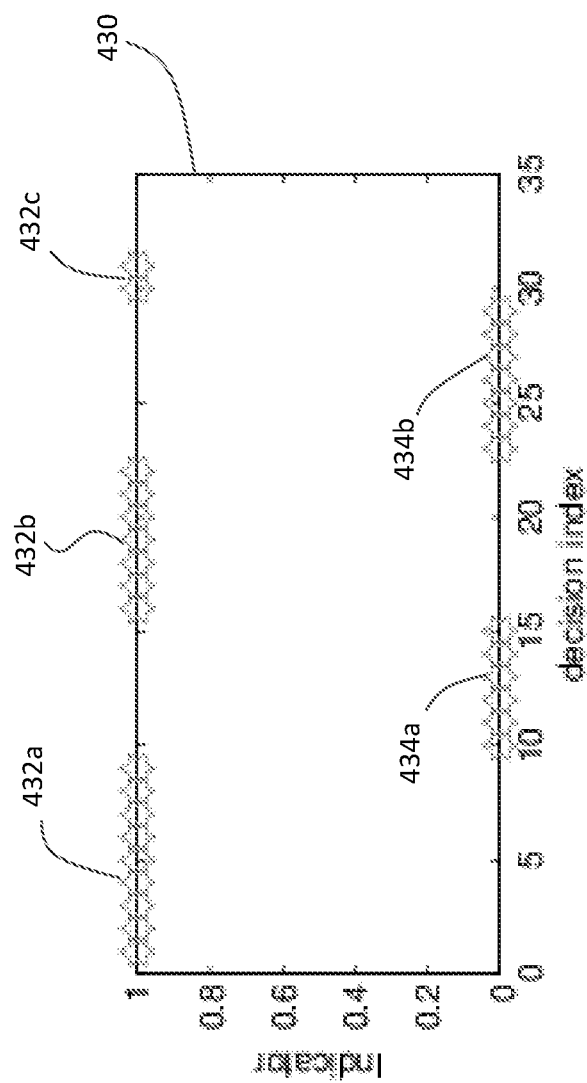
Figure 10C: Walking in the large area.

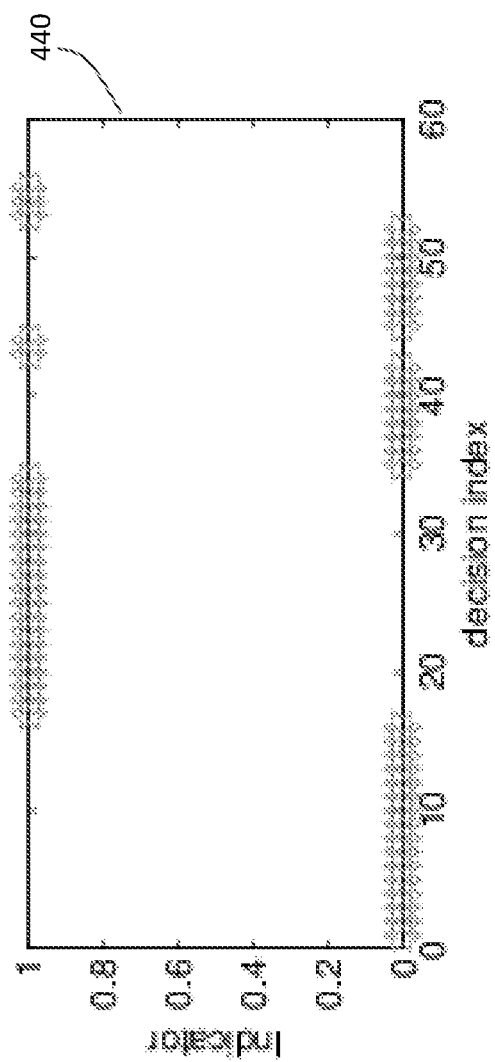
Figure 10D: Walking in the living room area.

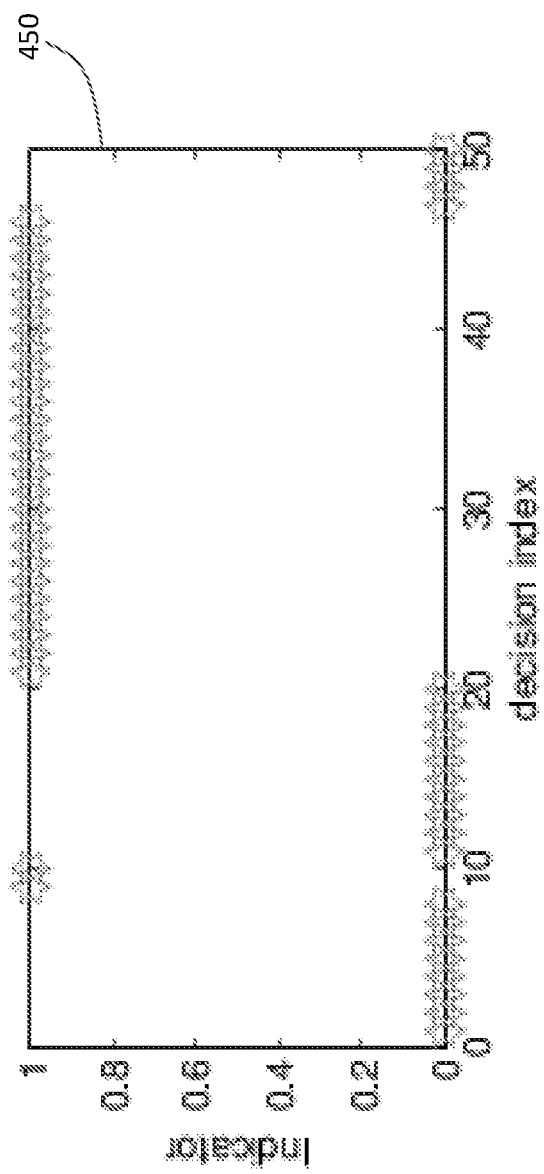
Figure 10E: Walking in the kitchen

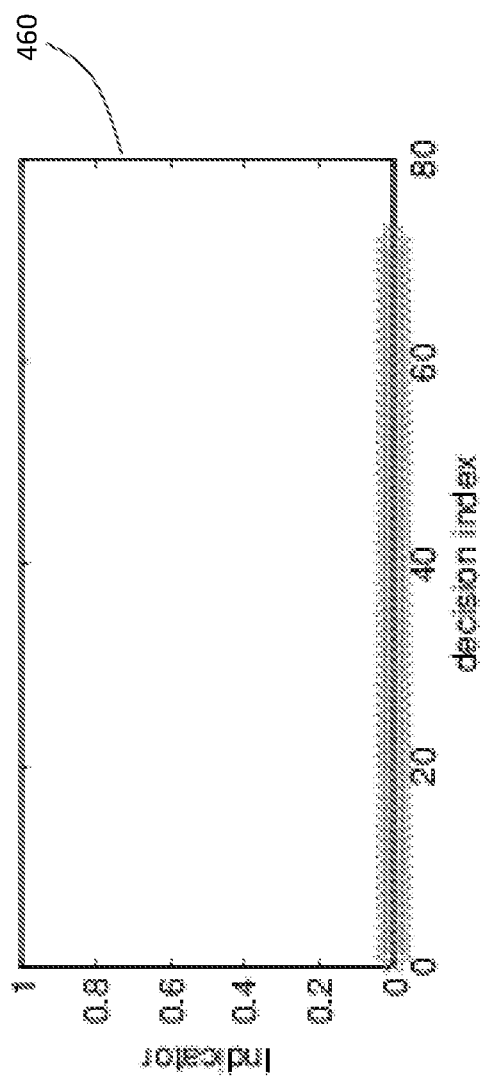
Figure 10F: Walking outside the house.

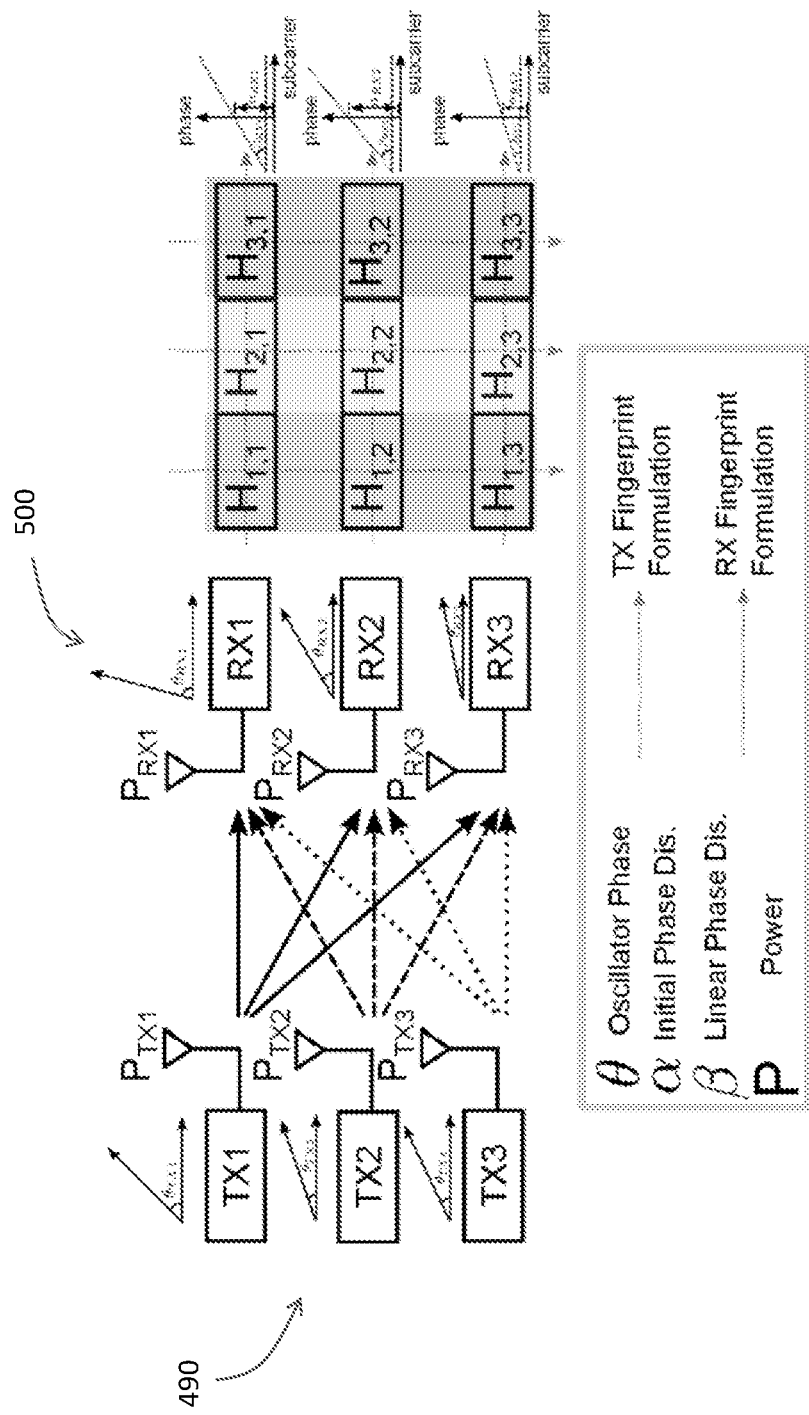
Fig. 11 The channel probing phase of the 3-antenna RF devices

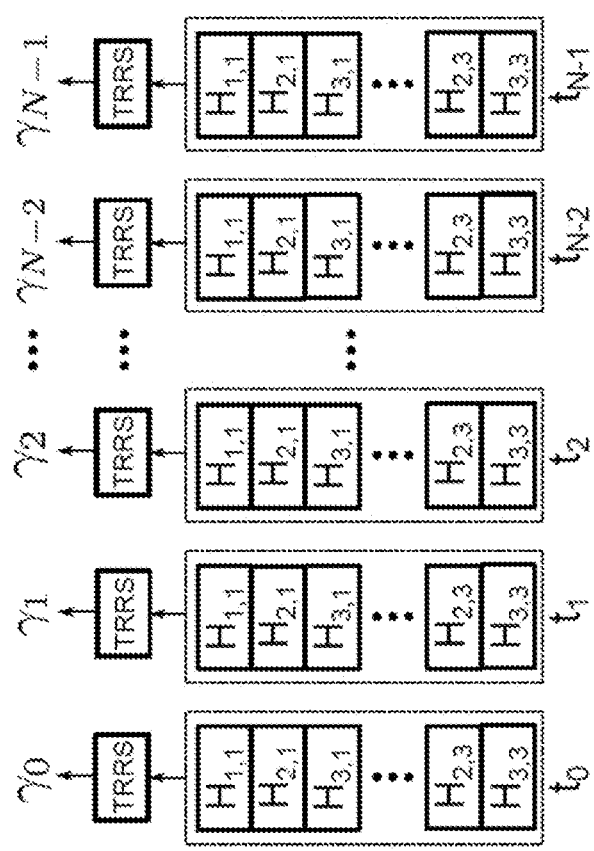
Fig. 12 Antenna correlation for each time instance

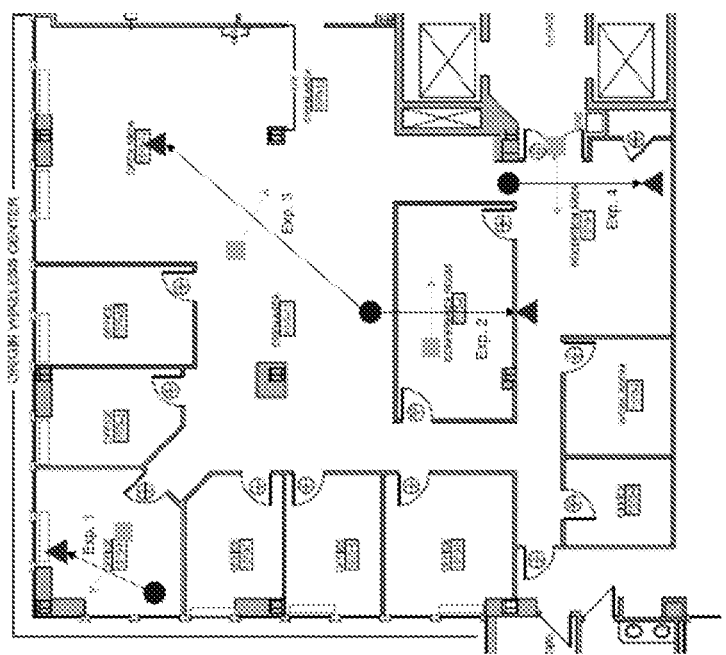
Fig. 13 Experiment setup for motion detector in an office

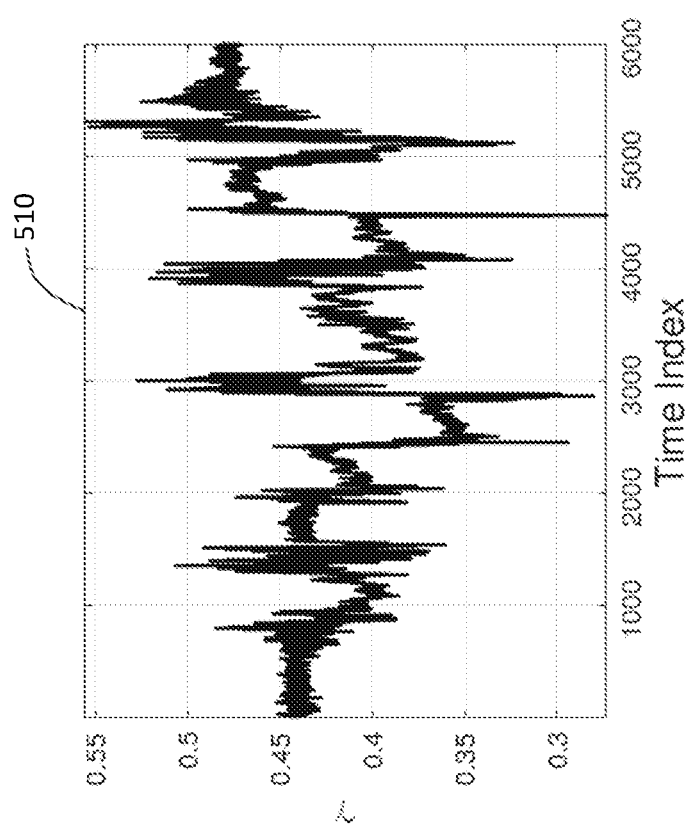
Fig. 14 Antenna correlation with human walking

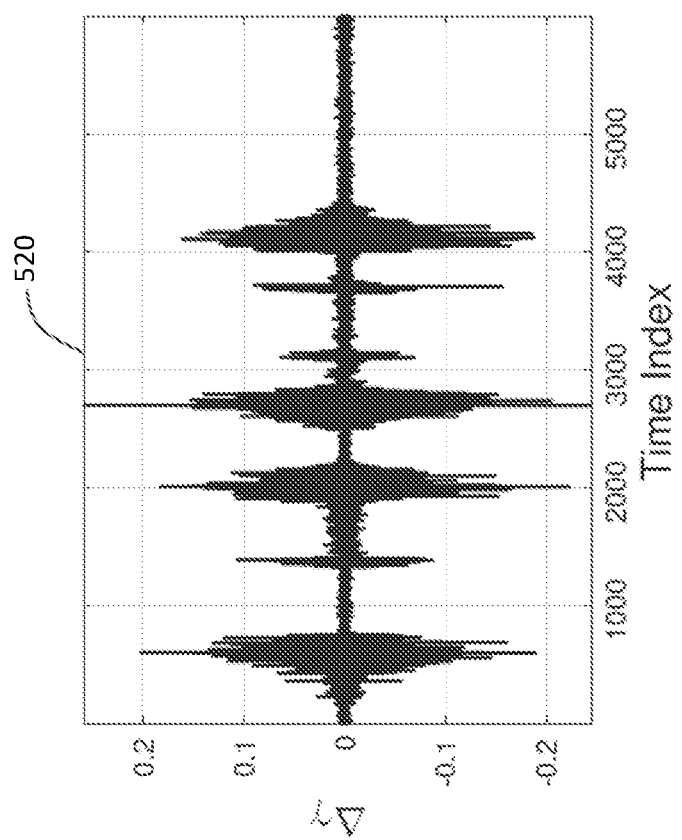
Fig. 15 Difference of antenna correlation with human walking

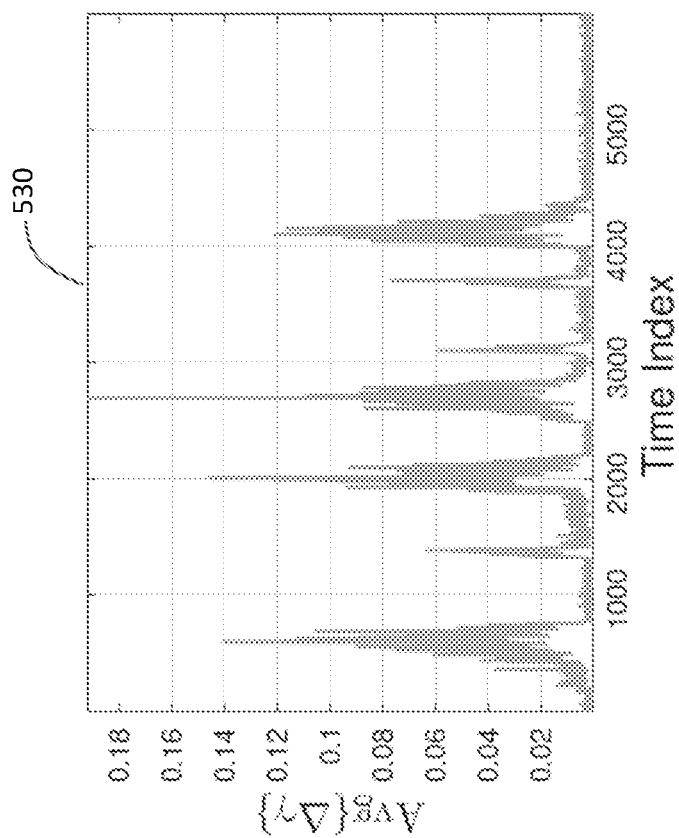
Fig. 16 Average of $\Delta\gamma_t$ with human walking in Exp. 1

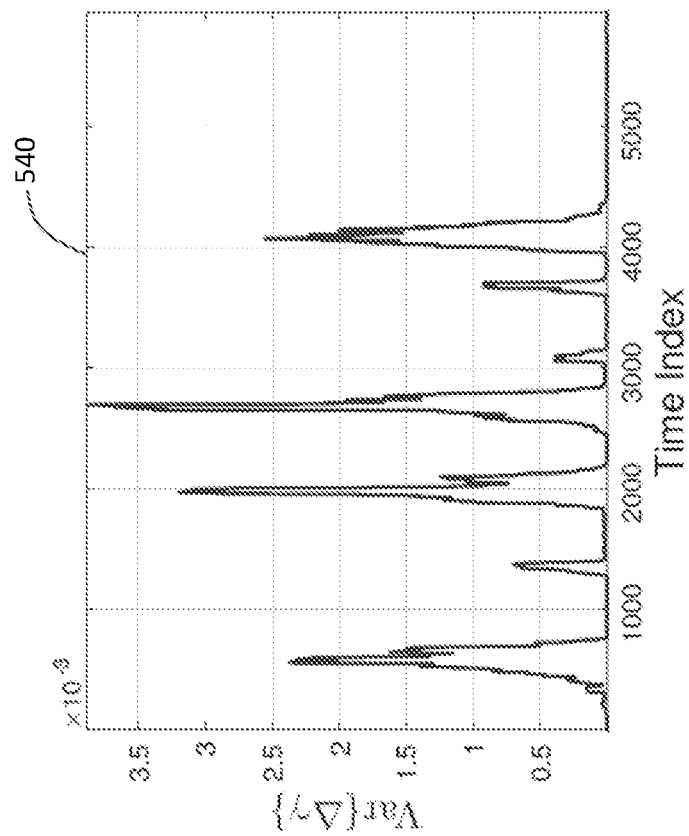
Fig. 17 Variance of $\Delta y_t$ with human walking in Exp. 1

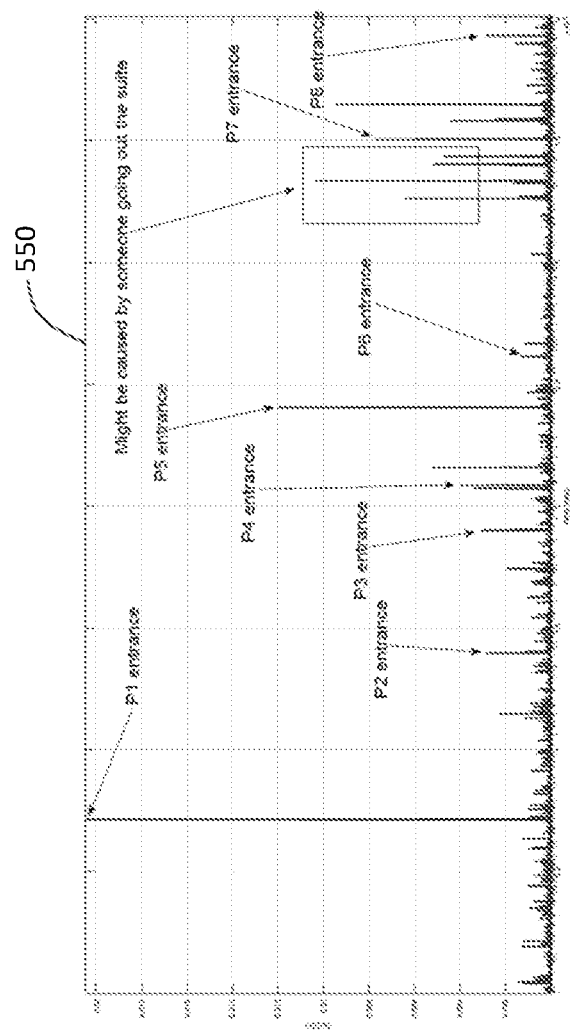
Fig. 18 Variance of $\Delta y_t$ and entrance history in experiment 2

$$T = \begin{pmatrix} s_{qe}[0] & 0 & \cdots & & & 0 \\ s_{qe}[1] & \ddots & \ddots & \ddots & & \vdots \\ \vdots & \ddots & \ddots & \ddots & \ddots & \\ & \ddots & \ddots & \ddots & \ddots & \\ & & \ddots & \ddots & \ddots & \\ s_q[L+L_e-1] & & \cdots & & & \end{pmatrix}$$

The toeplitz matrix $T$ generated by the training sequence $s_{qe}$

FIG. 32

METHOD, APPARATUS, AND SYSTEMS FOR WIRELESS EVENT DETECTION AND MONITORING

CROSS-REFERENCE TO RELATED APPLICATIONS

This application is a National Stage Application under 35 U.S.C. § 371 and claims the benefit of International Application PCT/US2016/066015, filed on Dec. 9, 2016, which claims priority to U.S. Application 62/265,155, filed on Dec. 9, 2015, U.S. Application 62/307,081, filed on Mar. 11, 2016, U.S. Application 62/316,850, filed on Apr. 1, 2016, U.S. Application 62/383,235, filed on Sep. 2, 2016, and U.S. Application 62/411,504, filed on Oct. 21, 2016. The entire contents of the above applications are herein incorporated by reference.

TECHNICAL FIELD

This disclosure relates to wireless security/surveillance applications. More specifically, the present disclosure relates to the method, apparatus, and systems for event detection, motion detection based on time reversal techniques using wireless signals.

BACKGROUND

Current indoor surveillance systems mostly rely on contact sensors to monitor states of indoor objects and passive infrared sensors (PIR) to detect the existence of human motions. In some examples, to secure a venue, several sensors need to be deployed and a line-of-sight (LOS) environment is required to detect motions. The existing systems do not learn or update themselves without the help of user feedback. Currently, most home/office security systems consist of a control panel, contact sensors, and PIRs. The contact sensors are devices using magnetism or electric currents to detect if the contact is established or broken and have been widely installed on doors and windows to monitor their open and close activities. PIR sensors detect moving objects that can generate heat in the environment by tracking the changes in the received infrared waves. In some examples, each of the sensors has limited coverage of monitoring in that the contact sensors need to be attached on the doors and the PIR sensors require line-of-sight to detect moving objects. Moreover, the cost increases significantly when more events are to be detected when protecting the venue.

Recently, sensing with wireless signals to detect indoor events and activities has gained much attention. Because received radio frequency (RF) signals can be altered by the propagation environment, device-free indoor sensing systems are capable of monitoring activities in the environment through the changes in received RF signals. Examples of features of RF signals that can be used to identify variations during signal transmission for indoor events detection include the received signal strength (RSS) and channel state information (CSI). Due to its susceptibility to environmental changes, the RSS indicator (RSSI) can be applied to indicate and further recognize indoor activities. Channel state information is now accessible in some commercial devices.

Another category of technologies in device-free indoor monitor systems is adopted from radar technology to track targets using their reflections. The radar technique can identify the delays of sub-nanoseconds in the time-of-flight (ToF) of wireless signals through different paths, by using ultra-wideband (UWB) sensing.

However, the technologies mentioned above for indoor monitor systems have limitations. First, the resolution of received signal strength indicator for differentiating between different indoor events and objects is low because the received signal strength indicator as a scalar has only a single degree of freedom and is severely affected by multipath effects. In the received signal strength indicator-based systems, the performance of indoor detection is guaranteed at the cost of deploying multiple sensing devices or antennas. Moreover, most channel state information-based indoor sensing systems only rely on the amplitudes of the channel state information, whereas the phase information is discarded regardless of how informative it is. On the other hand, in order to acquire different ToF information the radar-based techniques consume over 1 GHz bandwidth to sense the environment that cannot be realized through commercial WiFi devices, and the result obtained from the sensors often require further effort to detect the type of the indoor events.

SUMMARY

In a general aspect, an apparatus for detecting a plurality of events is provided. The apparatus includes a processor and a storage device storing a set of instructions that when executed by the processor cause the processor to train at least one classifier configured to classify channel state information and detect an event based on the classification of the channel state information. The training of the at least one classifier includes: for each of a plurality of known events to be detected by the apparatus, during a time period in which the known event occurs in a venue, obtain at least one set of training channel state information (CSI) of a wireless multipath channel between a wireless transmitter and a wireless receiver in the venue, in which the at least one set of training channel state information is derived from at least one first probing signal sent from the wireless transmitter through the wireless multipath channel to the wireless receiver, and train the at least one classifier based on the plurality of known events and the at least one set of training channel state information associated with each of the plurality of events. The processor also performs: during a period when a current event is occurring, receive a set of measured channel state information of a wireless multipath channel between the wireless transmitter and the wireless receiver, in which the set of measured channel state information is derived from at least one second probing signal sent from the wireless transmitter through a wireless multipath channel and received at the wireless receiver; and apply the classifier to data derived from the set of measured channel state information to determine which of the known events matches the current event.

In another general aspect, a method for eliminating the phase offset residuals in the estimated channel state information (CSI) is provide. The method includes receiving a wireless signal from a device; estimating the linear phase offset in the estimated channel state information, resulted by the sampling frequency offset (SFO) and the symbol timing offset (STO); estimating the common phase offset in the channel state information, resulted by the carrier frequency offset (CFO); and obtaining a clean channel state information at the receiver without referring any reference channel state information.

In another general aspect, a method for monitoring events using WiFi signals is provided. The method includes: for each of a plurality of known events that may occur in a venue, gathering first information about characteristics of WiFi signals sent from a transmitter to a receiver in the venue during at least one time period when the known event occurs, wherein the WiFi signals comply with IEEE 802.11 standard; and monitoring the venue, including determining second information about characteristics of WiFi signals sent from the transmitter to the receiver in the venue during a second time period, comparing the second information with the first information, or comparing data derived from the second information with data derived from the first information, and determining which of the known events is occurring at the venue during the second time period based on the comparison. The first information about characteristics of the WiFi signals includes at least a first set of channel state information derived from the WiFi signals sent from the transmitter to the receiver during the first time period, and the second information about characteristics of the WiFi signals comprises at least a second set of channel state information derived from the WiFi signals sent from the transmitter to the receiver during the second time period. Comparing the second information with the first information includes comparing the second set of channel state information to the first set of channel state information. Comparing the data derived from the second information with the data derived from the first information includes comparing data derived from the second set of channel state information to data derived from the first set of channel state information.

In another general aspect, a method for monitoring events using WiFi signals is provided. The method includes: for each of a plurality of known events that may occur in a venue, transmitting at least one WiFi signal from a transmitter to a receiver in the venue during at least one time period when the known event occurs, wherein the WiFi signal comply with IEEE 802.11 standard; for each WiFi signal received at the receiver, estimating a set of channel state information from the WiFi signal, in which the set of channel state information is associated with the known event that is associated with the WiFi signal; and training, using principal component analysis, a classifier based on the known events and the sets of channel state information associated with the known events. The method includes during a monitoring phase, transmitting at least one WiFi signal from the transmitter to the receiver during a second time period, determining a second set of channel state information from the WiFi signal received at the receiver during the second time period, and applying the classifier to the second set of channel state information or data derived from the second set of channel state information to determine which of the known events occurred during the second time period.

BRIEF DESCRIPTION OF DRAWINGS

FIG. 2A is a graph of an exemplary experimental setting for multiple door open/close detection.

FIG. 2B is a graph of an exemplary experimental setting for door open/close detection with human moving around.

FIG. 3 is a graph showing an exemplary floorplan for the environment to be monitored.

FIG. 4A is a graph showing the receiver operating characteristics (ROC) for target events for TX-RX configuration I.

FIG. 4B is a graph showing the receiver operating characteristics for all indoor events for TX-RX configuration I.

FIG. 5A is a graph showing the receiver operating characteristics for target events for TX-RX configuration II.

FIG. 5B is a graph showing the receiver operating characteristics for all indoor events for TX-RX configuration II.

FIG. 6A is a graph showing the detection of e1 (all doors are closed).

FIG. 6B is a graph showing the detection of event e4.

FIG. 6C is a graph showing the detection of event e9 (window open).

FIG. 7A is a graph showing the detection of e1 with human walking outside the front door.

FIG. 7B is a graph showing the detection of e1 with human walking outside the backdoor.

FIG. 7C is a graph showing the detection of e1 with human driving outside the house.

FIG. 8A is a graph showing the receiver operating characteristics for target events.

FIG. 8B is a graph showing the receiver operating characteristics for all indoor events.

FIG. 9A is a graph showing the detection of e1 (all doors closed).

FIG. 9B is a graph showing the detection of e4 (room door open).

FIG. 9C is a graph showing the detection of e9 (window open).

FIG. 10A is a graph showing the detection of no human walking.

FIG. 10B is a graph showing the detection of human walking in the front door area.

FIG. 10C is a graph showing the detection of human walking in the large area.

FIG. 10D is a graph showing the detection of human walking in the living room.

FIG. 10E is a graph showing the detection of human walking in the kitchen.

FIG. 10F is a graph showing the detection of human walking outside the house.

FIG. 11 is a graph showing the channel probing of a 3-antenna RF TX-RX pair.

FIG. 12 is a graph showing the calculation of antenna correlation for each time instance.

FIG. 13 is a graph showing an exemplary experimental setup for motion detection in an office.

FIG. 14 is a graph showing the detection of human walking using the antenna correlation based method.

FIG. 15 is a graph showing the difference of antenna correlation in detecting the human walking.

FIG. 16 is a graph showing the average of $\Delta\gamma_t$ with human walking in Exp. 1.

FIG. 17 is a graph showing the variance of $\Delta\gamma_t$ with human walking in Exp. 1.

FIG. 18 is a graph showing the variance of $\Delta\gamma_t$ in Exp. 4.

FIG. 32 shows a Toeplitz matrix.

DETAILED DESCRIPTION

In this document, we describe systems and methods for monitoring or detecting events in a venue, which can be an indoor venue or an outdoor venue having multiple surfaces that can reflect wireless signals to provide a rich multipath environment. The venue can be, e.g., a room, a house, an office, a store, a factory, a hotel room, a museum, a classroom, a warehouse, a car, a truck, a bus, a ship, a train, an airplane, a mobile home, a cave, or a tunnel. For example, the venue can be a building that has one floor or multiple floors, and a portion of the building can be underground. The shape of the building can be, e.g., round, square, rectangular, triangle, or irregular-shaped. There are merely examples, the invention can be used to detect events in other types of venues or spaces.

When a transmitter sends a wireless signal to a receiver through multiple paths, referred to as a multipath channel, in a venue, the multipath channel is influenced by characteristics of the venue, such as arrangements of objects or surfaces in the venue. Thus, when the transmitter and the receiver are placed at fixed locations in the venue, and the transmitter repeatedly sends signals having the same waveform to the receiver, if characteristics of the venue change over time, the waveforms of the signals received at the receiver may also change over time. By measuring characteristics of the waveforms of the signals received at the receiver, it is possible to infer what events are happening in the venue.

In some implementations, the system operates in a training phase and then in a monitoring phase. In the training phase, a classifier is trained to establish reference values of certain parameters, such that the reference values can be used to represent certain events that the user intends to monitor. The events can be, e.g., "door is open," "door is closed," "window is open," "window is closed," "no human moving in room," or "human moving in room." There are merely examples, the system can also detect other types of events. The classifier is trained by using information derived from wireless signals that are measured when the events are occurring in the venue. In the monitoring phase, wireless signals in the venue are measured and information derived from the wireless signals is provided to the classifier. Based on the information derived from the measured wireless signals and the reference values, the classifier determines what event occurred in the venue.

In the following description, an overview of environment specific signatures and the time-reversal wireless system is provided. Then various implementations of classifiers, such as those using a baseline method, a statistical approach, a machine learning approach, a time-reversal resonance strength variance based approach, an antenna correlation based approach, and a time-of-arrival based approach are described.

Environment Specific Signatures

Figure 35:
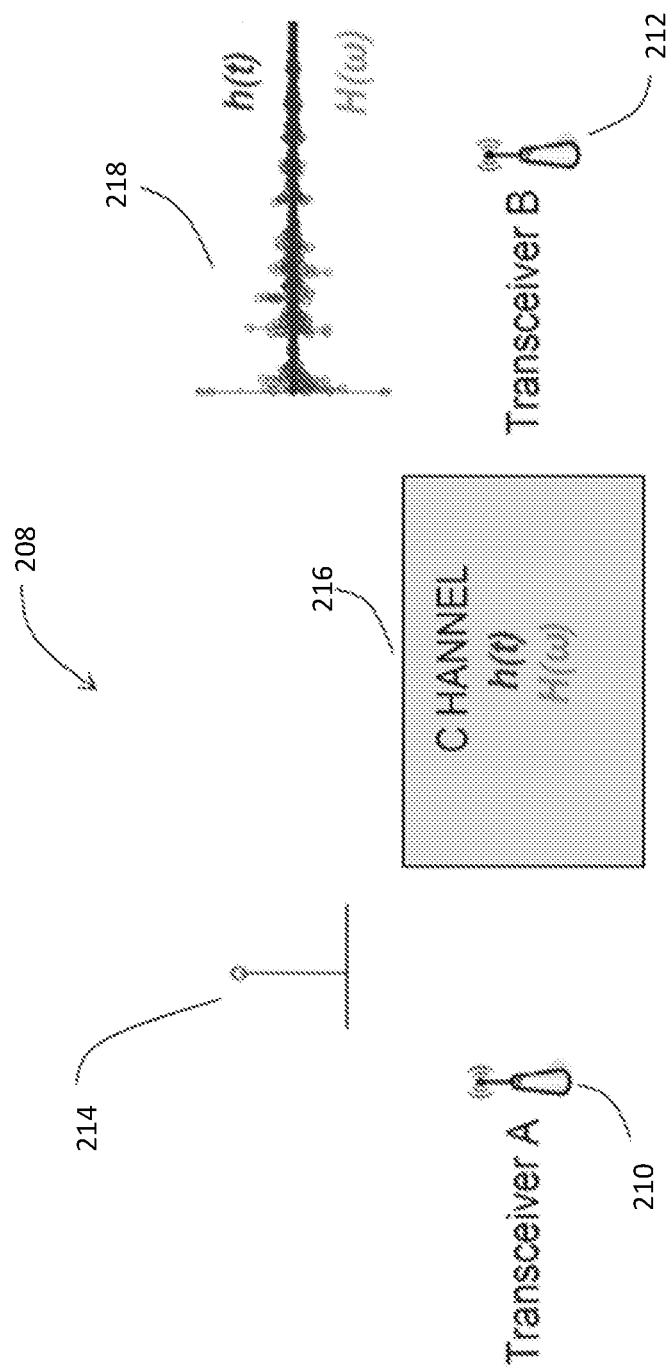
FIG. 35 is a diagram of a wireless system that includes two transceivers.

FIG. 35 shows an exemplary embodiment of a wireless system 208 comprising two transceivers 210 and 212. In this embodiment, transceiver A 210, comprising an antenna, launches a wireless signal 214 that propagates through a wireless channel 216 and arrives at transceiver B 212, comprising an antenna, as a multipath wireless signal 218. In exemplary embodiments, at least one antenna may launch at least one wireless signal into a channel and at least one antenna may receive a signal from the wireless channel. In embodiments, the transmitting and receiving antennas may be placed apart from each other, and in some embodiments, they may be co-located. For example, a device, computer, mobile device, access point and the like may comprise more than one antenna and the antennas may be operated as either or both transmit and receive antennas. In some embodiments, the at least one antenna may be a single antenna that may be used to both launch wireless signals into a channel and to receive multipath signals from the channel. In embodiments, antennas may transmit and receive signals in different time slots, in different frequency bands, in different directions, and/or in different polarizations or they may transmit and receive signals at the same or similar times, in the same or similar frequency bands, in the same or similar directions and/or in the same or similar polarizations. In some embodiments, antennas and/or devices comprising antennas may adjust the timing, carrier frequency, direction and/or polarization of signal transmissions and signal receptions.

Antennas in exemplary embodiments may be any type of electrical device that converts electric power or electric signals into radio waves, microwaves, microwave signals, or radio signals, and vice versa. By way of example but not limitation, the at least one antenna may be configured as a directional antenna or an omni-directional antenna. The at least one antenna may be some type of monopole antenna, dipole antenna, quadrapole antenna and the like. The at least one antenna may be some type of loop antenna and/or may be formed from a length of wire. The at least one antenna may be a patch antenna, a parabolic antenna, a horn antenna, a Yagi antenna, a folded dipole antenna, a multi-band antenna, a shortwave antenna, a microwave antenna, a coaxial antenna, a metamaterial antenna, a satellite antenna, a dielectric resonator antenna, a fractal antenna, a helical antenna, an isotropic radiator, a J-pole antenna, a slot antenna, a microstrip antenna, a conformal antenna, a dish antenna, a television antenna, a radio antenna, a random wire antenna, a sector antenna, a cellular antenna, a smart antenna, an umbrella antenna and the like. The at least one antenna may also be part of an antenna array such as a linear array antenna, a phased array antenna, a reflective array antenna, a directional array antenna, and the like. The at least one antenna may be a narrowband antenna or a broadband antenna, a high gain antenna or a low gain antenna, an adjustable or tunable antenna or a fixed antenna. Any type of antenna may be configured for use in the systems, methods and techniques described herein. In embodiments, the radiation pattern associated with an exemplary antenna may be tunable and may be tuned to improve the performance of the exemplary systems, methods and techniques described herein.

In embodiments, electrical signals may be applied to one or more antennas for wireless transmission and may be received from one or more antennas for processing. In embodiments, wireless signals may be radio waves or microwaves. In embodiments, wireless signals may have carrier frequencies anywhere in the range from kilohertz to terahertz. In embodiments, antennas may comprise at least one of a filter, amplifier, switch, monitor port, impedance matching network, and the like. In embodiments, electrical signals may be generated using analog and/or digital circuitry and may be used to drive at least one antenna. In embodiments, electrical signals received from at least one antenna may be processed using analog and/or digital circuitry. In exemplary embodiments of the inventions disclosed herein, electrical signals may be sampled, digitized, stored, compared, correlated, time reversed, amplified, attenuated, adjusted, compensated, integrated, processed and the like.

Figure 36:
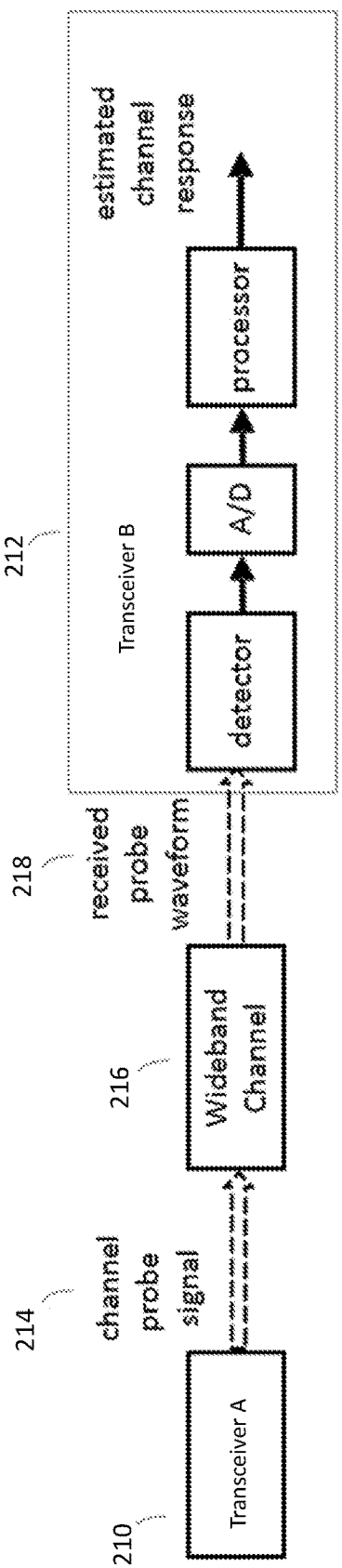
FIG. 36 is a diagram of a wireless signal being transmitted from a first device to a second device through a wideband wireless channel.

In this disclosure, the signal launched by a transmit antenna for the purpose of probing characteristics of the channel may sometimes be referred to as a probe signal or a channel probe signal or a channel probe waveform. FIG. 36 shows a representation of a wireless signal 214 being transmitted from a first device 210 to a second device 212 through a wideband wireless channel 216. The channel probe signal 214 may arrive at the second device 212 as what we may also refer to as a received probe waveform 218. This received probe waveform 218 may be received and processed by a receiver comprising at least one antenna and a set of receiver electronics. In exemplary embodiments, the processing of the received probe waveform 218 may yield an estimated channel response for the wideband channel between devices 210 and 212. In embodiments, probe and received signals may be analog signals that are converted to digital signals (and may be digital signals that are converted to analog signals) and may be processed and/or generated using digital signal processors (DSPs), field programmable gate arrays (FPGAs), Advanced RISC Machine (ARM) processors, microprocessors, computers, application specific integrated circuits (ASICs) and the like.

In the time domain, the channel impulse response of a communication link can be modeled as $h_i[k]=\Sigma_{i=0}^{L-1} h_{i,i} \delta[k-l]$, in which $h_i[k]$ is the k-th tap of the channel impulse response (CIR) with length L, and $\delta[\ ]$ is the Dirac delta function. Note that the time domain representation of the channel response, h, and the frequency domain representation of the channel response, H, are related by the Fourier Transform.

In exemplary embodiments, the received probe waveform may be predicted by convolving the channel probe signal with the channel impulse response, if the channel impulse response is known. The channel impulse response or estimated channel response may be an approximation or an estimate of the actual channel impulse response. For example, the estimated channel response may be truncated to a certain channel length that is deemed to be an "accurate-enough" estimate of the channel or that is chosen to preferentially probe certain characteristics of the channel. In addition, the estimated channel response may be derived from a discretized approximation of a received probe waveform with the time and amplitude resolution of the discretized signal determined to be "accurate enough" for a particular application. The estimated channel response may be a filtered version of the actual channel response and may be an accurate-enough estimate of the channel. The determination of what is "accurate-enough" may depend on the application, the hardware components used in the wireless devices, the processing power of the devices, the allowed power consumption of the devices, the desired accuracy of the system performance, and the like.

If the probe signal transmitted by a device is a single pulse or impulse signal, then the received probe waveform may be an accurate enough estimate of the channel impulse response and little additional processing other than reception, discretization and storage of the received probe waveform may be necessary to obtain the estimated channel response. If the probe signal transmitted by a device is a waveform other than a single pulse or impulse signal, then a receiver may need to perform additional processing on the received probe waveform in order to determine the estimated channel response. In an exemplary embodiment, a receiver may detect and discretize a received probe waveform. Analog-to-digital (A/D) converters may be used to perform the discretization. In embodiments, a deconvolution process may use the discretized received probe waveform and a representation of the channel probe signal to yield the estimated channel response. In embodiments, other mathematical functions may be used to yield estimated channel responses. Channel impulse responses (CIRs) may also be referred to in this document as channel responses (CRs), CR signals, CIR signals, channel probe signal responses, and estimated channel responses. Channel responses may be measured and/or computed and/or may be generated by a combination of measurement and computation. In this disclosure we may also refer to channel responses and received probe waveforms as location-specific signatures.

In embodiments, different channel probe signals may be chosen to increase or decrease the accuracy of the estimate of the channel response of a wideband channel. In exemplary embodiments, a channel probe signal may be a pulse or an impulse. In addition, the channel probe signal may be a series of pulses with regular, arbitrary or non-regular patterns. The channel probe signal may be a waveform. Waveforms may be substantially square waveforms, raised cosine waveforms, Gaussian waveforms, Lorentzian waveforms, or waveforms with shapes that have been designed to probe the channel in some optimal or desired way. For example, channel probe waveforms may be frequency chirped or may have frequency spectra that are tailored to probe the channel in some optimal or desired way. Probe waveforms may be multiple waveforms with different center frequencies and bandwidths. Probe waveforms may be amplitude modulated, phase modulated, frequency modulated, pulse position modulated, polarization modulated, or modulated in any combination of amplitude, phase, frequency, pulse position and polarization.

The waveform may have a temporal width that is substantially equal to a bit duration of a data stream that may be intended to be exchanged over the associated communication channel. The waveform may have a temporal width that is substantially half, substantially one quarter, substantially one tenth, substantially one hundredth, or less than a bit duration of a data stream intended to be exchanged over the associated communication channel. The probe signal/waveform may be a data pattern and may be a repeating data pattern. The probe signal may include packet and/or framing information, synchronization and/or clock recovery information, stream capture information, device ID and network and link layer operating information. The probe signal may have a frequency spectrum that has been tailored for the operating environment and/or the electronic components in the transmitters and/or receivers of the systems. The probe signal may be an estimate of the channel impulse response or may be an altered version of the estimate of the channel impulse response. For example, the probe signal may be a time-reversed version of the estimated channel response. The probe signal may be designed to compensate for and/or to accentuate signal distortions imposed by certain electronic components in the transmitters and/or receivers and/or imposed by certain environmental factors.

One exemplary type of a channel probing signal is a periodic pulse sequence. With such a channel probing signal, the received probe waveform may be a noisy version of the periodic channel pulse response. In embodiments, a time-averaging scheme can be used to suppress the noise and extract the channel response.

In some embodiments, a time-averaging scheme may not provide a reliable measure of the channel response. To improve the channel response estimation, a longer sequence of pulses can be used to suppress the noise. To further improve the performance of the system, a short pseudo-random sequence of pulses can be used as the channel probing signal. In such a case, the received probe waveform can be the convolution of the pseudo-random sequence with the channel response.

In embodiments, the pseudo-random sequence used as the probing signal may be known by a receiver. Then the channel response can be estimated using a correlation-based method where the received signal is convolved with the pseudo-random sequence. In general, the auto-correlation of the pseudo-random sequence may not be an ideal delta function because there can be inter-symbol interference and thus error in the estimated channel response. In embodiments, such kinds of channel estimation error due to inter-symbol interference may be minimized or avoided by using orthogonal Golay complementary sequences, which may have an ideal delta shape for auto-correlation function, rather than a pseudo-random sequence.

In embodiments, a wireless device may transmit a first wireless signal with a center frequency of $f_1$ GHz. In embodiments, the first wireless signal may be a channel probe signal, a pulse signal, a frame signal, a pseudorandom noise (PN) sequence, a preamble signal, and the like. In embodiments, the bandwidth of the wireless signal may be approximately 10 MHz, 20 MHz, 40 MHz, 60 MHz, 125 MHz, 250 MHz, 500 MHz, 1 GHz and the like. In embodiments, a wireless device may send a second wireless signal with a center frequency of $f_2$ GHz. In embodiments, the second wireless signal may be a channel probe signal, a pulse signal, a frame signal, a PN sequence, a preamble signal, and the like. In embodiments, the bandwidth of the wireless signal may be approximately 10 MHz, 20 MHz, 40 MHz, 60 MHz, 125 MHz, 250 MHz, 500 MHz, 1 GHz and the like. In embodiments, the frequency spectrum of the first wireless signal and the second wireless signal may include overlapping frequencies. In some embodiments, there may be no overlapping frequencies between the two wireless signals. In some embodiments, the frequency spectra of the different wireless signals may be separated by so-called guard-bands or guard-band frequencies. The channel response for the channel probed using the first wireless signal (for example at frequency $f_1$) may be represented as $H_{ij}(f_1)$. The channel response for the channel probed using the second wireless signal (for example at probe frequency $f_2$) may be represented as $H_{ij}(f_2)$. In embodiments, more than two probe frequency signals may be used to probe the channel. The more than two probe frequency signals may have some overlapping frequencies or they may have no overlapping frequencies.

In embodiments, a wireless device may use channel tuning and/or frequency hopping to tune to different wireless signal carrier frequencies to probe a wireless channel. In some embodiments, a wireless device may tune to different channels within a specified frequency band to probe the wireless channel. For example, a wireless device may first tune to one channel within the WiFi, (IEEE 802.11) signaling bandwidth and then to another channel within the wireless band. The frequency tuning may be from one channel to the next in a sequential fashion, but it may also hop from one channel to another in a random fashion anywhere within the WiFi band. In embodiments, the different channels may have different channel bandwidths. In embodiments, any wireless protocol may be used to generate probe signals and/or to analyze channel information in the received signal.

In embodiments, multiple channel probe signals may be used to probe a channel. In some implementations, the same probe signal may be sent multiple times and the received probe waveforms may be averaged and/or compared. For example, a probe signal may be sent twice, 5 times, 10 times, 30 times, 50 times, 100 times, 500 times or 1000 times. In embodiments, a probe signal may be sent once or may be sent any number of times between 2 and 1000 times. In embodiments, a probe signal may be sent more than 1000 times. For example, in some monitoring and security applications, probe signals may be sent continuously. For example, probe signals at 1 probe signal per second, 10 probe signals per second, 100 probe signals per second, and the like may be sent continuously to monitor and probe a space. The rate at which probe signals are continually sent may be determined by the speed at which changes to an environment should be detected.

In embodiments, only some of the received probe waveforms may be used for further processing. For example, some received probe waveforms and/or the estimated channel responses may be discarded or trimmed. The discarded and/or trimmed waveforms and or responses may be sufficiently different from other received waveforms and/or estimated responses that they may be deemed as outliers and not accurate-enough representations of the channel. In some embodiments, different probe signals may be sent at different times and/or in response to feedback from the receiver. For example, a probe signal at the transmitter may be tuned to improve the received probe waveforms, the estimated channel responses and/or the similarity of the received probe waveforms and/or the estimated channel responses. In embodiments, a transmitter may send at least two different probe signals and a receiver may estimate channel responses based on either one, some or all of the at least two different received probe waveforms. In embodiments, probe signals may be versions of previously measured and/or calculated channel responses and/or time reversed versions of the measured and/or calculated channel responses.

As will be discussed in more detail later in this disclosure, similarity or matching or correlation of waveforms, signatures and/or responses may be determined using virtual time reversal processing techniques, time-reversal resonating strengths, pattern recognition and/or matching, linear and/or nonlinear support vector machines and/or support vector networks, machine learning, data mining, classification, statistical classification, tagging, kernel tricks (e.g., kernel methods that apply kernel functions) and the like.

In embodiments, processing a received probe waveform may include amplifying or attenuating any portion of the received signal. In embodiments, a channel may be probed once or a channel may be probed more than once. In embodiments, multiple received probe waveforms may be measured, processed, recorded and the like. In embodiments, some channel responses may be averaged with others. In embodiments, some channel responses may be discarded or not recorded. In embodiments, some channel responses may be measured under different environmental conditions and stored. Such stored response signals may be used as reference signals to indicate the environmental conditions associated with the original measurements. In embodiments, a newly measured channel response may be compared to a number of previously stored channel responses to determine which previously stored channel response most closely matches the newly measured channel response. Then, the environmental parameters of the most closely correlated or most closely matched previously stored channel response may be associated with the newly measured channel response. In exemplary embodiments, environmental conditions may include, but may not be limited to, temperature, location or placement of objects, location or placement of people, pose of objects, pose of people, location and/or pose of access points, terminal devices, position and/or pose of sensors, position and/or pose of signal reflectors, position and/or pose of signal scatterers, position and/or pose of signal attenuators, and the like.

In an exemplary embodiment, the estimated channel response may be considered an environment-specific waveform and/or signature because it represents the channel response between two devices in a certain environment or between a device and the objects and/or structures in a venue or in a certain environment. As shown in FIG. 36, if there are one or more movements in one or more objects and/or structures and/or surfaces in a venue or environment in which the signal transmitted between devices 210 and 212 propagates, then at least some of the multiple propagation paths through which a signal propagates can change, thereby changing the channel response. The characteristics of the estimated channel waveform and how much they change may depend on the venue, the environment, and the hardware components in the system.

Overview of Time-Reversal Wireless System

Figure 1A:
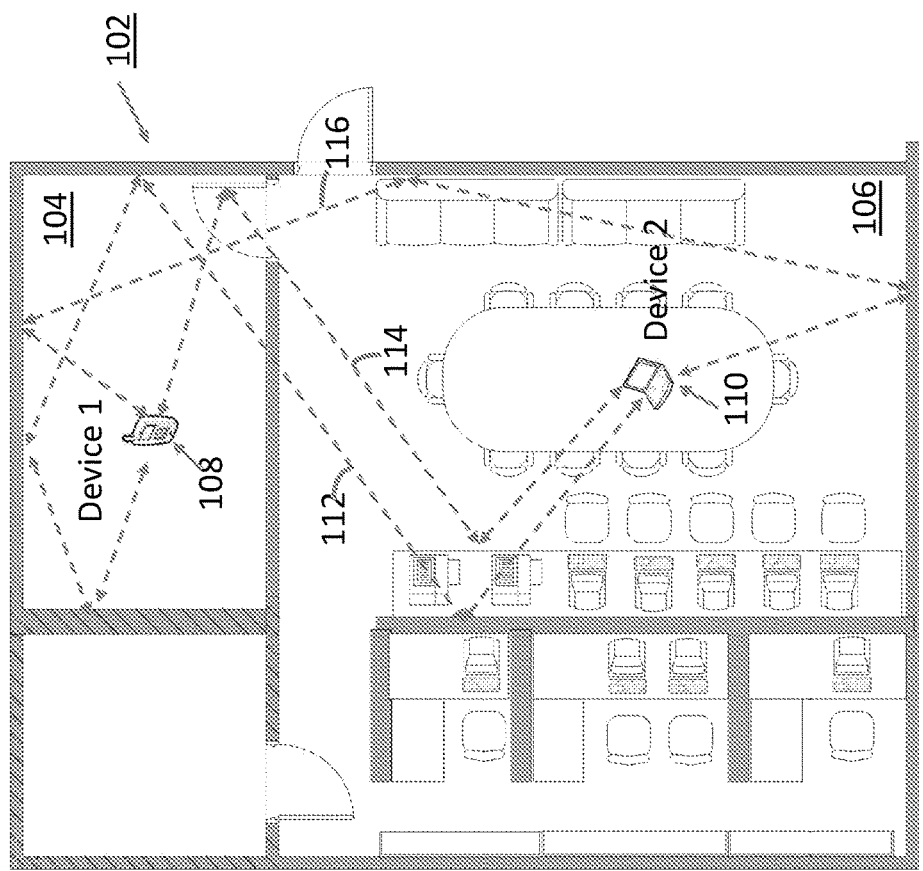
FIG. 1A is a diagram showing an exemplary environment for operating a time-reversal system.

The following provides an overview of a time-reversal wireless system. Referring to FIG. 1A, a time-reversal system can be used in an environment having structures or objects that may cause one or more reflections of wireless signals. For example, a venue 102 may have a first room 104 and a second room 106. When a first device 108 in the first room 104 transmits a signal to a second device 110 in the second room 106, the signal can propagate in several directions and reach the second device 110 by traveling through several propagation paths, e.g., 112, 114, and 116. The signal traveling through multiple propagation paths is referred to as a multipath signal. As the signal travels through the propagation paths, the signal may become distorted. The multipath signal received by the second device 110 can be quite different from the signal transmitted by the first device 108.

Figure 1B:
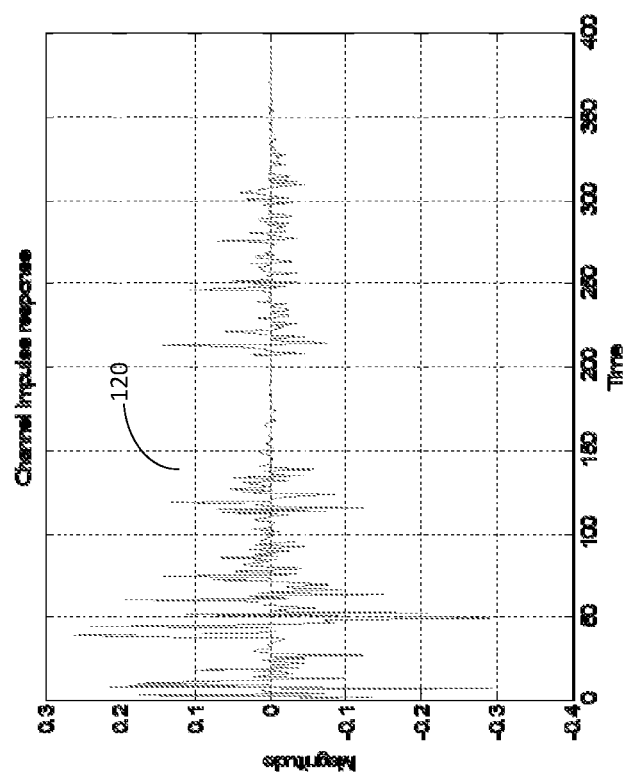
FIG. 1B is a graph of an exemplary recorded channel response waveform.

For example, referring to FIG. 1B, when the first device 108 sends a pulse signal, the signal received by the second device 110 may have a waveform 120. The waveform 120 is referred to as the channel impulse response (CIR), which reflects the channel state information (CSI) in time domain. In this description, "channel state information" (CSI) refers to channel properties of a communication link. It describes how a signal propagates from the transmitter to the receiver. The channel state information can be obtained using channel estimation based on the received channel sounding or probing signal. The channel state information in the time domain, often referred to as the channel impulse response (CIR), can be represented by a vector of complex values reflecting the channel attenuation and phase shift during the channel delay spread. The channel state information in frequency domain, often referred to as the channel frequency response (CFR), can be represented by a vector of complex values which reflect the channel attenuation and phase shift on each frequency unit, e.g., on a subcarrier within a WiFi channel.

Figure 1C:
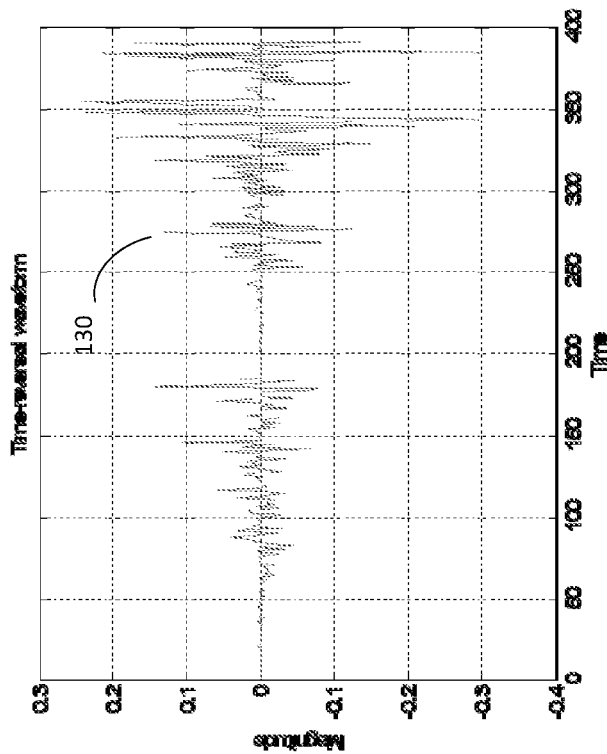
FIG. 1C is a graph of an exemplary time-reversed waveform generated by reversing the waveform of FIG. 1B with respect to time.

Referring to FIG. 1C, a time-reversed waveform (signature) 130 can be generated by reversing the waveform 120 with respect to time. If the second device 110 sends a signal having the waveform 130, the signal will propagation in various directions, including through propagation paths 112, 114, and 116 (in reverse direction relative to the propagation direction of the impulse signal), and reach the first device 108. The multipath signal received at the first device 108 may form an impulse signal that is similar to the impulse signal previously sent from the first device 108 to the second device 110.

The waveforms 120 and 130 shown in FIGS. 1B and 1C are merely examples. The waveforms in time-reversal systems can vary depending on, e.g., the environment and the information or data being transmitted. In addition, the initial signal sent from the first device 108 can be any type of signal, of which an impulse is just one example. The initial signal can be any waveform.

In some implementations, when the second device 110 intends to transmit a data stream to the first device 108, the second device 110 may use a normalized time-reversed conjugate of the signal received from the device 108 as a basic transmission waveform (signature). The second device 110 may encode the data stream on the basic waveform (signature) and transmit the signal through the wireless channel. The signal received at the device 108 may be described as the convolution of the transmitted signal and the channel impulse response, plus additive white Gaussian noise. Because the transmitted signal has been designed based on a time reversed version of the channel impulse response, the first device 108 may only need to perform a simple adjustment to the received signal and down-sample it to recover the data stream transmitted by the second device 110.

In some examples a transmitting device or base station or access point may send signals to two or more receiving devices at the same time. The transmitted signals travel through multiple propagation paths to each receiver. Because the receivers are positioned at different locations, the multipath signals travel through different propagation paths to reach the receivers. By carefully constructing the waveform of the signal sent from the transmitter, it is possible to allow each receiver to receive data intended for the receiver with sufficient high quality.

Channel Probing

Figure 37:
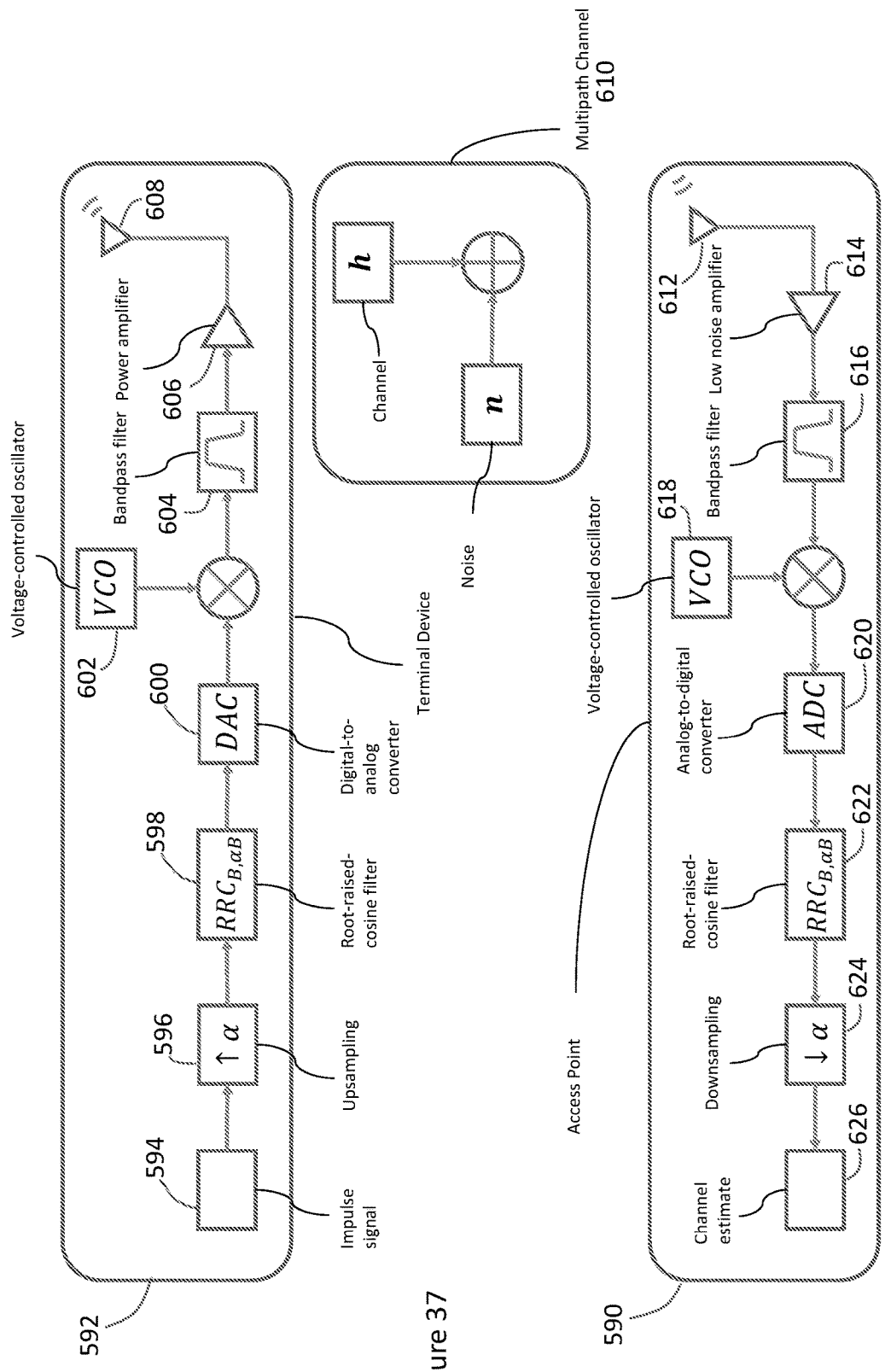
FIG. 37 is a diagram showing channel probing performed when a transceiver or access point (AP) communicates with a terminal device.

In some implementations, referring to FIG. 37, channel probing is performed when a transceiver or access point (AP) 590 communicates with a terminal device 592. In the channel probing phase, the terminal device 592 upsamples an impulse signal 594 by α using an upsampling unit 596, filters the upsampled signal by using a root-raise-cosine (RRC) filter $RRC_{B,f_s}$ 598, in which B is the bandwidth and $f_s = \alpha B$ is the sample rate. One of the purposes of increasing the bit rate is that by oversampling, we can obtain the correct sample when there exists sample frequency offset between the transmitter and the receiver in the data transmission phase. Since the oversampling can be one of the steps in the data transmission phase, to estimate the channel correctly, we also include oversampling and downsampling in the channel probing phase. The value of α can be chosen by the user. For example, α can be chosen to be equal to 4, but can also be other values. The root-raised-cosine filter can perform pulse shaping to limit the bandwidth. In a heterogeneous time-reversal system, different types of devices may different bandwidths, so the bandwidths of the root-raised-cosine filters for the different types of devices are also different.

The filtered signal is converted to an analog baseband signal by a digital-to-analog converter (DAC) 600. The baseband signal is modulated to a high carrier frequency by a voltage-controlled oscillator (VCO) 602, then put through a bandpass filter 604 and amplified by a power amplifier 606 to produce a radio frequency (RF) signal. The RF signal is broadcasted by an antenna 608. The broadcast signal passes through a multipath channel 610 having a profile h, in which noise n' is added to the signal. The broadcast signal is captured by an antenna 612 at the access point 590. The captured signal is amplified by a low-noise amplifier (LNA) 614, filtered by a bandpass filter 616, and converted to the analog baseband signal using a voltage-controlled oscillator 618. The baseband signal is sampled by an analog-to-digital converter (ADC) 620 with a sample rate $f_s = \alpha B$ to produce a digital signal. The digital signal is filtered by a root-raised-cosine filter $RRC_{B,f_s}$ 622 and downsampled by a factor α by a downsampling unit 624. Because an impulse signal was transmitted by the terminal device 592, the downsampled signal is treated as a channel estimate ĥ 626.

The root-raised-cosine filter 598 is a digital filter, and the root-raised-cosine filter 622 is an analog filter, they both have the same bandwidth. The bandpass filter 604 defines the frequency band used by the terminal device 592. Thus, if the terminal device 592 includes a bandpass filter 604 having a passband from frequency f1 to frequency f2, we say that the terminal device 592 uses or is associated with the frequency band f1 to f2. In the example of FIG. 37, the passband of the bandpass filter 604 in the terminal device 592 is the same as the passband of the bandpass filter 616 in the access point 590.

The access point 590 can also be a base station or a transceiver that communicates with multiple other devices using the communication techniques described here.

With a sampling rate $f_s = \alpha B$, the discrete channel impulse response can be written as $$\bar{h}[n] = \sum_{v=1}^{V} h_v \delta[nT_2 - \tau_v],$$

where $T_s = 1/(\alpha B)$. Assume perfect channel estimation (noise and interference are ignored in the channel probing phase), the equivalent channel impulse response between two root-raised-cosine filters 598, 622 in FIG. 37 is written as $$\tilde{h} = (RRC_{B,f_s} * \bar{h} * RRC_{B,f_s}).$$

Figure 26:
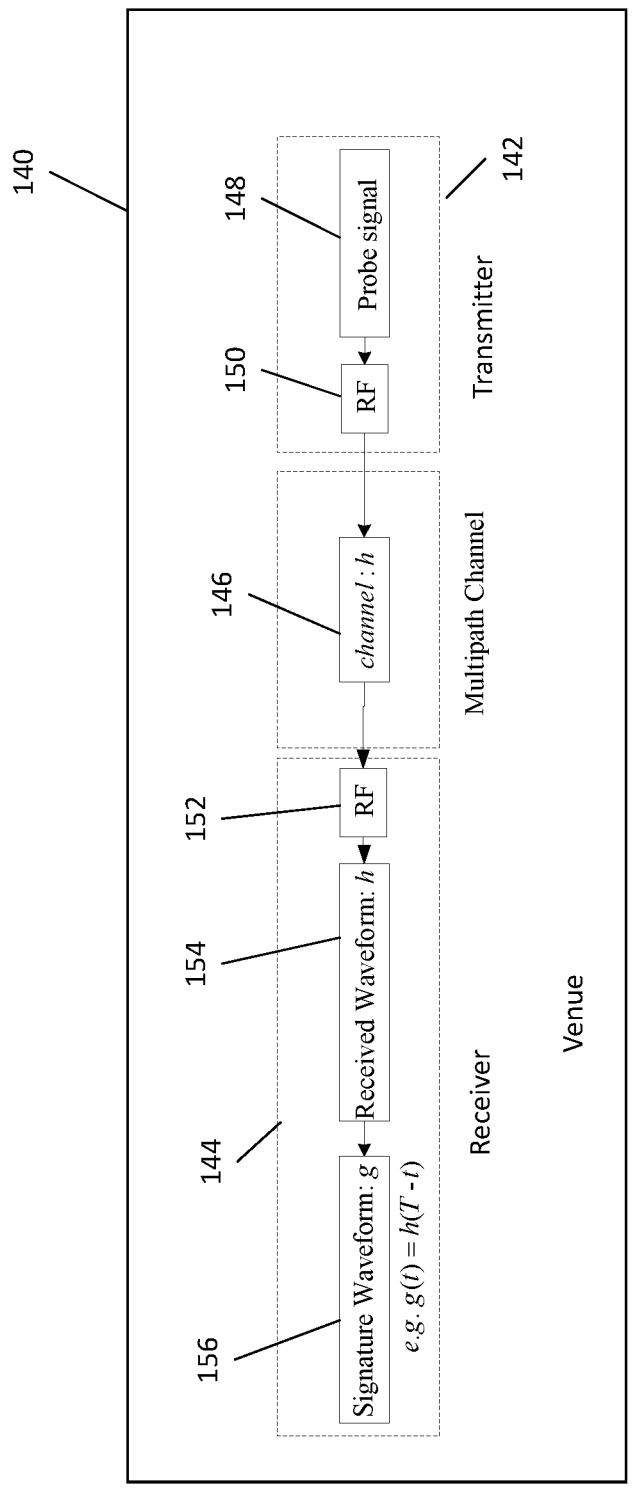
FIG. 26 is a diagram of a time-reversal wireless communication system during channel probing phase.

Referring to FIG. 26, in some implementations, in order to detect events in a venue 140, a transmitter 142 sends wireless signals to a receiver 144 through a multipath channel 146. The transmitter 142 generates a channel probing signal 148 and performs radio frequency modulation 150 to produce a radio frequency signal that propagates through the associated multi-path channel 146 to the receiver 144. The receiver 144 receives the transmitted radio frequency signal, performs radio frequency demodulation 152 to recover the unique channel response (waveform) 154 and records it. Upon receiving the channel response 154 associated with the transmitter 142, the receiver 144 calculates a signature waveform 156 for the transmitter 142 based on its channel response received at the receiver 144. The term "channel probing signal" depending on context may refer to the probe signal before radio frequency modulation or the signal after applying the radio frequency modulation. In some implementations, the transmitter 142 can be implemented in a manner similar to the device 592 of FIG. 37, and the receiver 144 can be implemented in a manner similar to the device 590 of FIG. 37.

The receiver 144 can use the channel probing signal 148 to estimate the channel response. To achieve this purpose, the receiver 144 needs to first synchronize with the channel probing signal by countering the multipath effect without the knowledge of channel information. The general channel probing signal includes two parts: preamble and possible confirmation bits. The receiver 144 synchronizes with the channel probing signal by extracting the underlying features of the preamble that are not corrupted by the multipath fading. The confirmation bits are then used to further validate the synchronization. Once the synchronization is achieved, the receiver 144 extracts the channel response from the received signal by using the information in the channel probing signal.

Two examples of handshaking methods for channel probing will be described later with FIGS. 27-34. The first method uses pulse position modulation, whereas the second method calculates the correlation of a pseudorandom sequence.

Time Reversal Parameter in Time Domain

Assume the channel state information representation in the time domain is denoted as a vector $h = [h[1], h[2], \ldots, h[L]]$, in which L is the number of taps of the channel state information. For example, h[1], h[2], h[L], etc., can be digital samples of the received probing signal. The sampling rate can be, e.g., 125 MHz (but other sampling rates can also be used). We define the strength of the spatial-temporal resonance, which is referred to as the "time reversal resonating strength (TRRS)," $\mathcal{TR}(h_1, h_2)$ between two channel state information samples $h_1$ and $h_2$ in the time domain as $$\mathcal{TR}(h_1, h_2) = \left( \frac{\max_i |(h_1 * g_2)[i]|}{\sqrt{\sum_{l=0}^{L-1} |h_1[l]|^2} \sqrt{\sum_{l=0}^{L-1} |h_2[l]|^2}} \right)^2, \quad \text{Equ. (1)}$$

where "*" denotes the convolution, l is the tap index, and $g_2$ is the TR signature of $h_2$ as, $$g_2[k] = h^*_2[L-k-1], k=0,1,\ldots,L-1. \quad \text{Equ. (2)}$$

A higher time reversal resonating strength between two channel state information samples $h_1$ and $h_2$ indicates a higher similarity between $h_1$ and $h_2$, whereas a lower time reversal resonating strength between the two channel state information samples $h_1$ and $h_2$ indicates a lower similarity between $h_1$ and $h_2$. If $h_1$ represents the channel state information that was measured at time t1 when the environment is at a particular state, and $h_2$ represents the channel state information that was measured at a later time t2, the time reversal resonating strength between $h_1$ and $h_2$ provides an indication of how similar the environment at time t2 is to the environment at time t1.

Channel impulse response (CIR) is the channel state information measured in time domain. The resonating strength defined in Equation (1) is similar to the definition of cross-correlation coefficient between $h_1$ and $h_2$, as the inner product of $h_1$ and $h^*_2$ is equivalent to $(h_1 * g_2)$ [L−1]. However, the numerator in Equation (1) is the maximal absolute value in the convolved sequence. The purpose of this step is to correct any possible random phase distortion between two channel state information estimations. The channel state information is usually affected by an initial phase distortion and a linear phase distortion. The initial phase distortion is usually caused by carrier frequency offset (CFO) and common phase offset (CPE). The linear phase distortion can be caused by symbol timing offset (STO) and sampling frequency offset (SFO). For example, the first several taps of the channel state information may be missed or added in different measurements, causing synchronization error between two channel state information estimations. After correcting the phase distortion in the channel state information estimation, the time reversal resonating strength is capable of capturing some or substantially all the similarities between channel impulse responses while maintaining its accuracy. Methods for correcting the phase distortion will be described in a later section of this document.

Time Reversal Parameter in Frequency Domain

At the receiver side, after each channel state sounding, we can collect a L×M raw channel state information matrix for each individual as $$H_i = [h^{(1)}, h^{(2)}, \ldots, h^{(M)}], \forall i, \quad \text{Equ. (3)}$$

where M is the number of links between the transmitter and the receiver and L is the number of available subcarriers in a channel frequency response (CFR). In this document, each transmitter can have one or more antennas, and each receiver can have one or more antennas. Each pair of transmitter antenna and receiver antenna corresponds to one communication link. Thus, for example, if the transmitter has three antennas and the receiver has two antennas, we say there are 3×2=6 links in this event detector system. The channel frequency response is the channel state information measured in frequency domain.

The strength of time-reversal spatial-temporal resonance (TRRS) $\mathcal{TR}(h_1, h_2)$ in frequency domain between two channel state information samples $h_1$ and $h_2$ is defined as $$\mathcal{TR}(h_1, h_2) = \frac{\max_\phi \left| \sum_k h_1[k] g_2[k] e^{jk\phi} \right|^2}{\left( \sum_{l=0}^{L-1} |h_1[l]|^2 \right) \left( \sum_{l=0}^{L-1} |h_2[l]|^2 \right)}. \quad \text{Equ. (4)}$$

Here, L is the length of channel state information vector, k is the subcarrier index, and $g_2$ is the time-reversal signature of $h_2$ obtained as, $$g_2[k] = h^*_2[k], k = 0, 1, \ldots, L-1. \quad \text{Equ. (5)}$$

In the numerator of Equation (4), the max-search operation over a linear phase component is performed to reduce or eliminate the random linear phase offset in an orthogonal frequency-division multiplexing (OFDM) based system, e.g., WiFi. The linear phase offset in the estimated channel state information comes from the sampling timing offset (STO) and sampling frequency offset (SFO) of the oscillators.

When comparing two estimated multipath profiles (channel impulse responses in time domain and channel frequency responses in frequency domain), they are first mapped into the time-reversal space where each of them is represented as one time-reversal signature. Then the time-reversal spatial-temporal resonating strength is a metric that quantifies the similarity between these two multipath profiles in the mapped time-reversal space.

Statistical Behavior of TRRS in Frequency Domain

If there is no phase offset in the estimated channel frequency responses after phase distortion correction, the time reversal resonating strength in Equation (4) for each link in a multiple-input, multiple-output (MIMO) system, can be calculated as:

$$\mathcal{TR}(h_0, h_1) = \frac{\left| \sum_{k=1}^{L} h^*_0[k] h_1[k] \right|^2}{\|h_0\|^2 \|h_1\|^2}, \quad \text{Equ. (6)}$$

where k is the index of subcarriers, L is the total number of subcarriers. According to the assumption on channel stationarity, if the channel frequency response (CFR) $h_0$ and $h_1$ come from the same location or the same state, we can model $h_1$ as $$h_1 = h_0 + n. \quad \text{Equ. (7)}$$

Here, n is the vector of Gaussian noise, and $$n \sim \mathcal{CN}\left(0, \frac{\sigma^2}{L} 1\right)$$

is a complex normal distribution, which enables $E[\|n\|^2] = \sigma^2$. L is the length of the channel frequency response.

Without loss of generality, we assume $\|h_0\|^2 = 1$, and then Equation (6) becomes $$\mathcal{TR}(h_0, h_1) = \frac{\left| \sum_k H^*_0[k](H_0[k] + n[k]) \right|^2}{\|h_0 + n\|^2} = \frac{|1 + h^H n|^2}{\|h_0 + n\|^2}. \quad \text{Equ. (8)}$$

Define a new metric γ as $$\gamma = 1 - \mathcal{TR}(h_0, h_1) = 1 - \frac{|1 + h^H n|^2}{\|h_0 + n\|^2} = \frac{\|n\|^2 - |h^H n|^2}{\|h_0 + n\|^2}. \quad \text{Equ. (9)}$$

According to the Cauchy-Schwarz inequality, $|h^H n|^2 \leq \|n\|^2 \|h\|^2 = \|n\|^2$ with equality holds if and only if n is a multiplier of h, which is rare to happen. We can assume, with probability almost 1, γ>0. By taking the logarithm on both sides of Equation (9), we have $$\ln(\gamma) = \ln(\|n\|^2 - |h^H n|^2) - \ln(\|h_0 + n\|^2). \quad \text{Equ. (10)}$$

Moreover, let us denote $$X = \frac{2L}{\sigma^2}\|n\|^2, Y = \frac{2L}{\sigma^2}|h^H n|^2 \text{ and } Z = \frac{2L}{\sigma^2}\|h_0 + n\|^2.$$

Then, it is possible to prove that $X \sim \chi^2(2L)$, $Y \sim \chi^2(2)$ and $$Z \sim \chi'^2_{2L}\left(\frac{2L}{\sigma^2}\right).$$

Here, $\chi^2(k)$ denotes a chi-squared distribution with k degrees of freedom, and $\chi'^2_k(\mu)$ denotes a noncentral chi-squared distribution with k degrees of freedom and noncentrality parameter $\mu$. By utilizing the statistics of X, Y, and Z, we can have $$E[\|n\|^2] = \sigma^2, \text{Var}[\|n\|^2] = \frac{\sigma^4}{L}, \quad \text{Equ. (11)}$$

$$E[|h^H n|^2] = \frac{\sigma^2}{L}, \text{Var}[|h^H n|^2] = \frac{\sigma^4}{L^2}, \quad \text{Equ. (12)}$$

$$E[\|h + n\|^2] = 1 + \sigma^2, \text{Var}[\|h + n\|^2] = \frac{\sigma^4 + 2\sigma^2}{L}. \quad \text{Equ. (13)}$$

Similar for X, Y and Z, we have $$E[X] = 2L, \text{Var}[X] = 4L, \quad \text{Equ. (14)}$$

$$E[Y] = 2, \text{Var}[Y] = 4, \quad \text{Equ. (15)}$$

$$E[Z] = 2L + \frac{2L}{\sigma^2}, \text{Var}[Z] = 4L + \frac{8L}{\sigma^2}. \quad \text{Equ. (16)}$$

According to the statistics of $|h^H n|^2$ in Equation (11), it is reasonable to have the following approximation as $$\|n\|^2 - |h^H n|^2 \simeq \|n\|^2 - \frac{\sigma^2}{L},$$

because the mean square error of approximation is equal to the variance $$\text{Var}[|h^H n|^2] = \frac{\sigma^4}{L^2} \to 0.$$

Then Equation (10) becomes $$\ln(\gamma) \simeq \ln\left(\|n\|^2 - \frac{\sigma^2}{L}\right) - \ln(\|h_0 + n\|^2) \quad \text{Equ. (17)}$$

$$= \ln\left(\frac{\sigma^2}{2L}X - \frac{\sigma^2}{L}\right) - \ln\left(\frac{\sigma^2}{2L}Z\right)$$

$$= \ln(\sigma^2) + \ln\left(\frac{1}{2L}X - \frac{1}{L}\right) - \ln\left(\frac{\sigma^2}{2L}Z\right).$$

Since $X \sim \chi^2(2L)$, and $$Z \sim \chi'^2_{2L}\left(\frac{2L}{\sigma^2}\right),$$

both $$\frac{1}{2L}X - \frac{1}{L} \text{ and } \frac{\sigma^2}{2L}Z$$

are concentrated around 1 with small variances and high probabilities. By utilizing the linear approximation of logarithm, i.e., $\ln(x+1) \simeq x$ when x is small, we can approximate Equation (17) as $$\ln(\gamma) \simeq \ln(\sigma^2) + \ln\left(\frac{1}{2L}X - \frac{1}{L}\right) - \ln\left(\frac{\sigma^2}{2L}Z\right) \quad \text{Equ. (18)}$$

$$\simeq \ln(\sigma^2) + \left(\frac{1}{2L}X - \frac{1}{L} - 1\right) - \left(\frac{\sigma^2}{2L}Z - 1\right)$$

$$= \ln(\sigma^2) - \frac{1}{L} + \frac{1}{2L}(X - \sigma^2 Z).$$

Referring to the definition of X and Z, the summation term in Equation (18) can be decomposed as $$X - \sigma^2 Z = \frac{2L}{\sigma^2}\|n\|^2 + 2L\|h_0 + n\|^2 = \sum_{i=1}^{2L} W_i. \quad \text{Equ. (19)}$$

Here $W_i$ is defined as $$W_i = \begin{cases} w_i^2 - \left(\sqrt{2L}\,\text{Re}\{H_0[i/2]\} + \sigma w_i\right)^2, & \text{if } \text{mod}(i, 2) == 0 \\ w_i^2 - \left(\sqrt{2L}\,\text{Im}\{H_0[i/2]\} + \sigma w_i\right)^2, & \text{otherwise} \end{cases}, \quad \text{Equ. (20)}$$

where $w_i \sim \mathcal{N}(0,1)$, which is independent and identically distributed among all i. $W_i$, as a function of independent random variables, is independent of each other. The mean and variance behavior of $W_i$ are shown in Equations (21) and (22), respectively.

$$E[W_i] = \begin{cases} 1 - 2L\text{Re}\{H_0[i/2]\}^2 - \sigma^2, & \text{if } \text{mod}(i, 2) == 0 \\ 1 - 2L\text{Im}\{H_0[i/2]\}^2 - \sigma^2, & \text{otherwise} \end{cases}. \quad \text{Equ. (21)}$$

$$\text{Var}[W_i] = \quad \text{Equ. (22)}$$
$$\begin{cases} 2(1 + \sigma^4 + (2L\text{Re}\{H_0[i/2]\}^2 - 1)\sigma^2), & \text{if } \text{mod}(i, 2) == 0 \\ 2(1 + \sigma^4 + (2L\text{Im}\{H_0[i/2]\}^2 - 1)\sigma^2), & \text{otherwise} \end{cases}.$$

According to the Central Limit Theorem, suppose $\{X_1, X_2, \ldots\}$ is a sequence of independent random variables, each with finite expected value $\mu_i$ and variance $\sigma_i^2$, $\forall i$. Then $$\frac{\sum_i^N (X_i - \mu_i)}{\sqrt{\sum_i^N \sigma_i^2}} \sim \mathcal{N}(0, 1), \text{ as } N \to \infty. \quad \text{Equ. (23)}$$

In some examples, L has an order of magnitude 2, we assume that it is large enough for $\Sigma_i^{2L} W_i$ to have the asymptotical statistical behavior. Then by substituting Equations (21) and (22) into Equation (23) and considering $\|h_0\|^2 = 1$, we have $$S_{2L} = \frac{\sum_{i}^{2L} W_i + 2L\sigma^2}{\sqrt{4L(1+\sigma^4)}} \sim \mathcal{N}(0,1) \qquad \text{Equ. (24)}$$

After substituting Equation (24) into Equation (18), we obtain $$\ln(\gamma) \simeq \ln(\sigma^2) - \frac{1}{L} + \frac{1}{2L}\sum_{i=1}^{2L} W_i \qquad \text{Equ. (25)}$$

$$= \ln(\sigma^2) - \frac{1}{L} + \frac{\sqrt{4L(1+\sigma^4)}}{2L}\left(\frac{\sum_{i=1}^{2L} W_i + 2L\sigma^2}{\sqrt{4L(1+\sigma^4)}}\right) - \sigma^2$$

$$= \ln(\sigma^2) - \frac{1}{L} - \sigma^2 + \frac{\sqrt{4L(1+\sigma^4)}}{2L} S_{2L}$$

$$\sim \mathcal{N}\left(\ln(\sigma^2) - \frac{1}{L} - \sigma^2, \frac{1+\sigma^4}{L}\right) \qquad \text{Equ. (26)}$$

Hence, the $\gamma$ parameter, defined as $1 - \mathcal{TR}(h_0, h_1)$ when $h_0$ and $h_1$ belong to the same multipath profile, is a random variable under the log-normal distribution with the location parameter $$\mu_{logn} = \ln(\sigma^2) - \frac{1}{L} - \sigma^2$$

and the scale parameter $$\sigma_{logn} = \sqrt{\frac{1+\sigma^4}{L}}.$$

Time Reversal Event Detector: Baseline Method
Phase I. Offline Training

A time reversal event detector (TRED) leverages the unique indoor multipath profile and time-reversal technique to distinguish and detect events, e.g., indoor events. During the offline training phase, the multipath profiles of any target events are collected and the corresponding time-reversal signatures in the time-reversal space are stored in a database. However, due to noise and channel fading, the channel state information from a specific state may slightly change over time. To counter this type of variations, for each state, several instantaneous channel state information samples are collected to build the training set.

In essence, the event detector uses classification. Classification is to identify to which of a set of categories/classes a new observation belongs, on the basis of the training set of data containing observations whose category membership is known. A process or algorithm that implements classification, especially in a concrete implementation, is known as a classifier. An example would be assigning a given e-mail into spam or non-spam classes, or assigning a diagnosis to a given patient as described by observed characteristics of the patient based on presence of certain symptoms, etc. Often, the individual observations are analyzed into a set of quantifiable properties, also known as features. In some examples, the features can be categorical, ordinal, integer-valued, or real-valued. In other examples, the classifier work by comparing observations to previous observations by use of a similarity or distance function. In yet another example, the classifier sometimes also refers to the mathematical function, implemented by a classification algorithm, that maps input data to a category. After a decision is made by the classifier and confirmed to be a correct decision, the observations later collected can be added to the previous observations with which the classifier/feature can be retrained.

In the disclosed event detector, the training set contains estimated CSIs from the received probing signal collected under each given and known event. In the baseline method, the event detector compares the estimated CSI obtained in monitoring phase to observations in training phase by means of the TRRS, which can be viewed as a similarity score. After a decision on the event detection is made and confirmed to be a correct detection, the CSI collected in the monitoring phase can be added to the database with which the feature can be retrained.

Specifically, for each state $S_i \in \mathcal{S}$ with $\mathcal{S}$ being the state set, the corresponding time-domain training channel state information, i.e., channel impulse response, is estimated and forms a $H_i$ as, $$H_i = [h_{i,t_0}, h_{i,t_1}, \ldots, h_{i,t_{N-1}}], \qquad \text{Equ. (27)}$$

where N is the size of the channel state information samples for a training state. $h_{i,t_j}$ represents the estimated channel state information vector of state $S_i$ at time $t_j$, and $H_i$ is named as the channel state information matrix for state $S_i$. The corresponding time-reversal signature matrix $G_i$ can be obtained by time-reversing the conjugated version of $H_i$ as:

$$G_i = [g_{i,t_0}, g_{i,t_1}, \ldots, g_{i,t_{N-1}}], \text{Equ. (28)}$$

where the time-reversal signature $g_{i,t_j}[k] = h^*_{i,t_j}[L-k]$. Here, the superscript * on a vector variable represents the conjugate operator. L denotes the length of a channel state information vectors and k is the index of time-domain taps in the channel state information. Then the training database $\mathcal{G}$ is the collection of $G_i$'s.

Phase II Online Monitoring

After constructing the training database $\mathcal{G}$, the time reversal event detector is ready for events detection. During the monitoring phase, the receiver keeps matching the current estimated channel state information to the time-reversal signatures in $\mathcal{G}$ to find the one that yields the strongest time-reversal spatial-temporal resonance. The time reversal resonating strength between the unknown monitoring channel state information $\tilde{H}$ and samples in state $S_i$ is defined as $$\mathcal{TR}_{S_i}(\tilde{H}) = \max_{\tilde{h} \in \tilde{H}} \max_{h_i \in H_i} \mathcal{TR}(\tilde{h}, h_i), \qquad \text{Equ. (29)}$$

where $\tilde{H}$ is a group of M channel state information samples assumed to be drawn from the same state at different times, i.e., $\tilde{H} = [\tilde{h}_{t_0}, \tilde{h}_{t_1}, \ldots, \tilde{h}_{t_{M-1}}]$.

Once we obtain the time reversal resonating strength for each training event, the most possible state for the monitoring channel state information matrix $\tilde{H}$ is the most similar event defined as $$S^* = \underset{S_i \in \mathcal{S}}{\arg\max}\, \mathcal{TR}_{S_i}(\tilde{H}), \qquad \text{Equ. (30)}$$

The superscript * on S denotes the optimal.

Besides finding the most possible state S* by comparing the time-reversal spatial-temporal resonances, the time reversal event detector adopts a threshold-trigger mechanism to avoid false alarms in that it only reports a change of states to S* if the time reversal resonating strength $\mathcal{TR}_S^*(\tilde{H})$ exceeds a predefined threshold $\gamma_0$ as shown in Equation (31).

$$\hat{S} = \begin{cases} S^*, & \text{if } \mathcal{TR}_{S^*}(\tilde{H}) \geq \gamma_0, \\ 0, & \text{otherwise}, \end{cases} \qquad \text{Equ. (31)}$$

where $\hat{S}=0$ means that the time reversal event detector is not triggered by any trained states in $\mathcal{S}$. According to the detection rule described above, a false alarm for state $S_i$ happens whenever a channel state information measurement is detected as $\hat{S}=S_i$ when its true state is not.

Experiment Results of Baseline Method

Experiments were conducted using the baseline method. The detailed setup is shown in the floorplan 220 in FIG. 2A in which different dotted marks represent different locations for the transmitters (TX) and the receivers (RX). During the experiments, we are detecting the open/close states of multiple wooden doors labeled as D1 to D8. Each location of the transmitter, marked as round dots (e.g., 222a, 222b, 222c, 222d) are separated by 1 meter, whereas the candidate locations for the receiver are marked as stars (e.g., 224a and 224b). The TX-RX locations include both line-of-sight (LOS) and non-line-of-sight (NLOS) transmissions.

We first study the performance of the time reversal event detector in detecting multiple indoor events. Moreover, the performance comparison between the received signal strength indicator (RSSI)-based indoor detecting approach and the time reversal event detector is further investigated. The received signal strength indicator is a scalar that represents the signal energy received at the receiver. When a wireless signal travels over the air, it will encounter different objects that generate multiple altered copies of the transmitted signal. Moreover, during the transmission, different transmit signals are subject to different attenuations in response to the indoor environment. Thus, each snapshot of an indoor environment, i.e., each indoor event, may correspond to a different received signal strength indicator value, which can be used to recognize different indoor events. In the training phase, a system collects received signal strength indicators for different interested indoor events and stores them in a database. The classifier that utilizes the received signal strength indicators to classify indoor events is based on the nearest neighbor method, in which the received signal strength indicators from the environment being monitored is compared with the received signal strength indicators of all the indoor events collected in the training phase. The decision on the indoor event detection is made by finding the stored received signal strength indicators that most closely match the received signal strength indicators from the environment being monitored.

In the experiment using received signal strength indicator-based approach, the receiver is placed on either location B (224a) or location C (224b), whereas the locations of the transmitter are represented by the dots (222a-222d) that are separated by 1 meter from the most left one, named by "axis 1" to "axis 4" respectively. In total, we have 2 receiver locations and 4 transmitter locations, i.e., 8 TX-RX pairs. The objective of the time reversal event detector is to detect which wooden doors among D1 to D8 is closed while all the other doors are open.

TABLE 1

State list for the time reversal event detector to detect.

| State index | Description |
|---|---|
| $S_1$ | All the doors are open. |
| $S_{i+1}$ | Door Di close and the others open, $\forall i = 1, 2, \ldots, 8$. |

The overall false alarm rate and the detection rate for the time reversal event detector and the received signal strength indicator-based approach are shown in the Tables 2 and 3.

TABLE 2

False alarm and detection probability for multi-event detection of the time reversal event detector in a normal working environment (transmitter placed at location B).

| LOC B | axis 1 | axis 2 | axis 3 | axis 4 |
|---|---|---|---|---|
| Detection Rate TRED (%) | 96.92 | 98.95 | 99.23 | 99.4 |
| False Alarm TRED (%) | 3.08 | 1.05 | 0.77 | 0.6 |
| Detection Rate RSSI (%) | 92.5 | 94.16 | 94.77 | 95.36 |
| False Alarm RSSI (%) | 7.5 | 5.84 | 5.23 | 4.64 |

TABLE 3

False alarm and detection probability for multi-event detection of the time reversal event detector in a normal working environment (transmitter placed at location C).

| LOC C | axis 1 | axis 2 | axis 3 | axis 4 |
|---|---|---|---|---|
| Detection Rate TRED (%) | 97.89 | 98.94 | 99.18 | 99.36 |
| False Alarm TRED (%) | 2.11 | 1.06 | 0.82 | 0.64 |
| Detection Rate RSSI (%) | 96.73 | 97.19 | 97.35 | 97.43 |
| False Alarm RSSI (%) | 3.27 | 2.81 | 2.65 | 2.57 |

The performance for the time reversal event detector is superior to that of the received signal strength indicator-based approach in both line-of-sight and non-line-of-sight cases, by achieving a better detection rate and a lower false alarm rate. The time reversal event detector can obtain a detection rate higher than 96.92% and a false alarm smaller than 3.08% under the non-line-of-sight case, and obtain a detection rate higher than 97.89% and a false alarm smaller than 2.11% under the line-of-sight case. Moreover, as the distance between the receiver and the transmitter increases, the accuracy of both methods improves.

Referring to FIG. 2B, to investigate the effects of human movements on the time reversal event detector, we conducted experiments with none, one, and two individuals continously moving back and forth in a region shown as a shaded area 230 in the figure. Meanwhile, the transmitter is put at the location represented by a circle mark 232 and the receiver is at the location represented by a hexagon mark 234, detecting the states of two adjacent doors labeled as "D1" and "D2" as listed in Table 4.

Interference introduced by human movements alters multipath propagations and brings in variations over the time reversal resonating strengths during the monitoring phase of time reversal event detector. When humans move around in a venue, the introduced interference continues to change and the duration for each interference is short. To address the effects of the burst variations in the time reversal resonating strengths, we adopt the "majority vote" method combined with a "sliding window" to smooth out the detection results over time. Suppose we have the previous K−1 outputs $S^*_k$, k=t−K+1, . . . ,t−1 and the current result $S^*_t$, then the decision for time stamp t is made by voting over all $S^*_k$, k=t−K+1, . . . , t. K denotes the size of the sliding window for smoothing. The event having the highest number of votes among the K outputs $S^*_k$ is selected as the event for time stamp t.

For example, suppose K=11 and the set of 11 outputs $S^*_k$, k=t−10, . . . , t, of the time reversal event detector is {E1, E1, E2, E1, E1, E2, E2, E2, E2, E1, E2}. In this example, 5 outputs correspond to the event E1 and 6 outputs correspond to the event E2, the event E2 will be selected as the event for time stamp t. Suppose at time stamp t+3, the set of 11 outputs $S^*_k$, k=t−7, . . . , t−3, of the time reversal event detector is {E1, E1, E2, E2, E2, E2, E1, E2, E1, E1, E1}. In this example, 6 outputs correspond to the event E1 and 5 outputs correspond to the event E2, so the event E1 will be selected as the event for time stamp t+3.

TABLE 4

State list for study on human movements.

| State | 00 | 01 | 10 | 11 |
|---|---|---|---|---|
| D1 | Open | Open | Close | Close |
| D2 | Open | Close | Open | Close |

TABLE 5

Accuracy under human motions (HM).

| Experiment | No HM | One HM | Two HM |
|---|---|---|---|
| No Smoothing | 97.75% | 87.25% | 79.58% |
| With Smoothing | 98.07% | 94.37% | 88.33% |

In Table 5, we compare the average accuracy for the time reversal event detector with or without the smoothing algorithm in the absence of human movements (HM), and in the presence of persistent human movements intentionally performed by one individual and two individuals. Here, the length of the sliding window is K=20, which represents a duration of 0.1 second. First of all, the accuracy of the time reversal event detector decreases as the number of individuals that perform persistent movements near the location of the indoor events, the transmitter and the receiver increases. Moreover, the adopted smoothing algorithm improves the robustness of the time reversal event detector to human movements and enhances the accuracy by 7% to 9% compared with that without smoothing. Meanwhile, during the experiments, we also find that the most vulnerable state is state "00" (see Table 4) in which all of the doors are open, in that with human movements, the time reversal event detector is more likely to produce a false alarm of "door closed" than other states. The reason is that as human moves near the door location, the human body, viewed as a severe obstruction at the door location, is similar to a closed wooden door, and hence the changes in the multipath channel state information are similar to "door closed."

Time Reversal Event Detector: Statistical Approach

In some implementations, the event detector is designed to detect the happening of indoor events, e.g., no door open, front door open, etc. In this part, the details of statistics based event detector are disclosed. The statistics based event monitoring system (or guard system) has two operation phases: offline training and online learning. The training set includes estimated CSIs from the received probing signal collected under each given and known event, from which a statistical distribution on a function of the time reversal resonating strength for each event is calculated. In the online monitoring phase, a probability feature using collected CSIs under an unknown event is extracted and the unknown event is classified to one of the known events. After a decision on the event detection is made and confirmed to be a correct detection, the channel state information collected in the monitoring phase can be added to the training set with which the feature can be retrained.

Phase I. Offline Training

Figure 19:
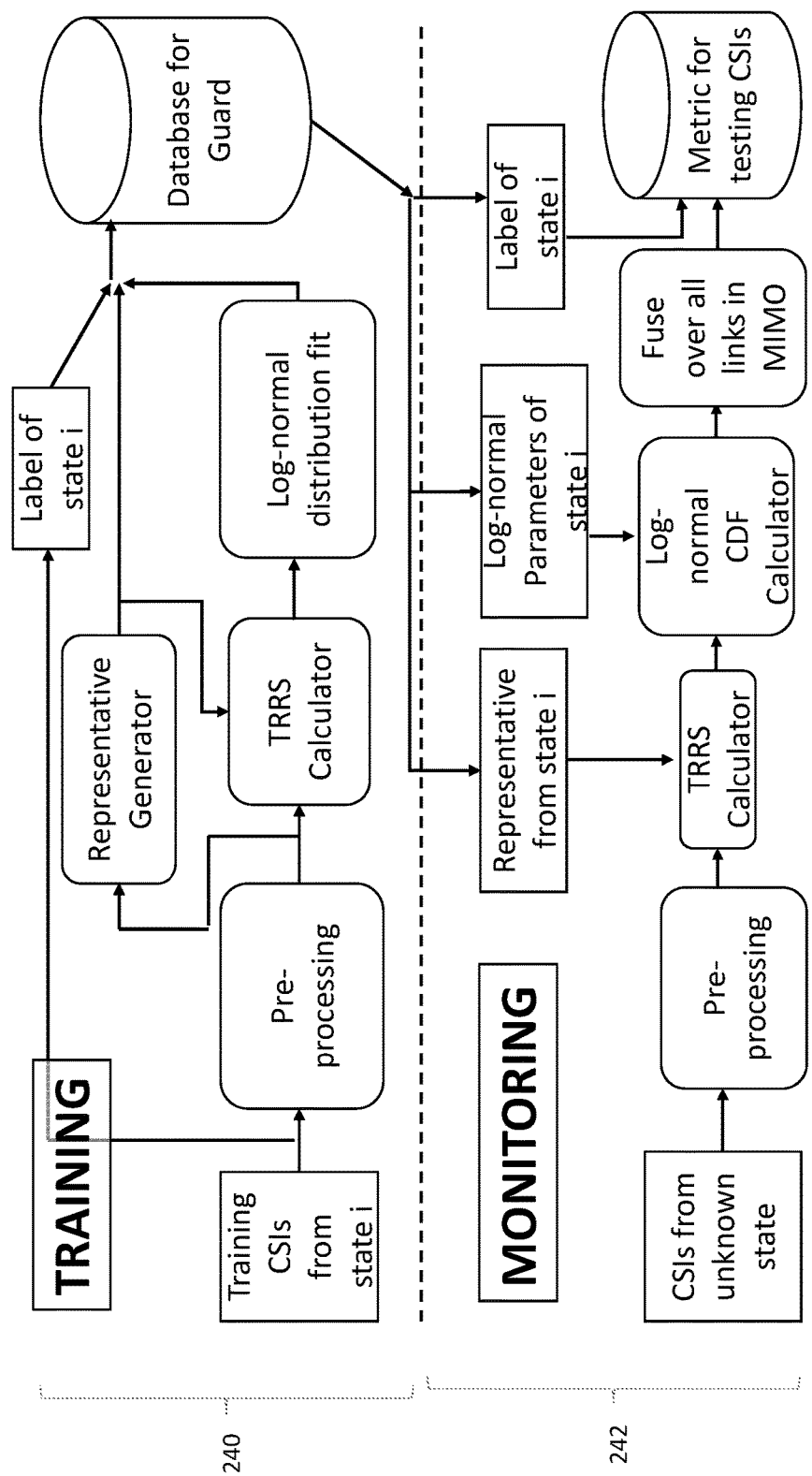
FIG. 19 shows an exemplary diagram showing the time reversal monitoring system using statistics-modelling-based approach Part I.

Referring to FIG. 19, in the offline training phase 240, the event monitoring system aims to build the log-normal distribution model of time reversal resonating strengths between channel frequency responses collected from the same event profile for each of the indoor events to be monitored.

Specifically, for each indoor event $S_i \in \mathcal{S}$ with $\mathcal{S}$ being the set of indoor events including normal events and abnormal events, the corresponding frequency domain channel frequency responses are obtained and estimated at the receiver side as, $$H_i = [h_i^{(1)}, h_i^{(2)}, \ldots, h_i^{(M)}], i=1, 2, \ldots, N \qquad \text{Equ. (32)}$$

where N is the size of $\mathcal{S}$, M is the number of links between the transmitter and the receiver, and the dimension of $H_i$ is L×M. M is the product of the number of transmitter antennas and the number of receiver antennas. Here, the term "normal events" refers to the events that the user/environment considers to be normal and that it is not necessary to generate an alarm. The term "abnormal events" refers to the events that the user/environment considers to be unusal or abnormal and that it is necessary to generate an alarm.

In some implementations, in order to learn the statistics of intra-class time reversal resonating strength, at least 300 realizations of $H_i$ are collected. Once we collect enough samples of channel state information for an indoor event $S_i$, then the statistics are estimated using the following steps.

Phase offset calibration: Due to the random linear phase offset in each realization of the channel state information, some phase calibration method is applied to align all the realizations and then the time reversal resonating strength can be calculated using Equ. (6).

CSI representative generator: For each link and for every indoor event in the training set, a channel state information representative is found in this step such that it is the one most similar to all other channel frequency responses from the same indoor event. The pair-wise time reversal resonating strengths for link m between all the realizations collected for indoor event $S_i$ are calculated first. Since the time reversal resonating strength can be used to quantify the similarity between different channel frequency responses, the channel frequency response is selected as the channel state information representative for link m event $S_i$, which has the largest number of the time reversal resonating strengths between itself and all other channel frequency responses on link m in event $S_i$ that exceed a predefined similarity threshold. Repeat for all links and all indoor events. Then, all the channel state information representatives form a collection as $$\mathcal{H}_{rep} = \{H_{rep,1}, H_{rep,2}, \ldots, H_{rep,N}\}, \qquad \text{Equ. (33)}$$

$$H_{rep,i} = [h_{rep,i}^{(1)}, h_{rep,i}^{(2)}, \ldots, h_{rep,i}^{(M)}] \qquad \text{Equ. (34)}$$
$$= [h_i^{(1)}(n_1), h_i^{(2)}(n_2), \ldots, h_i^{(M)}(n_M)],$$
$$i = 1, 2, \ldots, N,$$

where $h_i^{(l)}(n_1)$ denotes the channel frequency response of event $S_i$ on link l from the $n_j^{th}$ realization. $n_j$, l=1,2, ..., M is the realization index which may be different for all l and i in $H_{rep,i}$.

Lognormal parameter estimation: Once the channel state information representatives are found for all events all links in the multiple-input, multiple-output system, the log-normal distribution parameters can be estimated. For link m and event $S_i$, the time reversal resonating strengths between the channel state information representative $h_{rep,i}^{(m)}$ and all other realizations $h_i^{(m)}(l)$ are calculated using (6) and denoted as $$\mathcal{TR}_i^{(m)}(l) = \mathcal{TR}(h_{rep,i}^{(m)}, h_i^{(m)}(l)), l=1,2, \ldots, Z-1. \qquad \text{Equ. (35)}$$

Then the log-normal parameters, i.e., the location parameter and the scale parameter $(\mu_i^{(m)}, \sigma_i^{(m)})$, of $1-\mathcal{TR}_i^{(m)}$ for event $S_i$ on link m are estimated by:

$$\mu_i^{(m)} = \frac{1}{Z-1} \sum_{l=1}^{Z-1} \ln(1 - \mathcal{TR}_i^{(m)}(l)), \qquad \text{Equ. (36)}$$

$$\sigma_i^{(m)} = \sqrt{\text{Var}[\ln(1 - \mathcal{TR}_i^{(m)})]}, \qquad \text{Equ. (37)}$$

where Z is the total number of realizations collected for event $S_i$ on link m. Var[.] is the sample variance function. Repeat for all links and all indoor events and then all the log-normal distribution parameters form a collection as $$\mathcal{Q}_{rep} = \{\mathcal{Q}_{rep,1}, \mathcal{Q}_{rep,2}, \ldots, \mathcal{Q}_{rep,N}\}, \qquad \text{Equ. (38)}$$

$$\mathcal{Q}_{rep,i} = \{(\mu_i^{(1)}, \sigma_i^{(1)}), (\mu_i^{(2)}, \sigma_i^{(2)}), \ldots, (\mu_i^{(M)}, \sigma_i^{(M)})\},$$
$$i=1,2,\ldots,N. \qquad \text{Equ. (39)}$$

At the end of the training, the training database is built by including the collection of channel state information representatives $\mathcal{H}_{rep}$ and the collection of log-normal distribution parameters $\mathcal{Q}_{rep}$ for all the trained events. All the trained events can be divided into two groups: normal events $\mathcal{S}_{normal}$ in which no alarm will be generated, and abnormal events $\mathcal{S}_{abnormal}$ in which an alarm should be reported to the user when an abnormal event is detected.

Phase II: Online Monitoring

Figure 20:
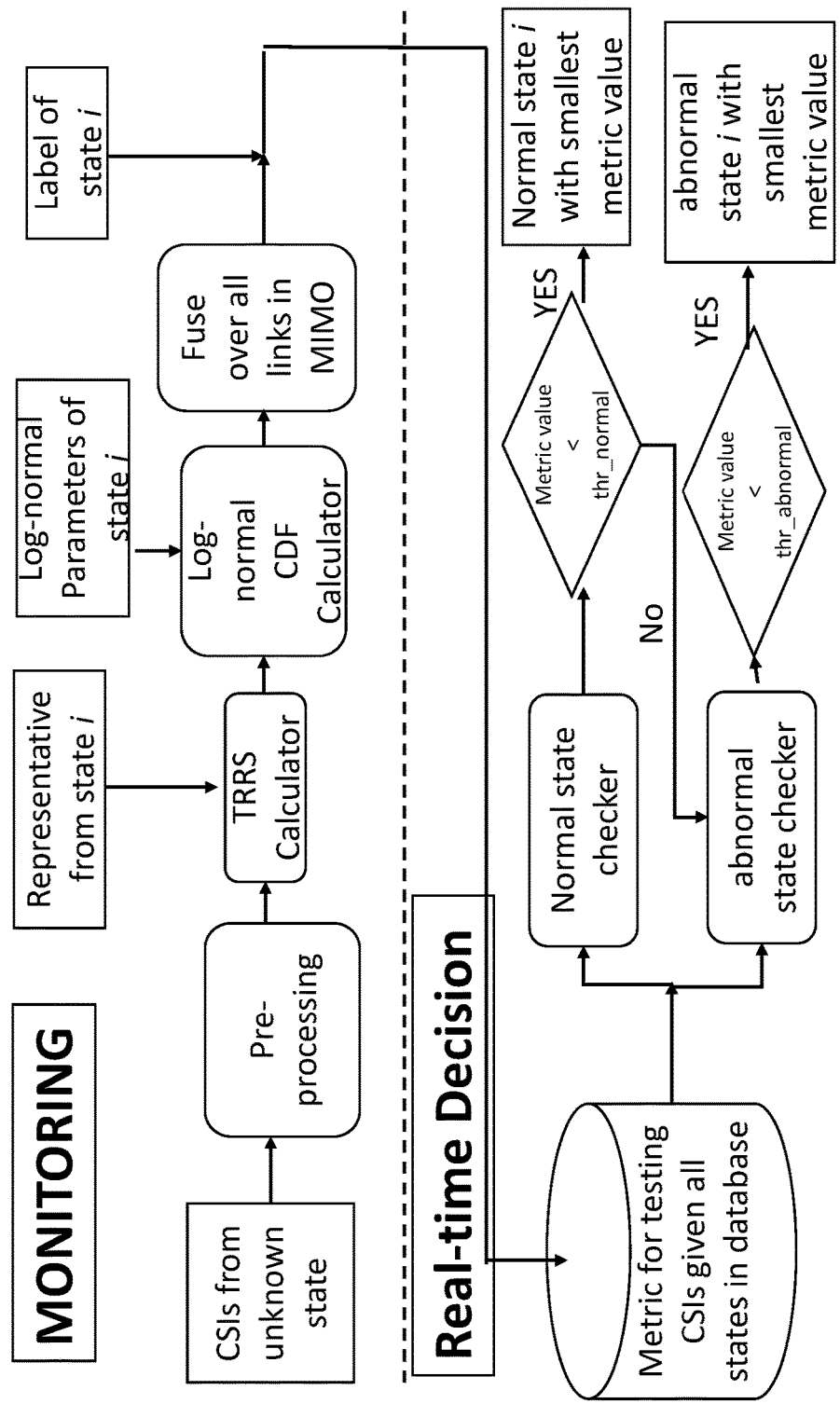
FIG. 20 shows an exemplary diagram showing the time reversal monitoring system based using statistics-modelling-based approach Part II.

During the monitoring phase, as shown in FIGS. 19 and 20, the receiver continues to collect channel state information from the unknown event as $H_{test}=[h_{test}^{(1)}, h_{test}^{(2)}, \ldots, h_{test}^{(M)}]$. The statistics based event detector will find the event in the training database that is most similar to the unknown monitored channel state information by calculating and evaluating the statistical metric. Here, the term "monitored channel state information" or "testing channel state information" refers to the channel state information that is collected during the monitoring phase. The detailed step is listed as follows.

TRRS calculation: Since the obtained channel state information measurement $H_{test}$ is corrupted by phase offset, the same phase calibration algorithm used in the training phase has to be applied to the obtained channel state information measurement $H_{test}$ first to remove the random phase offset.

Then, for each trained indoor event, the time reversal resonating strength between the channel state information representative and the monitoring measurement is calculated for every link by Equation (6) and denoted as:

$$\mathcal{TR}_{i,test}^{(m)} = \mathcal{TR}(h_{rep,i}^{(m)}, h_{test}^{(m)}), \forall i, \qquad \text{Equ. (40)}$$

Statistical metric calculation: Once the time reversal resonating strengths are obtained, the statistical metric between $H_{test}$ and all the trained event $S_i$ is calculated as:

$$\mathcal{W}_{i,test} = \Pi_{m=1}^M F_{(\mu_i^{(m)}, \sigma_i^{(m)})}(1 - \mathcal{TR}_{i,test}^{(m)}), \forall i, \qquad \text{Equ. (41)}$$

where $F_{(\mu, \sigma)}(x)$ is the cumulative distribution function (CDF) of log-normal distribution with parameters $(\mu, \sigma)$ and the variable x. As the function $F_{(\mu, \sigma)}(x)$ is a cumulative distribution function with argument x and parameter $(\mu, \sigma)$, it increases with x. A larger x indicates a higher $F_{(\mu, \sigma)}(x)$, and vice versa. Therefore, a larger $\mathcal{W}_{i,test}$ indicates a smaller set of $\mathcal{TR}_{i,test}^{(m)}$, meaning a smaller similarity between the monitored channel state information and the channel state information of the trained event $S_i$, and thus a smaller chance that the monitored channel state information of the unknown event belongs to the trained event Si. So, this statistical metric reflects how unlikely the monitored channel state information from the unknown event belongs to some trained event $S_i$.

Decision: The proposed statistics based event detector makes decisions over the monitoring channel state information measurement with the help a two-phase state checker. The details are as follows.

(a) Phase 1—normal state checker: In order to detect if the environment is normal (i.e., only one of the normal events happens) or abnormal (i.e., the current environment state does not belong to any trained normal events), the metric value $\mathcal{W}_{normal,test}$ is used to compare with a predefined threshold $\gamma_{normal}$. Here, $$\mathcal{W}_{normal,test} = \arg \min_{S_i \in S_{normal}} \mathcal{W}_{i,test}. \qquad \text{Equ. (42)}$$

When $\mathcal{W}_{normal,test} < \gamma_{normal}$, the decision of system over the monitoring channel state information measurement $D_{test}$=normal and the decision procedure terminates. Otherwise, the decision procedure jumps to the next phase: abnormal state checker.

(b) Phase 2—abnormal state checker: In this step, since some event happens in the indoor environment during the time when $H_{test}$ is collected, the objective is to find out which trained abnormal event is happening. Hence, the metric value $\mathcal{W}_{abnormal,test}$ is used to compare with a predefined threshold $\gamma_{abnormal}$. Here, $$\mathcal{W}_{abnormal,test} = \arg \min_{S_i \in S_{abnormal}} \mathcal{W}_{i,test}. \qquad \text{Equ. (43)}$$

Then the decision of the system for the monitoring time is made based on $\mathcal{W}_{abnormal,test}$ in Equation (43) as $$D_{test} = \begin{cases} S_i, & \text{if } \mathcal{W}_{i,test} = \mathcal{W}_{abnormal,test} \leq \gamma_{abnormal}, S_i \in \mathcal{S}_{abnormal} \\ 0, & \text{otherwise} \end{cases}, \qquad \text{Equ. (44)}$$

$D_{test}$=0 indicates that some abnormal event that has not been trained during the training phase is happening.

Experimental Results of Statistical Approach:

Referring to FIG. 3, experiments ware conducted in a single house, in which the floor plan 250 is shown in the figure. On the floor plan 250, the statuses of doors and windows marked with arrows in the floorplan 250 is monitored by the statistics based event detector. In the test house, given the receiver location 252, two transmitter locations 254a, 254b are tested and evaluated in which one transmitter location 254a is in the front door area and the other transmitter location 254b is in the kitchen.

TABLE 6

State list of events.

| State Index | Details | State Index | Details |
|---|---|---|---|
| e0 | Unknown abnormal events. | e1 | All doors are closed. |
| e2 | Front door opens. | e3 | Back door opens. |
| e4 | Bob's room door opens. | e5 | Alice's room door opens. |
| e6 | Master bedroom door opens. | e7 | Study room door opens. |
| e8 | Front window opens. | e9 | Alice's room window open. |

The receiver operating characteristics (ROC) performance is evaluated on both locations 254a, 254b of the transmitter. In configuration I, the transmitter is placed at location 254a. In configuration II, the transmitter is placed at location 254b. FIGS. 4A and 4B are graphs 260 and 270 that show the receiver operating characteristics curve plots, which represent the tradeoff between the detection rate and the false alarm rate. The detection rate is the percentage of monitoring samples from class i that are correctly classified whereas the false alarm rate is the percentage of monitoring samples outside of class i that is classified as class i.

In the first configuration where the transmitter is in the front door area 254a and the receiver is placed inside Alice's room 252, when all the events are included in the training database, the receiver operating characteristics performance is not perfect in that event e7 study room door 256 can not be distinguished from e1 as shown in the graph 270 of FIG. 4B. The reason is that when the event e7 is too far away from the transmitter and the receiver, the multipath change introduced by the event e7 is too small to separate the event e7 from the event e1 in which all doors are closed. When faraway events are taken out from the training database, the receiver operating characteristics performance is perfect as shown in the graph 260 of FIG. 4A. In general, in order to have a good monitoring performance, the object or objects (e.g., door(s) or window(s)) being monitored for the events should either have a line-of-sight path to at least one of the transmitter or the receiver, or be positioned near the link between transmitter and the receiver. We will refer to the above criteria as the "criteria for good monitoring performance." In configuration I, all events except e6 and e7 satisfy the criteria for good monitoring performance.

Similar to results in configuration I, for configuration II, all the target events except e2, e8 and e9 meet the criteria for good monitoring performance. For target events that meet the criteria for good monitoring performance, the system has a perfect detection accuracy with almost zero false alarm rate as shown in a graph 280 of FIG. 5A. Referring to FIG. 5B, a graph 290 shows that for events that do not meet the criteria for good monitoring performance, the system has a higher false alarm rate. For both configurations I and II, for the events that do not meet the criteria for good monitoring performance, they will be classified as all doors closed.

Evaluation: Operational

In this part, a monitoring environment is simulated in which all the target events in the event list for the configuration I are intentionally performed and the system continues to collect the channel state information in the course of each event. Three examples are plotted in FIGS. 6A to 6C. FIG. 6A is a graph 300 that shows decisions for the situation in which all doors and windows are closed. FIG. 6B is a graph 310 that shows decisions for the situation in which Bob's room door is opened from inside the room. FIG. 6C is a graph 320 that shows decisions for the situation in which Alice's room window is opened from outside. In the graphs 300, 310, and 320, the x-axis represents the decision index or time index decisions are made periodically over a period of time, and the y-axis represents the state index corresponding to Table 6. In these examples, the system succeeds in detecting the transition from event e1 to event e4 (as shown in FIG. 6B) and the transition from event e1 to event e4 (as shown in FIG. 6C).

The robustness of the statistics based event detector to activities outside the house are simulated. Referring to FIG. 7A, a graph 330 shows the decision results when there are people walking outside the front door. The output decisions are all correctly determined as "all doors closed." Referring to FIG. 7B, a graph 340 shows the decision results when there are people walking outside the back door. The output decisions are all correctly determined as "all doors closed." Referring to FIG. 7C, a graph 350 shows the decision results when there are cars driving outside the house. The output decisions are all correctly determined as "all doors closed." The decision results shown in the graphs 330, 340, and 350 demonstrate that the system is reliable and stable to outside dynamics.

Time Reversal Event Detector: Machine Learning Approach

Figure 21:
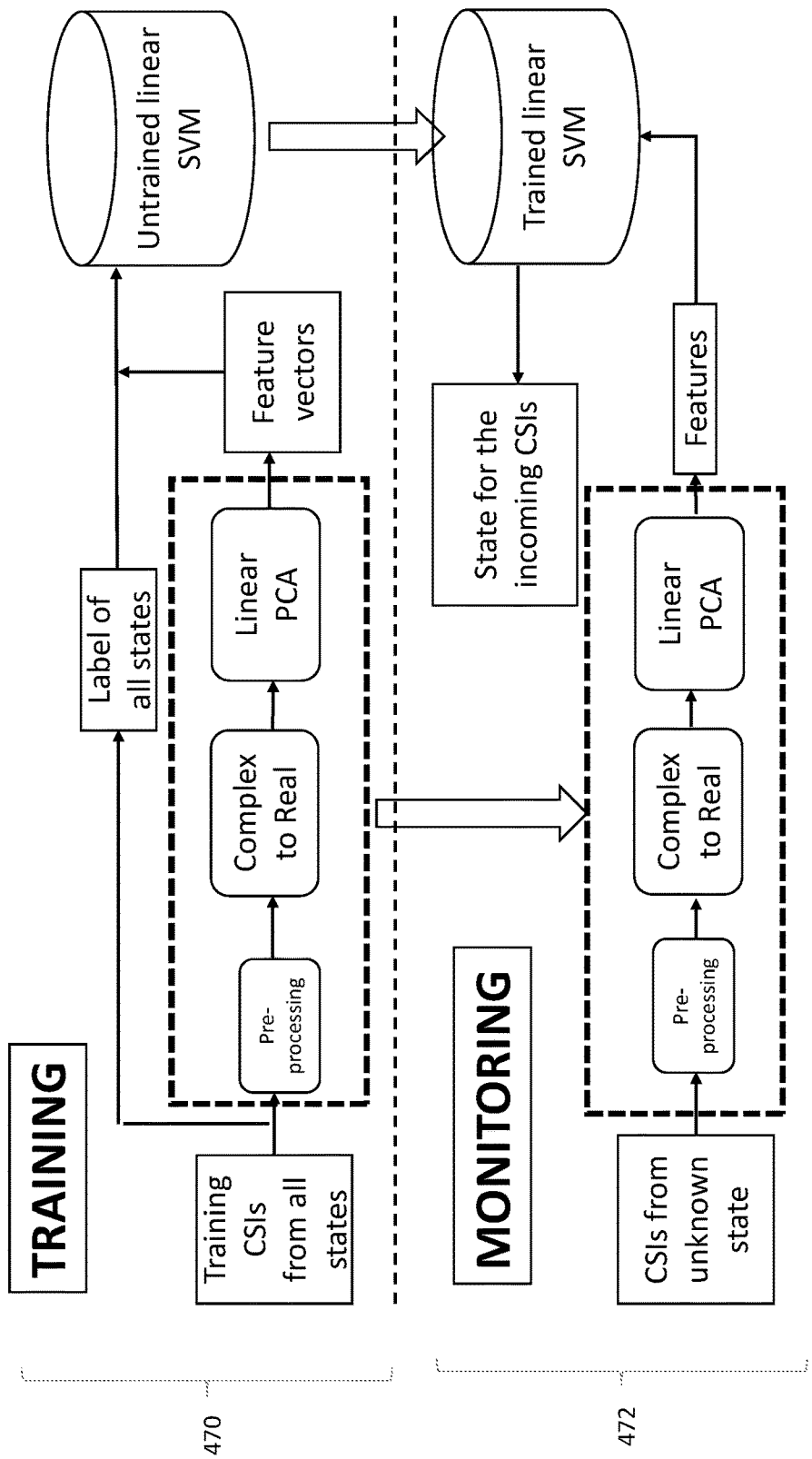
FIG. 21 shows an exemplary diagram showing the time reversal monitoring system using machine-learning-based approach.

The following describes a machine learning based event detector that has the same purpose as the statistics based approach, i.e., to detect the happening of indoor events. The machine learning based approach maps events to a feature space and tries to maximize the distances between different indoor events in the feature space, and can achieve a better detection performance at the cost of higher computational complexity (as compared to the statistics based approach). The machine learning based event detector can operate in an offline training phase 470 and an online monitoring phase 472, as shown in FIG. 21.

Phase I. Offline Training

Similar to the statistics based approach, in the training phase 470, indoor multipath profiles of all target events that are to be monitored are collected and used to train the classifier which is a support vector machine (SVM), as well as a feature dimension reduction method, i.e., the principal component analysis (PCA).

Data acquisition: To begin with, for each indoor event $S_i \in \mathcal{S}$ with $\mathcal{S}$ being the set of indoor events including normal events and abnormal events, the corresponding frequency domain channel frequency responses are obtained and estimated at the receiver side in the form as in Equation (32).

Phase offset calibration: Due to the random linear phase offset in each realization of the channel state information, the phase calibration method is applied to align all the realizations independently and then the energy of each channel frequency response is normalized.

Initial feature generation: For each event $S_i$, the channel state information profile $H_i$ is treated as the initial feature. Because each link channel state information $h_i^{(m)}$ is a complex-valued vector, it needs to be processed before being used in machine learning applications. The real part and the imaginary part of the complex-valued normalized channel state information are extracted and concatenated to form a new feature vector as $$g_i^{(m)} = [\text{real}\{h_i^{(m)}\}, \text{imag}\{h_i^{(m)}\}], \forall i, m.$$

Feature dimension reduction: In the principal component analysis, an orthogonal transformation is applied to convert original features that contain possibly correlated variables into a new feature space in which each dimension is uncorrelated. The principal component analysis is learned using the newly generated feature vectors from the previous step for all the events. In some implementations, the first 200 largest components after transformation are selected as the new feature, and thus the dimension of features is been reduced. The same orthogonal transformation will be used in the monitoring phase. Note that the number 200 described above is merely an example, depending on application, another number, e.g., 100 or 300, of the largest components after transformation can be selected as the new feature.

Train the support vector machine: Once new features of smaller dimensions are generated, they are provided to a linear support vector machine to train the weight vector such that the margin between different classes (events) are maximized.

At the end of the training phase, orthogonal transformation for the principal component analysis and the linear support vector machine classifier are learned.

Phase II. Online Monitoring

For each sample channel state information collected from an unknown event, it first goes through the same preprocessing adopted in the training phase to reduce or eliminate the phase offset and the initial phase distortion and then a feature vector is generated by concatenating the real and the imaginary parts of the channel state information. Afterwards, the learned principal component analysis orthogonal transformation is applied to the feature vector to reduce the number of dimensions. The new feature vector is classified and labeled using the trained linear support vector machine. After a decision on the event detection is made and confirmed to be a correct detection, the channel state information collected in the monitoring phase can be added to the training set with which the support vector machine can be retrained.

Experimental Results of Machine Learning Based Approach

In this section, the performance of the machine learning based event detector is evaluated through both receiver operating characteristics performance and the operational test using the same data set as that in the previous section. Configuration I in which the transmitter is placed in the front door area is studied. 20 real-valued principal components are selected to form the classification feature after the principal component analysis dimension reduction.

For target events that meet the criteria for good monitoring performance, the machine learning based event detector has a perfect detection accuracy with almost zero false alarm rate as shown in a graph 360 of FIG. 8A. Referring to FIG. 8B, a graph 370 shows that for events that do not meet the criteria for good monitoring performance, the machine learning based event detector has a higher false alarm rate.

FIG. 9A is a graph 380 that shows decisions made by the machine learning based event detector for the situation in which all doors and windows are closed. FIG. 9B is a graph 390 that shows decisions for the situation in which Bob's room door is opened from inside the room. FIG. 9C is a graph 400 that shows decisions for the situation in which Alice's room window is opened from outside. In the graphs 380, 390, and 400, the x-axis represents the decision index or time index-decisions are made periodically over a period of time, and the y-axis represents the state index corresponding to Table 6. In these examples, the system succeeded in detecting the transition from event e1 to event e4 (as shown in FIG. 9B) and the transition from event e1 to event e4 (as shown in FIG. 9C).

The above results show that for both the receiver operating characteristics evaluation and operational test, the machine learning based event detector has performance similar to the statistics based event detector in achieving perfect detection rate with zero false alarm rate for target events that meet the criteria for good monitoring performance, and the occurrence of target events is detected and reported in the operational test.

Human Motion Detector: TRRS Variance Based Approach

Figure 22:
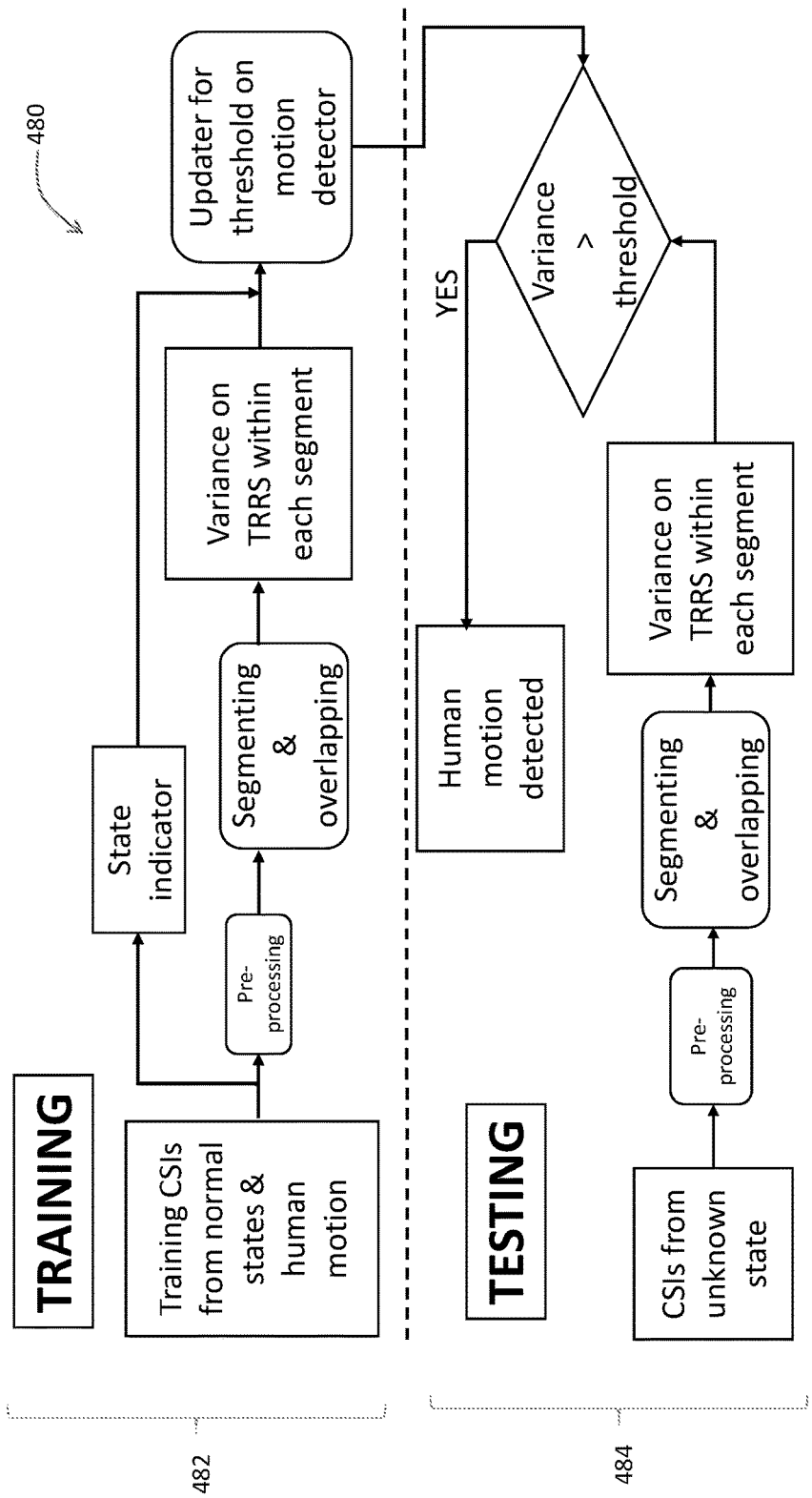
FIG. 22 shows an exemplary diagram showing the time reversal based human motion detection using the variance on time reversal resonating strength.

FIG. 22 shows a processing block diagram of a time reversal resonating strength variance based human motion detector 480, which is designed to report as soon as a large dynamics quantified by the variance of the time reversal resonating strength time sequence is detected. Human motions inside the home may introduce large fluctuations in the time reversal resonating strength time sequence compared to the impacts brought by channel fading and noise, especially when the activity happens near the transmitter or the receiver. The time reversal resonating strength variance based human motion detector can operate in two phases: an offline training phase 482 and an online monitoring phase 484. In the offline training phase 482, the time reversal resonating strength variance introduced by different kinds of dynamics in a multipath propagation environment is studied and a suitable threshold is obtained for use in determining the dynamics without and with human motions. In the online monitoring phase 484, the detector 480 receives measured channel state information, determines variances in the time reversal resonating strength time sequence, compares the variances with the threshold established during the training phase, and makes a determination as to whether there are human motions inside the home.

Phase I. Offline Training

In the training phase 482, the system needs to learn how large the dynamics is in the time reversal resonating strength time sequence when there is human movement inside the monitoring area compared to the dynamics without human motions. The detailed steps in training are listed as follows.

Data acquisition: To begin with, the situation of an indoor environment is divided into two classes: $S_0$ in which the environment is static, and $S_1$ in which there is at least one human moving in the monitoring area. channel frequency responses, also referred to as channel state information samples, are collected continuously in time for both of the classes and denoted as $$H_0(t) = [h_0^{(1)}(t), h_0^{(2)}(t), \ldots, h_0^{(M)}(t)]$$

and $$H_1(t) = [h_1^{(1)}(t), h_1^{(2)}(t), \ldots, h_1^{(M)}(t)].$$

where t is the time index of the period when the channel frequency response is captured. Because the channel frequency responses may be corrupted by phase distortion, the phase offset is compensated individually and independently first before the time reversal resonating strength variance based human motion detector learns the dynamics of the time reversal resonating strength time sequences.

Dynamics acquisition: Once time sequences of channel frequency response measurements for both static state $S_0$ and motion state $S_1$ are obtained, the dynamics of the time reversal resonating strength time sequence is quantified by tracking the value of the variance over the time reversal resonating strengths within a time window along the time. In order to obtain the time sequence of variance, for each state $S_i$, i=0,1, a sliding window with length N and overlap N−1 is applied on the time sequence of $H_i$ (t) to segment out channel frequency responses collected continuously within the window. For example, given a window length N, the channel frequency response sequence starts from $H_i(t_0)$ to $H_i(t_0+N*T_s)$, in which $T_s$ is the sampling time, i.e., the time interval between each channel state information sensing is $T_s$. Then the time reversal resonating strength sequence for the window starting at time $t_0$ is obtained as $\mathcal{TR}$ ($H_i(t_0)$, (t)), $t_0 \leq t \leq t_0+N*T_s$. The time reversal resonating strength $\mathcal{TR}$ ($H_i(t_0)$, $H_i(t)$) is the average value among all M links and is determined as follows:

$$\mathcal{TR}(H_i(t_0), H_i(t)) = \frac{1}{M}\sum_{m=1}^{M}\mathcal{TR}(h_i^{(m)}(t_0), h_i^{(m)}(t)), \qquad \text{Equ. (45)}$$

$$t_0 \leq t \leq t_0 + N*T_s.$$

Then the dynamics in the time window $[t_0, t_0+N*T_s]$ can be quantitatively evaluated as the variance of the sequence $\{\mathcal{TR}(H_i(t_0), H_i(t)), t_0 \leq t \leq t_0+N*T_s\}$ and denoted as $\sigma_i(t_0)$.

Threshold learning: After the procedure in dynamics acquisition, collections of different variance values for both states $S_0$ and $S_i$ are obtained, and then the threshold is determined by $$\gamma_{motion} = \qquad \text{Equ. (46)}$$
$$\begin{cases} \alpha \times \max_t \sigma_0(t) + (1-\alpha) \times E[\sigma_1(\hat{t})], & \text{if } \max_t \sigma_0(t) \leq E[\sigma_1(\hat{t})] \\ \max_t \sigma_0(t), & \text{otherwise} \end{cases},$$

where $\alpha$ is a sensitivity coefficient for motion detections.
Phase II. Online Monitoring In the monitoring phase, as the system continues to sense the environment and collecting channel state information samples, the same sliding window with length N and overlap length N−1 as in the training phase is applied to obtain channel state information time sequence $H_{test}(t)$, $t_0 \leq t \leq t_0+N*T_s$, $\forall t_0$. After compensating for phase offset and initial phase distortion, the time reversal resonating strength sequence is obtained as $\{\mathcal{TR}(H_{test}(t_0), H_{test}(t)), t_0 \leq t \leq t_0+N*T_s\}$ and the variance within this time window is $\sigma_{test}(t_0)$ To determine if there is human motion inside the house or not, the $\sigma_{test}(t_0)$ value is compared with the threshold $\gamma_{motion}$. The system will report the existence of human motion if and only if $\sigma_{test}(t_0) \geq \gamma_{motion}$.

By using the time reversal resonating strength variance based human motion detector, when someone is walking inside the house, the system can detect it. Moreover, the accuracy increases when motion occurs near either the transmitter or the receiver. Since there may be big objects with metal inside in the room, the motion detection may be compromised when the human movement happens behind the metal which reflects most or substantially all the electromagnetic waves before the wireless signal (sent from the transmitter and received by the receiver) reaches the moving human body.

Referring to FIG. 10A, a graph 410 shows that the human motion detector correctly determined that no human is walking in the house. Referring to FIG. 10B, a graph 420 shows that the human motion detector correctly determined that there is a human walking in the front door area.

Referring to FIG. 10C, a graph 430 shows the human motion detector correctly determined that during certain periods of time represented by decisions 432a, 432b, and 432c, there is a human walking in the large area, and that during certain periods of time represented by decisions 434a and 434b, there is no human walking in the large area. Referring to FIG. 10D, a graph 440 shows the human motion detector correctly determined that during certain periods of time, there is a human walking in the living room area, and that during certain periods of time, there is no human walking in the living room area. Referring to FIG. 10E, a graph 450 shows the human motion detector correctly determined that during certain periods of time, there is a human walking in the kitchen, and that during certain periods of time, there is no human walking in the kitchen.

Referring to FIG. 10F, a graph 460 shows the decision results when there are people walking outside the house. The human motion detector correctly determined that there is no human walking inside the house. The decisions were not influenced by the human walking outside the house.
Time Diversity for Smoothing In some examples, in an indoor environment, noise in wireless transmission and outside dynamics exist and may affect the estimated channel state information at the receiver side. Those kinds of interference may lead to a misdetection or a false alarm of the guard system. In some implementations, because those interferences are often sparse and have short time durations, a time-diversity smoothing method is provided to only output decisions that are consistent along the time. The time-diversity smoothing method relies on the assumption that the typical duration of an indoor event usually lasts for several seconds.

In some implementations, the time-diversity smoothing algorithm uses a two-level majority voting process as described below.

Level I Majority Vote: This level of majority vote is applied directly onto the raw decisions generated based on each single channel state information estimation. With the help of a sliding window $SW_1$ whose length is $N_1$ and overlap length is $O_1$, the decisions of index n is obtained through $D_{MV1}(n)=\text{MajorityVote}\{D(1+(n−1)*O_1), D(2(n−1)*O_1), \ldots, D(N_1+(n−1)*O_1)\}$, where D(n) is the decision for the $n^{th}$ channel state information measurement from either the event detector or the human motion detector.

Level II Majority Vote: Once the decision $D_{MV1}(n)$ from Level I is obtained, the second level majority vote applies a second sliding window $SW_2$ with length being $N_2$ and overlap length being $O_2$ on the decision sequence $D_{MV1}(n)$, n=1,2,.... Then, at this step, the final decision output after applying time-diversity smoothing is $D_{final}(n)=\text{MajorityVote}\{D_{MV1}(1+(n−1)*O_2), D_{MV1}(2+(n−1)*O_2), \ldots, D_{MV1}(N_2+(n−1)*O_2)\}$.

The time delay introduced by applying the time-diversity smoothing is $(N_1+(N_2−1)*O_1) \times T_s$ seconds.
Human Motion Detection: Antenna Correlation Based Approach In some implementations, a antenna correlation variance based human motion detector is designed to report as soon as a large dynamics quantified by the variance of antenna correlation is detected. Human motions may introduce large fluctuations in antenna correlation compared to the impacts brought by channel fading and noise, especially when an activity happens near the transmitter or the receiver. In this method, a suitable threshold is obtained for use by the antenna correlation variance based human motion detector in order to differentiate the dynamics in the variance of the antenna correlation between situations with human motions and situations without human motions.

Before calcuting the antenna correlation, a phase compensation algorithm is used to compensate for the phase distortion on the CSIs on each link. Referring to FIG. 11, in some implementations, a 3-antenna WiFi device 490 is used as a transmitter, and a 3-antenna WiFi device 500 is used as a receiver. Note that the 3-antenna WiFi devices are only used as examples, the transmitter and receiver can have more or fewer antennas. For example, each of the transmitter and the receiver can have 5, 10, 20, 30, or more antennas.

In FIG. 11, $H_{i,j}$ represents the channel state information estimation on the link between the i-th TX antenna and the j-th RX antenna. The antenna correlation $\gamma$ can either be TX antenna correlation or RX antenna correlation, which can be calculated as follows, $$\gamma_{TX,t} = \frac{2}{M(M-1)} \sum_{m=1}^{M} \sum_{m'=m+1, n' \neq m}^{M} \mathcal{TR}(H_{TX}^{(m)}(t), H_{TX}^{(m')}(t)). \quad \text{Equ. (47)}$$

$$\gamma_{RX,t} = \frac{2}{N(N-1)} \sum_{n=1}^{N} \sum_{n'=n+1, n' \neq n}^{N} \mathcal{TR}(H_{RX}^{(n)}(t), H_{RX}^{(n')}(t)). \quad \text{Equ. (48)}$$

where M and N represent the number of TX antennas and RX antennas, respectively. $H_{TX}^{(m)}(t)=[H_{m,1}, \ldots H_{m,N}]$ and $H_{RX}^{(n)}(t)=[H_{1,n}, \ldots H_{M,n}]$ represent the combined TX channel state information and RX channel state information at time t. From Equations (47) and (48), the antenna correlation $\gamma_t$ at each time instant can be calculated as shown in FIG. 12.

Due to the background noise and hardware impairment, the antenna correlation $\gamma_t$ can be quite noisy. Therefore, the post-processing on $\gamma_t$ may be needed before utilizing $\gamma_t$ for motion detection. First, a time difference is taken on $\gamma_t$ as shown in Equation (49) below.

$$\Delta\gamma_t = \gamma_t - \gamma_{t-1}. \quad \text{Equ. (49)}$$

Then, a moving average window with window size W is applied to $\Delta\gamma_t$ and the average value and variance can be used for motion detection, as follows:

$$\text{Avg}\{\Delta\gamma_t\} = \frac{1}{W} \sum_{i=1}^{W} \Delta\gamma_{t+i}. \quad \text{Equ. (50)}$$

$$\text{Var}\{\Delta\gamma_t\} = \frac{1}{W} \sum_{i=1}^{W} \Delta\gamma_{t+i}^2 - \frac{1}{W^2} \left(\sum_{i=1}^{W} \Delta\gamma_{t+i}\right)^2. \quad \text{Equ. (51)}$$

In this part, experiments were conducted in an office as shown in FIG. 13 in which 4 experiments were performed. The transmitter locations are labeled with circles, and the receiver locations are labeled with triangles. In each experiment, a human labeled with a rectangle walked through the space between the transmitter and the receiver repeatedly. The RX antenna correlation is considered for the following experiments.

Experiment 1: Motion in a line-of-sight scenario in a small room: In a first experiment, both the transmitter and the receiver are placed in a small room under a line-of-sight scenario, and the human walked through the link between the transmitter and the receiver repeatedly. The antenna correlation is shown in a graph 510 in FIG. 14. The graph 510 in FIG. 14 shows that the antenna correlation is quite noisy along the time index. Therefore, a difference of the antenna correlation is determined using Equation (49), and the results are shown in a graph 520 in FIG. 15.

Choosing the window size W=1 second, the statistics of $\Delta\gamma_t$ can be used to detect human motion as shown in FIGS. 16 and 17. FIG. 16 is a graph 530 that shows the average of $\Delta\gamma_t$ when there is human walking in the area between the transmitter and the receiver. FIG. 17 is a graph 540 that shows the variance of $\Delta\gamma_t$ when there is human walking in the area between the transmitter and the receiver. The peaks in FIGS. 16 and 17 represent the detected human motion.

In a second experiment, we placed the transmitter and the receiver at the entrance to the office. Assisted with the cardkey system of the office, the entrance history and the $\text{Var}(\Delta\gamma_t)$ with human walking are aligned in time as shown in a graph 550 of FIG. 18.

Note that the entrance history provided by the cardkey system in the office does not record the exit of people from the office. Therefore, some unknown peaks in $\text{Var}(\Delta\gamma_t)$ may be caused by people exiting from the office.

Human Motion Detection: Noise Level Based Approach

In some implementations, to avoid the problem of linear phase offset and random initial phase, only the amplitude information of the channel frequency response is used. For convenience of notation, the amplitude of (normalized) channel frequency response at time i is denoted as a long vector as $$G_i = [|h_i^{(1)}|^T, |h_i^{(2)}|^T, \ldots, |h_i^{(M)}|^T]^T. \quad \text{Equ. (52)}$$

Let $G_i(j)$ denote the j-th element of $G_i$. When there is no human motion inside the house, the random variable $G_i(j)$ follows a certain distribution and is usually a normal distribution $G_i(j) \sim \mathcal{N}(\mu_j, \sigma_j^2)$, with mean $\mu_j$ and variance $\sigma_j^2$, in which $\mu_j$ and $\sigma_j^2$ are time-invariant and only dependent on the index of subcarriers. Assume that there are I channel frequency responses within the window of observation. The variances $\sigma_j^2$ can be estimated by the sample variances, i.e., $$\hat{\sigma}_j^2 = \frac{1}{I-1} \sum_{i=1}^{I} (G_i(j) - \hat{\mu}_j)^2,$$

in which $$\hat{\mu}_j = \frac{1}{I} \sum_{i=1}^{I} G_i(j).$$

Define the noise level of the channel frequency response as $P_N = \sum_{j=1}^{ML} \sigma_j^2$. Then an unbiased linear estimator of $P_N$ is the summation of $\hat{\sigma}_j^2$, i.e., $\hat{P}_N = \sum_{j=1}^{ML} \hat{\sigma}_j^2$. Let $H_0$ denote the null hypothesis that there are no human motions inside the house. Then, the detection rule is that reject $H_0$ when $\hat{P}_N > \eta$, in which $\eta$ is a predefined threshold. If we let $\mu_j(i)$ represent the true mean of $G_i(j)$, then the expectation of the estimated noise level can be expressed as $$\mathbb{E}[\hat{P}_N] = \mathbb{E}\left[\sum_{j=1}^{ML} \hat{\sigma}_j^2\right] \quad \text{Equ. (53)}$$

$$= \mathbb{E}\left[\sum_{j=1}^{ML} \frac{1}{I-1}\sum_{i=1}^{I}(G_i(j)-\hat{\mu}_j)^2\right]$$

$$= \sum_{j=1}^{ML} \sigma_j^2 + \frac{1}{I-1}\sum_{j=1}^{ML}\sum_{i=1}^{I}(\bar{\mu}_j - \mu_j(i))^2,$$

where $$\bar{\mu}_j = \frac{1}{I}\sum_{i=1}^{I}\mu_j(i).$$

When there is no human motion, we have $\mu_j(1)=\mu_j(2)=\ldots=\mu_j(I)=\mu_j,\forall j$, and $\mathbb{E}[\hat{P}_N]=\Sigma_{j=1}^{ML}\sigma_j^2$. When there are human motions inside the house, the mean of $G_i(j)$ will be time-varying, i.e., we should use $\mu_j(i)$ instead of $\mu_j$. The second term in Equ. (53) measures the deviations of the mean caused by human motions and it is positive. Therefore the present motion detector can detect human motions inside the house.

Given a false alarm and the size of training samples, the threshold $\eta$ can be determined as follows. Under the assumption of $H_0$, for the sample variance $\hat{\sigma}_j^2$, the distribution of $$\frac{(I-1)\hat{\sigma}_j^2}{\sigma_j^2}$$

follows that of $X_{I-1}^2$, in which $X_{I-1}^2$ is Chi-squared distribution with (I-1) degree of freedom. Thus we have $$\hat{\sigma}_j^2 \sim \frac{\sigma_j^2}{I-1}\chi_{I-1}^2.$$

Because as $$k \to \infty, \frac{\chi_k^2 - k}{\sqrt{2k}} \to \mathcal{N}(0,1)$$

in distributions, as $I \to \infty$, we have $$\hat{P}_N = \sum_{i=1}^{ML}\hat{\sigma}_i^2 \qquad \text{Equ. (54)}$$

$$\sim \mathcal{N}\left(\sum_{i=1}^{ML}\sigma_j^2, \frac{2}{I-1}\sum_{i=1}^{ML}\sigma_j^4\right).$$

Assume that $\sigma_j^2$ is time-invariant and it can be estimated accurately from the training data corresponding to the normal state, i.e., no motions within the monitored area. Let $\tilde{\sigma}_j^2$ denote the sample variance of the signal observed by each subcarrier in the training data. Then, $\tilde{\sigma}_j^2$ converges to the true variance $\sigma_j^2$ in probability with the increasing size of training data. Therefore, we have the approximations as $$\frac{\hat{P}_N - \sum_{i=1}^{ML}\tilde{\sigma}_j^2}{\sqrt{\frac{2}{I-1}\sum_{i=1}^{ML}(\tilde{\sigma}_j^2)^2}} \sim \mathcal{N}(0,1). \qquad \text{Equ. (55)}$$

Given the false alarm requirement $\alpha$, the threshold $\eta$ is determined by the following equation $$\eta = \sum_{i=1}^{ML}\tilde{\sigma}_j^2 + Q^{-1}(\alpha)\sqrt{\frac{2}{I-1}\sum_{i=1}^{ML}(\tilde{\sigma}_j^2)^2}, \qquad \text{Equ. (56)}$$

where $Q(\cdot)$ is the Q-function, i.e., the complement of the standard normal cumulative distribution function. For a small false alarm probability $\alpha$, $Q^{-1}(\alpha)$ will be large and $\eta$ will also be large at the same time. The previous discussions indicate that the length of the observation window I plays an important role in the performance of the algorithm described above. A larger window size I can reduce the variance of $P_N$ and the threshold $\eta$ can be set to a smaller value which can increase the detection probability for a motion with a duration comparable to that of the observation window according to Equ. (56). However, a larger window size can elongate the response time of the system and the detection probability for motions with a small duration of time will decrease. Different window sizes may be chosen depending on different purposes or applications.

Human Motion Detection: Time-of-Arrival (ToA) Based Approach

The following describes a time-of-arrival based approach for human motion detection. Assume that there are R significant multipath components (MPC) in the environment and the channel impulse response can be written as $$h(\tau)=\Sigma_{r=1}^{R}h_r\delta(\tau-\tau_r), \qquad \text{Equ. (57)}$$

where $T_s$ is the complex amplitude of the multipath components r and $\tau_r$ is the delay of the multipath components r. In the frequency domain, at the k-th subcarrier, we have $$H[k] = \sum_{r=1}^{R}h_r e^{-j2\pi\frac{\tau_r k}{T_s L}}, \qquad \text{Equ. (58)}$$

where $T_s$ is the sampling interval, L is the number of subcarriers and k=0,1,..., L-1. In matrix form, we have $$\tilde{H}=A(\theta)h, \qquad \text{Equ. (59)}$$

where $$\theta_r \triangleq 2\pi\frac{\tau_r}{T_s L},$$

$$A(\theta) \triangleq [a(\theta_1),\ldots,a(\theta_R)] \text{ and }$$

$$a(\theta_r) \triangleq [1, e^{-j\theta_r}, \ldots, e^{-j(L-1)\theta_r}]^T.$$

However, due to the actual measurement noise, the phase information of the channel frequency response (CFR) is corrupted by a linear phase offset and a random initial phase offset, which leads to $$\tilde{H}=\phi A(\tilde{\theta})H+N, \qquad \text{Equ. (60)}$$

where φ is the random initial phase offset with |φ|=1, N is additive uncorrelated Gaussian noise with covariance matrix $\sigma^2 I$, $$\hat{\theta}_r = 2\pi \frac{\tau_r - \Delta\tau}{T_s L},$$

and $\Delta\tau$ is introduced from synchronization error and sampling frequency offset (can be positive or negative). The linear phase offset can be estimated and removed, and the random initial phase offset can also be subtracted since we can remove the common phase offset from each measurement. Let $\hat{H}(i)$ denote the i-th measurement of the channel frequency response with the removal of phase noise. In the following, a MUSIC (multiple signal classification) algorithm is implemented to recover the accurate channel impulse response information. Define $\hat{H}_m = [\hat{H}[m], \ldots, \hat{H}[m+P-1]]$, in which P denotes the number of subcarriers used in estimating the significant multipath. Then, the correlation matrix of the measured channel frequency response can be estimated as $$R_H \approx \frac{1}{(L-P+1)I} \sum_{m=0}^{L-P} \sum_{i=1}^{I} \hat{H}_m(i) \hat{H}_m^H(i). \quad \text{Equ. (61)}$$

After eigen-decomposition on $R_H$, we have $$R_H = U\Lambda U^H, \quad \text{Equ. (62)}$$

where the eigenvalues are at the diagonal of Λ in decreasing order. The noise subspace matrix is $U_n \triangleq [u_{R+1}| \ldots |u_L]$. In practice, the number of significant multipaths R is determined by the distribution of the eigenvalues of $R_H$, in which Akaike information criterion (AIC) or Bayesian information criterion (BIC) can be used. The pseudo-spectrum can be computed by $$P(\theta) = \frac{a^H(\theta)a(\theta)}{a^H(\theta)U_n U_n^H a(\theta)}, \forall \theta \in [-\pi, \pi], \quad \text{Equ. (63)}$$

where the peaks in the pseudo-spectrum indicate the possible locations of multipath in time domain. The relation between the time of arrival (ToA) and the parameter θ is $$\hat{\tau}_r = \frac{\hat{\theta}_r T_s L}{2\pi},$$

in which $\hat{\theta}_r$ is within the R largest peaks of the pseudo-spectrum. Given the estimated $\hat{\theta}$, the amplitude h can be estimated by the least-square problem $$h^* = \arg \min_{|\phi|=1, h} \left\| \hat{H} - \phi A(\hat{\theta}) h \right\|_2^2.$$

Since human activities change the physical propagation paths of the WiFi signal, channel impulse responses are affected correspondingly. Many features can be exploited, such as the changes of relative time-of-arrivals or amplitudes of the multipath components. For example, the difference of time-of-arrival between the first significant multipath and the second significant multipath can be exploited. When this difference changes, it indicates that there are motions near the transmitter and/or the receiver.

Combining TRRS Using Diversity

As defined earlier, to characterize the similarity between CSIs collected at the same or different events, the time reversal resonating strength can be calculated as $$\mathcal{TR}(h_0, h_1) = \frac{\eta^2}{\Lambda_0 \Lambda_1} \quad \text{Equ. (64)}$$

with $$\eta = \max_\phi |\Sigma H^*_0[k] H_1[k] e^{-jk\phi}|^2, \Lambda_0 = \Sigma |H_0[k]|^2, \Lambda_1 = \Sigma |H_1[k]|^2$$

where $h_0$ and $h_1$ are the two fingerprints, K is the total number of usable subcarriers, $H_0[k]$ and $H_1[k]$ are the CSIs on subcarrier k, η is the modified cross-correlation between $h_0$ and $h_1$ with synchronization error compensated, and $\Lambda_0$, $\Lambda_1$ are the channel energies of $h_0$ and $h_1$, respectively. Since a receiver may not be fully synchronous with a transmitter due to mismatches in their radio-frequency front-end components, an additional phase rotation of $e^{-jk\phi}$ is employed to counteract the phase distortions incurred by the synchronization errors in the calculation of η, in which φ can be estimated and compensated using Algorithm 1 described below. Equation (64) above implies that the time reversal resonating strength ranges from 0 to 1. More specifically, a larger time reversal resonating strength can indicate a higher similarity between two CSIs and thus a higher similarity between the two associated events.

In some implementations, an event detection system or human motion detection system can achieve an increased effective bandwidth by the exploitation of diversities, including frequency diversity and/or space diversity. The frequency diversity can be achieved by using different Wi-Fi channels. Additionally, frequency diversity can also include the diversity introduced by the subcarriers in an orthogonal frequency-division multiplexing system. The large amount of subcarriers (e.g., 114 subcarriers in the case of 40 MHz bandwidth using IEEE 802.11n protocol) may lead to a very stable performance.

The following describes a method for calculating the time reversal resonating strength when combining different diversities, by compensating the hardware imperfections that may be present in wireless communication systems. In general, the time reversal resonating strength can be considered as a metric that quantifies the differences between two CSIs. The two CSIs can be originated from two different physical locations, but can also be originated from two virtual (logic) locations/states. In the former case, the time reversal resonating strength with diversities can help the localization and tracking. In the latter case, the time reversal resonating strength with diversities can be used for applications such as monitoring breathing, recognizing humans, and guard/security systems.

Two different diversities exist in current Wi-Fi system, i.e., frequency diversity and spatial diversity. According to IEEE 802.11n, 35 Wi-Fi channels are dedicated to Wi-Fi transmission in 2.4 GHz and 5 GHz frequency bands with a maximum bandwidth of 40 MHz. The multitude of Wi-Fi channels leads to frequency diversity in that they provide opportunities for Wi-Fi devices to perform frequency hopping when experiencing deep fading or severe interference. On the other hand, spatial diversity can be exploited on multiple-input-multiple-output Wi-Fi devices, which is a mature technique that greatly boosts the spectral efficiency. Multiple-input, multiple-output devices have become useful components of IEEE 802.11n/ac, and has been widely deployed on numerous commercial Wi-Fi devices. For Wi-Fi systems, both types of diversity can be harvested to provide fingerprint with much finer granularity and thus lead to less ambiguity in comparison with the fingerprint measured with a bandwidth of only 40 MHz.

Figure 23:
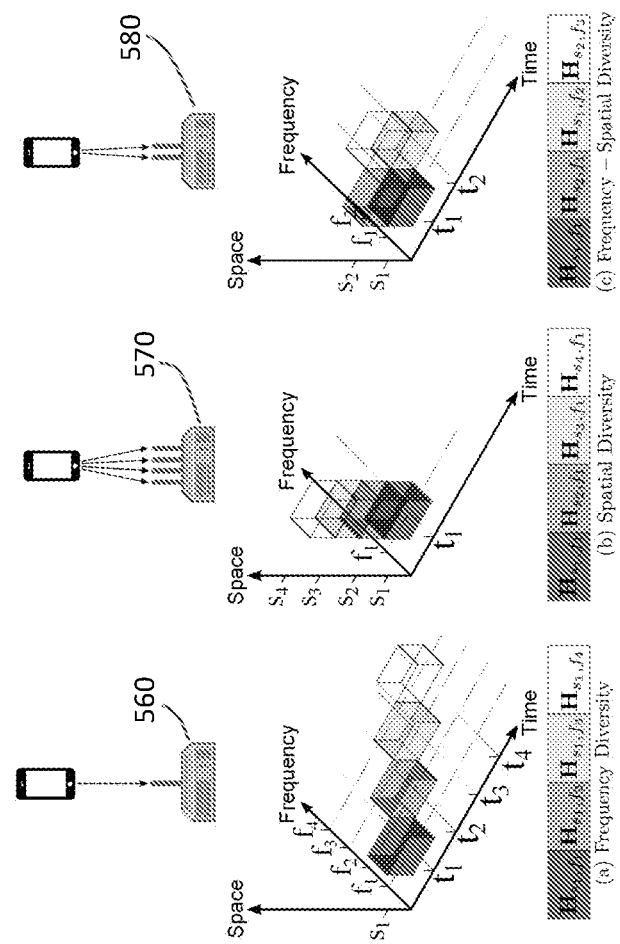
FIGS. 23A to 23C are diagrams showing the general principles for generating a large effective bandwidth by exploiting the frequency and spatial diversities either independently or jointly.

FIGS. 23A to 23C show the general principles for generating a large effective bandwidth by exploiting the frequency and spatial diversities either independently or jointly. FIG. 23A shows an example in which a Wi-Fi device 560 has one antenna. FIG. 23B shows an example in which a Wi-Fi device 570 has four antennas. FIG. 23C shows an example in which a Wi-Fi device 580 has two antennas. Since Wi-Fi devices can work on multiple Wi-Fi channels, one can exploit the frequency diversity by performing frequency hopping to obtain CSIs on different Wi-Fi channels. As shown in FIG. 23A, CSIs on four different Wi-Fi channels are concatenated together to formulate a fingerprint of a large effective bandwidth. Although frequency diversity can be exploited on a single-antenna Wi-Fi device, it is time-consuming to perform frequency hopping. For time efficiency, spatial diversity can be exploited on multi-antenna Wi-Fi devices. For the Wi-Fi receiver 570 in FIG. 23B having four antennas, CSIs on the four receiving antennas can be combined together to formulate the fingerprint with a large effective bandwidth. In the example of FIG. 23C, both frequency diversity and spatial diversity are used, in which CSIs on two Wi-Fi channels and from two receiving antennas are combined into the fingerprint.

For a Wi-Fi system, the spatial diversity is determined by the number of antenna links, while the frequency diversity is dependent on the number of available Wi-Fi channels. Denote the maximum spatial diversity by S, the maximum frequency diversity by F, and the bandwidth for each Wi-Fi channel by W, the channel state information measurements can be written as $$\bar{h} = \{h_{s,f}\}_{s=1,2,\ldots,S}^{f=1,2,\ldots,F}$$

and can provide fine-grained channel state information fingerprint with an effective bandwidth of S×F×W.

First, the time reversal resonating strength in Equation (64) can be extended to the fine-grained fingerprint $\bar{h}_0$ and $\bar{h}_1$, with $\eta$ and $\Lambda_0$, $\Lambda_1$ modified as $$\eta = \Sigma_s \Sigma_f \eta_{s,f}, \Lambda_0 = \Sigma_s \Sigma_f \Lambda_{0,s,f}, \Lambda_1 = \Sigma_s \Sigma_f \Lambda_{1,s,f} \quad \text{Equ. (65)}$$

where $$\eta_{s,f} = \max_\phi |\Sigma H^*_{0,s,f}[k] H_{1,s,f}[k] e^{-jk\phi}|^2$$

represent the modified cross-correlation on the virtual link (s, f), and $\Lambda_{0,s,f} = \Sigma_{k=1}^K |H_{0,s,f}[k]|^2$, $\Lambda_{1,s,f} = \Sigma_{k=1}^K |H_{1,s,f}[k]|^2$ are the channel energies of $h_{0,s,f}$ and $h_{1,s,f}$ on the virtual link (s, f), respectively.

Algorithm 1 shown below elaborates on the calculation of $\mathcal{TR}(\bar{h}_0, \bar{h}_1)$. In Algorithm 1, steps 4-9 calculate the channel energies on the virtual link (s, f), while steps 10-14 compute the modified cross-correlation of two fingerprints on the virtual link (s, f). The channel energies and modified cross-correlation on each virtual link are accumulated as shown in step 9 and step 15, respectively. Finally, the time reversal resonating strength is obtained by step 18. The computation of $\eta_{s,f}$ is approximated by $$\overline{\eta_{s,f}} = \max_n \left| H^*_{0,s,f}[k] H_{1,s,f}[k] e^{-j\frac{2\pi n(k-1)}{N}} \right|$$

that takes the same format of a discrete Fourier transform of size N and thus can be computed efficiently by fast Fourier transform. Using a large N in the computations leads to a more accurate approximation of $\eta_{n,s}$.

---

Algorithm 1 Calculating TRRS by exploiting diversities

Input: $\bar{h}_0 = \{h_{0,s,f}\}_{s=1,2,\ldots,S}^{f=1,2,\ldots,F}$, $\bar{h}_1 = \{h_{1,s,f}\}_{s=1,2,\ldots,S}^{f=1,2,\ldots,F}$
Output: $\mathcal{TR}[\bar{h}_0, \bar{h}_1]$ 1:    $\Lambda_0 = 0$, $\Lambda_1 = 0$, $\eta = 0$
2:    for s = 1,2, . . . , S do
3:      for f = 1,2, . . . , F do
4:        $\Lambda_{0,s,f} = 0$, $\Lambda_{1,s,f} = 0$ ⎫
5:        for k = 1, 2, . . . , K do ⎬ Calculating channel
6:          $\Lambda_{0,s,f} \leftarrow \Lambda_{0,s,f} + |H_{0,s,f}[k]|^2$ ⎬ energies
7:          $\Lambda_{1,s,f} \leftarrow \Lambda_{1,s,f} + |H_{1,s,f}[k]|^2$ ⎬ on virtual link (s, f)
8:        end for ⎭

9:        $\Lambda_0 \leftarrow \Lambda + \Lambda_{0,s,f}$, $\Lambda_1 \leftarrow \Lambda_1 + \Lambda_{1,s,f}$ 10:       for n = 1, 2, . . . , N do ⎫
11:         $z[n] \leftarrow \sum_{k=1}^N H^*_{0,s,f}[k] H_{1,s,f}[k] e^{-j\frac{2\pi n(k-1)}{N}}$ ⎬ Calculating modified
12:       end for ⎬ cross-correlation
13:       $n^* = \underset{n=1,2,\ldots,N}{\operatorname{argmax}} |z[n]|$ ⎬ on
14:       $\overline{\eta}_{s,f} = z[n^*]$ ⎭ virtual link(s, f)

15:       $\eta \leftarrow \eta + \overline{\eta}_{s,f}$
16:      end for
17:    end for 18:    $\mathcal{TR}[\bar{h}_0, \bar{h}_1] \leftarrow \dfrac{\eta^2}{\Lambda_0 \Lambda_1}$ In addition to the time reversal resonating strength combination disclosed in Algorithm 1, there can be other ways for combining the time reversal resonating strength. Written in a more compact way, the (normalized) resonating strength on the $d^{th}$ link between channel $h_{0,d}$ and $h_{1,d}$ is redefined as follows $$\mathcal{TR}(h_{0,d}, h_{1,d}) = \frac{\max_n \left| \sum H^*_{0,d}[k] H_{1,d}[k] e^{-j2\pi \frac{kn}{N_{ser}}} \right|^2}{\Lambda_{0,d} \Lambda_{1,d}} \quad \text{Equ. (66)}$$

where $\Lambda_{0,d}$ and $\Lambda_{1,d}$ are the energies of $h_{0,d}$ and $h_{1,d}$, respectively, calculated as $\Lambda_{0,d} = \Sigma |H_{0,d}[k]|^2$ and $\Lambda_{1,d} = \Sigma |H_{1,d}[k]|^2$.

Consequently, for each link d, we have three characteristics:

1. The normalized resonating strength $\mathcal{TR}(h_{0,d}, h_{1,d})$,
2. The channel energy for channel $h_0$ on link d: $\Lambda_{0,d}$, and
3. The channel energy for channel $h_1$ on link d: $\Lambda_{1,d}$.

The next step for calculation is to combine the (normalized) resonating strength of each link to form a general feature. The following describes four methods for combining the time reversal resonating strength.

First, the BASIC COMBINATION of resonating strength between channel $h_0$ and $h_1$ is $$\mathcal{TR}(h_0, h_1) = \frac{1}{D} \sum_{d=1}^{D} \mathcal{TR}(h_{0,d}, h_{1,d}) \quad \text{Equ. (67)}$$

where D is the total number of antenna links.

In this method, we treat each link equally, regardless of its quality. We can expect that this combination algorithm will give us a benchmark performance in positioning and recognition.

Second, the ENERGY WEIGHTED COMBINATION of the time reversal resonating strength between channel $h_0$ and $h_1$ is $$\mathcal{TR}(h_0, h_1) = \frac{\sum_{d=1}^{D} \mathcal{TR}(h_{0,d}, h_{1,d}) \Lambda_{0,d} \Lambda_{1,d}}{\sum_{d=1}^{D} \Lambda_{0,d} \Lambda_{1,d}} \quad \text{Equ. (68)}$$

Unlike the previous method, the ENERGY WEIGHTED COMBINATION method combines different links according to the product of channel gain $\Lambda_{0,d} \Lambda_{1,d}$. A link having a better quality (i.e., a higher channel gain) will be put on more weight than others. In general, the ENERGY WEIGHTED COMBINATION method will produce a better performance than the BASIC COMBINATION method.

Third, the ALL-LINK CONCATENATION COMBINATION of resonating strength between channel $h_0$ and $h_1$ is $$\mathcal{TR}(h_0, h_1) = \left( \frac{\sum_{d=1}^{D} \sqrt{\Lambda_{0,d} \Lambda_{1,d}} \sqrt{\mathcal{TR}(h_{0,d}, h_{1,d})}}{\sqrt{\sum_{d=1}^{D} \Lambda_{0,d}} \sqrt{\sum_{d=1}^{D} \Lambda_{1,d}}} \right)^2 \quad \text{Equ. (69)}$$

The idea behind this method is to concatenate all the CSIs on available links, after aligning each link channel independently, to effectively formulate a new channel state information.

Fourth, the PARTIAL-LINK CONCATENATION COMBINATION of resonating strength between channel $h_0$ and $h_1$ is $$\mathcal{TR}(h_0, h_1) = \frac{1}{N_{RX}} \sum_{i=1}^{N_{RX}} \left( \frac{\sum_{d \in \mathcal{D}_i} \sqrt{\Lambda_{0,d} \Lambda_{1,d}} \sqrt{\mathcal{TR}(h_{0,d}, h_{1,d})}}{\sqrt{\sum_{d \in \mathcal{D}_i} \Lambda_{0,d}} \sqrt{\sum_{d \in \mathcal{D}_i} \Lambda_{1,d}}} \right)^2 \quad \text{Equ. (70)}$$

where $N_{RX}$ is the number of receiving antennas, and $\mathcal{D}_i$ represents the set of antenna links involving receiving antenna i. For instance, in a 3×3 multiple-input, multiple-output system, antenna links 1, 4, 7 represent the antenna links between transmitting antenna 1, transmitting antenna 2, and transmitting antenna 3 to the same receiving antenna 1, respectively. Thus, $\mathcal{D}_1 = \{1, 4, 7\}$. The idea behind this method is to first concatenate the CSIs on the same receiving antenna and calculate the time reversal resonating strength, then take an average of the time reversal resonating strength calculated on all receiving antennas.

Channel State Information Phase Offset Compensation

The channel state information may be affected by (i) initial phase distortion caused by carrier frequency offset (CFO) $\alpha$ and common phase offset (CPE) $\beta$, and (ii) linear phase distortion caused by symbol timing offset (STO) $\sigma$ and sampling frequency offset (SFO) $\delta$.

The randomness distorts the phase quality of the channel state information fingerprints in the following way:

$$\tilde{H}[k] = H[k] \underbrace{\exp\left(j2\pi \frac{\sigma}{N} k\right)}_{STO} \underbrace{\exp(j\pi \phi_k)}_{CFO, SFO} \underbrace{\exp\left(j2\pi \frac{iN_s + N_g}{N} \phi_k\right)}_{CFO, SFO} \underbrace{\exp(j\beta)}_{CPE} \quad \text{Equ. (71)}$$

where $\phi_k = \alpha + \beta k$.

Therefore, the calculation of the time reversal resonating strength defined in $$\mathcal{TR}(h_0, h_1) = \frac{\eta^2}{\Lambda_0 \Lambda_1}$$

with $\eta = \max_\phi |\Sigma H^*_0[k] H_1[k] e^{-jk\phi}|^2, \Lambda_0 = \Sigma |H_0[k]|^2, \Lambda_1 = \Sigma |H_1[k]|^2$ involves the "max" operation for compensating the phase distortion and has high complexity.

To reduce the complexity while compensating the phase distortion, one can use channel state information fingerprint such as channel state information fingerprint type I.

For instance, we can write $$\tilde{H}_{1,1}[k] = H_{1,1}[k] \exp\left(j2\pi \frac{\sigma}{N} k\right) \exp(j\pi \phi_k) \exp\left(j2\pi \frac{N_g}{N} \phi_k\right) \exp(j\beta) \quad \text{Equ. (72)}$$

$$\tilde{H}_{2,1}[k] = \quad \text{Equ. (73)}$$
$$H_{2,1}[k] \exp\left(j2\pi \frac{\sigma}{N} k\right) \exp(j\pi \phi_k) \exp\left(j2\pi \frac{N_s + N_g}{N} \phi_k\right) \exp(j\beta)$$

where $H_{1,1}[k]$ represents the channel state information fingerprint received at receiving antenna 1 from transmitting antenna 1, and $H_{2,1}[k]$ represents the channel state information fingerprint received at receiving antenna 1 from transmitting antenna 2, respectively.

We can formulate the cross-antenna fingerprint $G_{1,2}[k]$ for each subcarrier k as $$G_{1,2}[k] = \tilde{H}_{1,1}[k]\tilde{H}^*_{2,1}[k] = H_{1,1}[k]H^*_{2,1}[k]\exp\left(-j2\pi\frac{N_s}{N}\phi_k\right) = \quad \text{Equ. (74)}$$
$$H_{1,1}[k]H^*_{2,1}[k]\exp(-j2\pi\phi_k)\exp\left(-j2\pi\frac{N_g}{N}\phi_k\right)$$

The above shows that the effect of symbol timing offset σ and common phase offset β are canceled. Since α and δ are the residual carrier frequency offset and sampling frequency offset, under most cases they can be ignored.

For each radio-frequency chain in a 3×3 multiple-input, multiple-output system, we can formulate 3 new channel state information fingerprints. Therefore, in total, we can formulate $G_{1,2}, \ldots, _9$. More generally, for a $N_T \times N_R$ system, we can formulate a total of $C_{N_T}^2 \times N_R$ new channel state information fingerprints.

Then, the simple inner product is applied to obtain the resonating strength. For instance, the resonating strength (per link) between two CSIs after calibration is calculated as:

$$\mathcal{TR}(\tilde{h}_{0,i,j}, \tilde{h}_{1,i,j}) = \frac{|\sum G^*_{0,i,j}[k]G_{1,i,j}[k]|^2}{\Lambda_{0,i,j}\Lambda_{1,i,j}} \quad \text{Equ. (75)}$$

where $\tilde{h}_{0,i,j}$ and $\tilde{h}_{1,i,j}$ represent two CSIs between receiving antenna j and transmitting antenna i, $G_{0,i,j}[k]$ and $G_{1,i,j}[k]$ are the two formulated fingerprint using $\tilde{h}_{0,i,j}$ and $\tilde{h}_{1,i,j}$ on subcarrier k, respectively, and $\Lambda_{0,i,j}$ and $\Lambda_{1,i,j}$ are the fingerprint energies calculated by $\Lambda_{0,i,j} = \Sigma|G_{0,i,j}[k]|^2$ and $\Lambda_{1,I,j} = \Sigma|G_{1,I,j}[k]|^2$, respectively.

In an alternative embodiment, one can use the following fingerprint (channel state information fingerprint II). For TX antenna i and RX antenna j, write $$G_{i,j}[k] = \tilde{H}_{i,j}[-k] \quad \text{Equ. (76)}$$

Then, we have $$G_{i,j}[k] = H_{i,j}[k]H_{i,j}[-k]\exp(j2\beta) \quad \text{Equ. (77)}$$

which totally eliminates the linear phase shift.

CSI Phase Sanitization: Suppose the ground truth channel state information for subcarrier k is $h[k] = |h[k]|e^{-j\Phi_k}$. However, due to the impact of phase corruption and noise, the estimated channel state information $\overline{h[k]}$ becomes $$\overline{h[k]} = h[k]e^{-j(\alpha+k\beta)} + n_k|h[k]|e^{-j\phi_k}e^{-j(\alpha+k\beta)} +$$
$$n_k, k = -K, \ldots, K \quad \text{Equ. (78)}$$

where α represents the initial phase offset, β represents the linear phase offset and $n_k$ is the estimation noise on subcarrier k.

Linear phase offset cleaning: First, let us take a look at the linear phase offset α. In some examples, one way to eliminate α is to have a linear fitting over the phase components along all subcarriers and then extract the slope as the estimated linear phase offset. Even though it is correct during analysis, the linear fitting method may not in actual implementation due to the noisy unwrapping.

Linear phase calibration with unwrapping: The raw channel state information phases are concentrated [−π, π], which are referred to as wrapped phase $\phi_w$. In order to linear fit the channel state information phase along all the subcarriers, we need first to unwrap the phase on each subcarrier as $$\phi[k] = \phi[k-1] + W\{\phi_w[k] - \phi_w[k-1]\}, \quad \text{Equ. (79)}$$

where ϕ[k] denotes the unwrapped phase on subcarrier k, and $\phi_w[k]$ is the wrapped phase. The operation W is the unwrapping function:

$$W\{a\} = \begin{cases} a, & \text{if } |a| \le \pi \\ a - \text{sign}[a]2\pi, & \text{otherwise} \end{cases} \quad \text{Equ. (80)}$$

Due to the noise which adds extra phase $\phi_n[k]$ to the wrapped phase $\phi_w[k]$, $\overline{\phi_w[k]} = \phi_w[k] + \phi_n[k]$, the unwrapping method may be degraded as $W\{\phi_w[k] + \phi_n[k] - \phi_w[k-1]\}$. The error may be introduced with an amplitude at least $|2\pi - \phi_n[k]|$ because of the false-trigger or miss-trigger of the unwrapping procedure in Equation (80).

Figure 24:
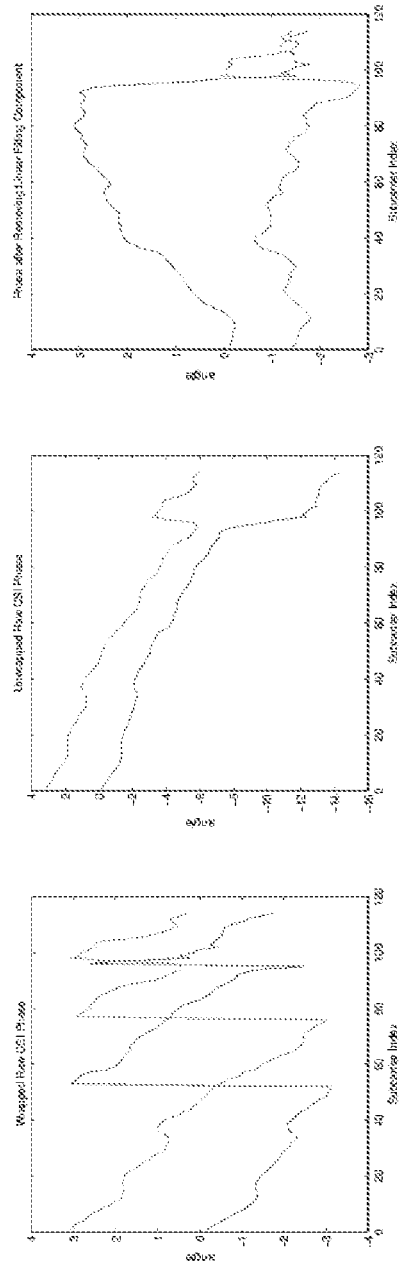
FIGS. 24 and 25 show graphs of channel state information phases on each subcarrier using a linear fitting method and the disclosed linear phase calibration method.

Hence, due to the corrupted unwrapping operation, the linear phase offset obtained by linear fitting may be incorrect. An example of linear fitting method on CSIs from the same location (state) is shown in FIG. 24, where the unwrapping operation introduces errors.

From experiments, we also observe that when $|H_k| \approx |n_k|$ in power, i.e., the signal-to-noise ratio (SNR) is small, it is more likely to have the corrupted phase unwrapping.

Linear phase calibration without unwrapping: To have the linear phase offset calibrated without unwrapping the phase and any special hardware implementation, we adopt the following method.

The signature vector $G^{(\Delta)}$ is obtained directly from the channel state information vector $\hat{h}$, in which $\hat{h} = [\overline{h[-K]}, \overline{h[-K+1]}, \ldots, \overline{h[K]}]$. Here, h is the collected (2K+1)×1 channel state information vector.

$$\text{Equ. (81)}$$

$$G^{(\Delta)}[k] = \overline{h[k]}^* \times \overline{h[k+\Delta]}$$
$$= |h[k]||h[k+\Delta]|e^{-j\Delta\beta}e^{-j(\phi_{k+\Delta} - \phi_k + \phi_{noise})}$$
$$= |G^{(\Delta)}[k]|e^{-j\Delta\beta}e^{-j\psi_k^{(\Delta)}}, k = -K, \ldots, K-\Delta. \quad \text{Equ. (82)}$$

In Equation (81), the superscript * denotes the conjugate operation, Δ is an integer representing the distance of shifting on $\hat{h}$, and the initial phase or common phase offset is naturally canceled out in $G^{(\Delta)}[k]$. $G^{(\Delta)}[k] = h[k]h[k+\Delta]$ and $\psi_k^{(\Delta)} = \phi_{k+\Delta} - \phi_k + \phi_{noise}$.

$$\hat{\beta} = -\frac{1}{\Delta}\angle\left\{\sum_{k=-K}^{K-\Delta} G^{(\Delta)}[k]\right\} \quad \text{Equ. (83)}$$

$$= -\frac{1}{\Delta}\angle\left\{e^{-j\Delta\beta}\sum_{k=-K}^{5K-\Delta}|G^{(\Delta)}[k]|e^{-j\psi_k^{(\Delta)}}\right\}$$

$$= \beta - \frac{1}{\Delta}\angle\left\{\sum_{k=-K}^{K-\Delta}|G^{(\Delta)}[k]|e^{-j\psi_k^{(\Delta)}}\right\}$$

$$= \beta + \beta_{res},$$

As shown in Equation (83), besides the true linear phase offset β, we have a residual term $\beta_{res}$ and is approximately fixed for each location as $$\beta_{res} = -\frac{1}{\Delta}\angle\left\{\sum_{k=-K}^{K-\Delta} h[k]^* h[k+n]\right\}, \quad \text{Equ. (84)}$$

where h[k] $H_k$ is the ground-truth channel state information. According to the assumption that the phase on each subcarrier is independent and uncorrelated, $\beta_{res}$ is quite small and can be neglected.

Figure 25:
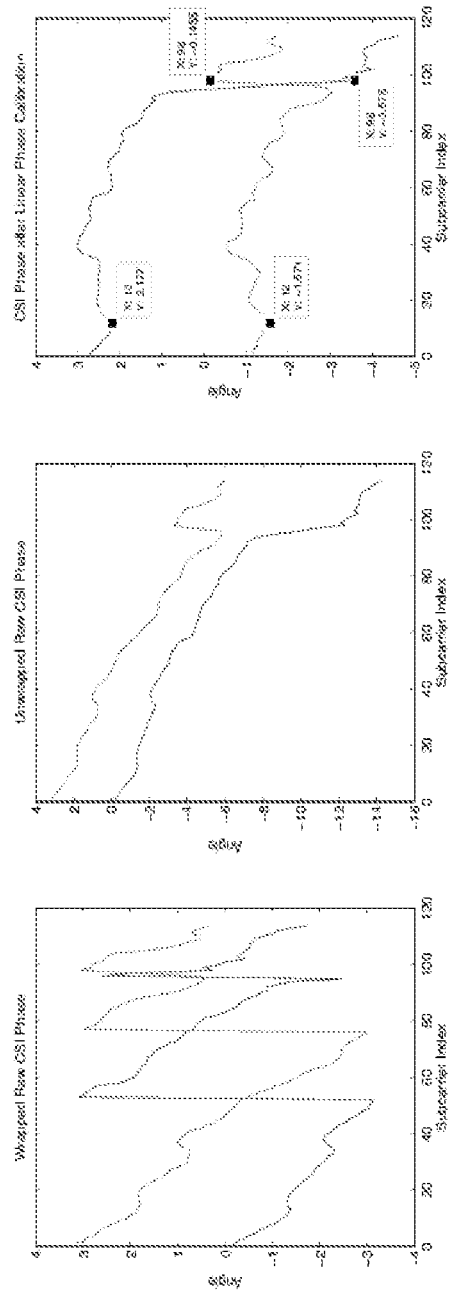

The example of the linear phase calibration method is shown in FIG. 25.

Initial phase offset cleaning: Once the linear phase offset $\hat{\beta}$ is removed for a channel state information vector, the next step is to remove the initial phase offset $\alpha$.

Let $\tilde{h}[k]$ denote the channel state information on subcarrier k after linear phase offset sanitization, i.e., $\tilde{h}[k] = h[k]e^{-j\alpha} + \tilde{n}_k$.

Adopting the similar method in Linear Phase Offset Cleaning, the a parameter is estimated as $$\hat{\alpha} = -\angle\left\{\sum_{k=-K}^{K}\tilde{h}[k]\right\}$$

$$= \alpha - \angle\left\{\sum_{k=-K}^{K}h[k] + \tilde{n}_k\right\}$$

$$= \alpha + \alpha_{res}$$

Equ. (85)

Similar to $\beta_{res}$, the initial phase residual $\alpha_{res}$ is approximately estimated as the common phase across all subcarriers, $$\alpha_{res} = -\angle\{\Sigma_{k=-K}^{K}h[k]\}, \quad \text{Equ. (86)}$$

where the independency of noise is considered. Suppose the phase on each subcarrier is independent, $\alpha_{res}$ should be small.

As discussed above, the linear phase calibration and the initial phase calibration can be implemented in parallel, and both of them are array-operation which is fast and efficient. The phase calibration method described above calibrates and compensates the phase for each channel state information without the requirement of a reference channel state information, which is needed for previous prior art channel state information alignment algorithms. From experimental results, the CSIs after calibration are all consistent and aligned well when they come from the same location/state.

Once the phase is calibrated and sanitized according to the algorithm described above, the remaining channel state information can be viewed as the ground-truth channel state information which has no phase distortion. As a consequence, there no longer needs the FFT-based method to calculate the resonating strength. After going through the phase calibration, the obtained CSIs keep the ground-truth phase information that may be used to estimate AoAs or ToFs. Moreover, the simple inner product method is used to calculate the resonating strength of the calibrated CSIs. Now the resonating strength preserves its physical meaning as that it is the electromagnetic wave response to the indoor environment through which it propagates during transmission.

As discussed previously in connection with FIG. 26, in order to detect events in the venue 140, the transmitter 142 sends wireless signals to the receiver 144 through the multipath channel 146. The following is a description of examples of handshaking processes between the transmitter 142 and the receiver 144 in order for the receiver 144 to accurately estimate the channel characteristics.

Least Square (LS) Based Channel Probing Handshaking

The following describes a least square (LS) based handshaking method for channel probing. In this method, the transmitter 142 sends the probe signal to the receiver 144. The receiver 144 synchronizes with the received signal and estimates the channel response based on the received signal.

Figure 27:
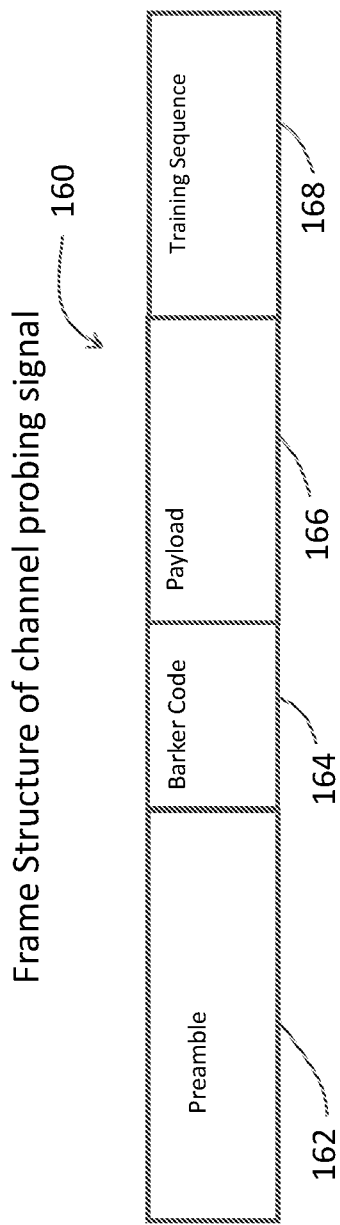
FIG. 27 is a diagram of a frame structure of a channel probing signal.

Referring to FIG. 27, in some implementations, a frame of a channel probing signal 160 transmitted by the transmitter 142 includes four consecutive parts: a preamble 162, a barker code 164, a payload 166, and a training sequence 168. The length of each frame is fixed in this method and known by both the transmitter 142 and the receiver 144. In some examples, the transmitter 142 may send two or more frames of channel probing signals to the receiver 144 to allow the receiver 144 to obtain more accurate channel and timing information. In some implementations, the accuracy of timing can be improved by increasing the length of the preamble 162 and Barker code 164, and the accuracy of channel information can be improved by increasing the length of the training sequence 168.

Figure 28:
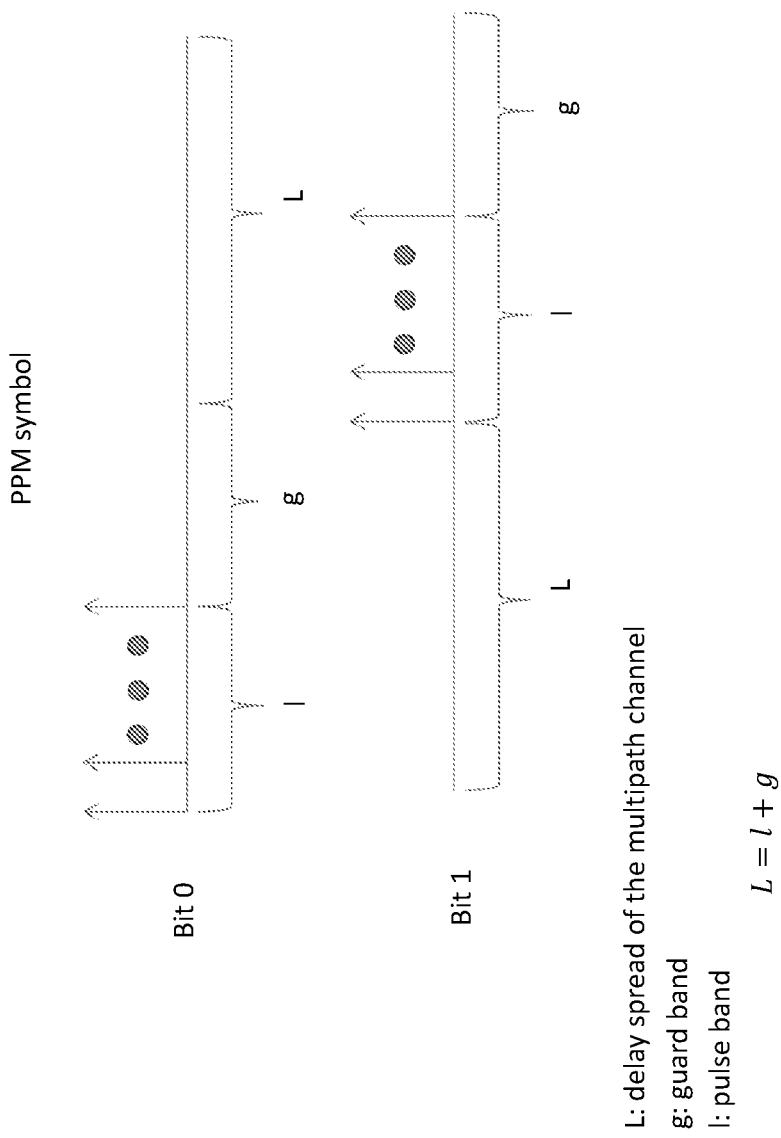
FIG. 28 is a diagram of pulse position modulation symbols.

The preamble 162 is modulated using, e.g., pulse position modulation (PPM). The pulse position modulation symbols '0' and '1' are shown in FIG. 28. The preamble 162 includes consecutive pulse position modulation symbol '0's in which L is the length of the multipath channel that is defined by $$L = \frac{\tau_s}{\delta_t}$$

where $\tau_s$ is the delay spread and $\delta_t$ is the sampling period of the system. In practice, even though the channel length is not exactly known, the receiver 144 can estimate the channel length based on the typical delay spread of the environment and the sampling rate of the system. In this method, the performance will not be affected if the estimated channel length is longer than the actual channel length. Therefore, the receiver 144 can overestimate the channel length and set L to be greater than the actual channel length without generating an error.

The barker code 164 transmitted by the transmitter 142 is a code known by both the transmitter 142 and the receiver 144. The length of the barker code 164 is $L_b$. The payload 166 transmitted by the transmitter 142 can be encoded information that is modulated using pulse position modulation. The information may contain the index of the training sequence 168. The length of the payload 166 is $L_p$.

Figure 29:
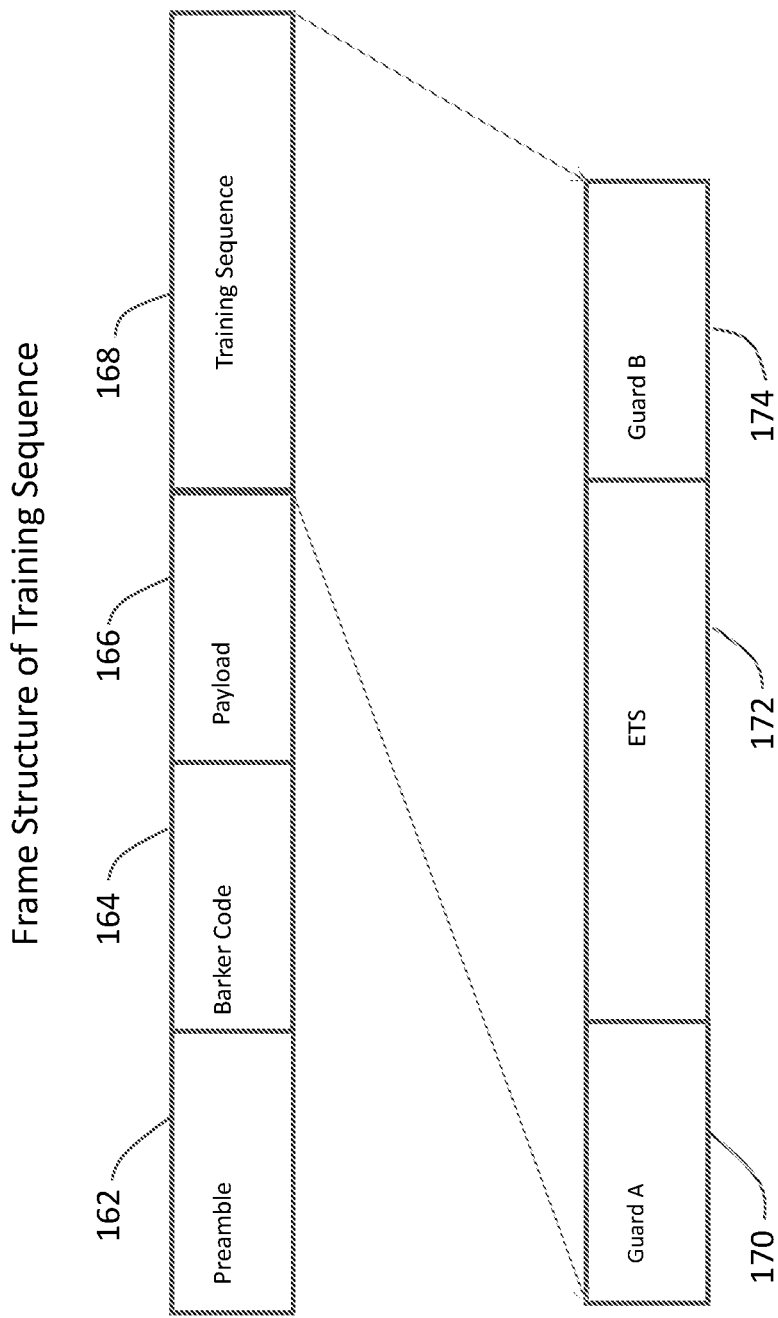
FIG. 29 is a diagram of a frame structure of a training sequence.

Referring to FIG. 29, the training sequence 168 has three consecutive parts, including a guard interval A 170, an effective training sequence (ETS) 172, and a guard interval B 174. In some examples, the guard interval A 170 is a sequence of '0' bits having a length $L_a$, the effective training sequence 172 is a sequence of '0' and '1' bits having a length $L_e$, and the guard interval B 174 is a sequence of '0' bits having a length LB in which LB≥L.

The channel probing signal transmitted from the transmitter 142 passes through the multipath channel 146 and reaches the receiver 144. The received signal is a convolution of the channel probing signal and the channel response, contaminated by noise. The receiver 144 will use the received signal to estimate the channel response.

Figure 30:
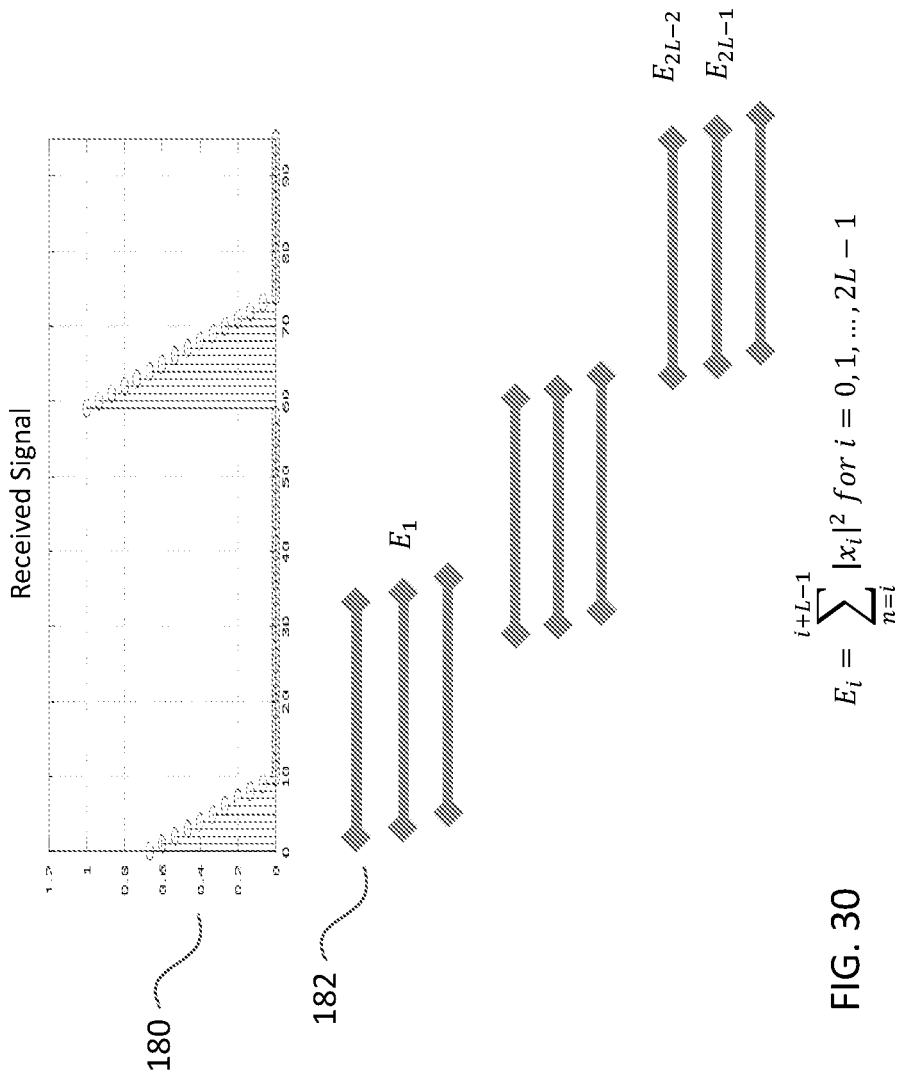
FIG. 30 is a diagram showing an energy detection synchronization process.

Referring to FIG. 30, upon receiving the channel probing signal, the receiver 144 determines a synchronization index using sliding window energy detection on the preamble 162 of the channel probing signal. A graph 180 shows an example signal received at the receiver 144. The sliding window energy detection method using a moving window 182 having a window size $L_w = 1_p + L$, in which $1_p$ is the length of a PPM symbol. We define $E_I$ as the average energy accumulated by the window starting from the i-th, $(i+L_w)$-th, $(i+2L_w)$-th, . . . , and $(i+(\gamma-1)L_w)$-th sample, in which $\gamma$ is the number of averaging windows, $i \in \{0, 1, 2, \ldots, L_w-1\}$. The synchronization index $i_s$ is the index i that maximizes the $E_i$, which can be written as follows:

$i_s = \text{argmax}_i E_i$. Here, the index i corresponds to the i-th sample in the received signal. After the synchronization index $i_s$ is determined, the other indices are determined using the synchronization index is as reference.

Figure 31:
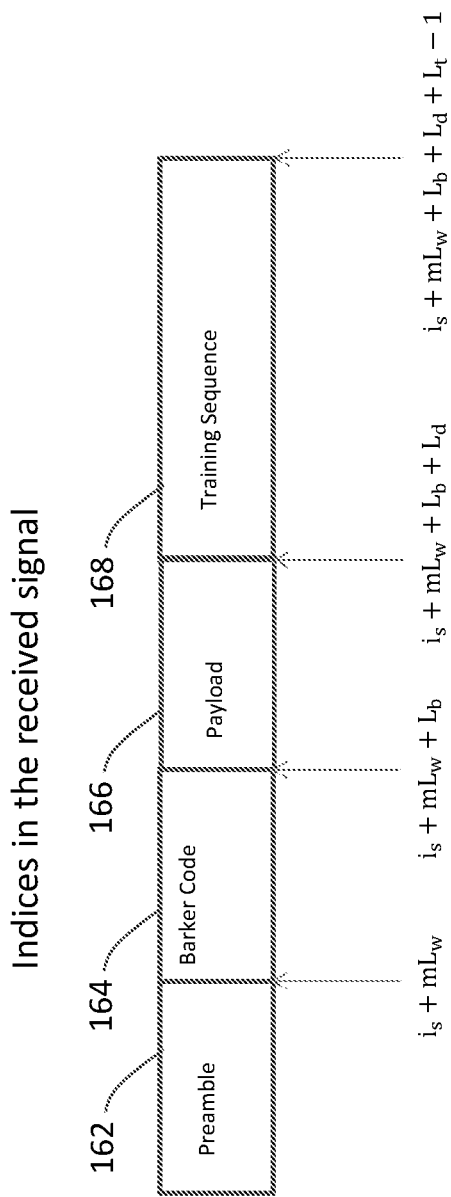
FIG. 31 is a diagram showing indices in a received signal.

Referring to FIG. 31, after obtaining the synchronization index $i_s$, the receiver 144 starts to detect the barker code 164 to confirm the synchronization. The receiver 144 demodulates a portion of the received signal from the index $i_s+mL_w$ to the index $i_s+mL_w+L_b-1$, and compares the demodulated signal portion with a pre-stored barker code sequence, in which $L_b$ is the length of the barker code 164, $m \in \{0,1,\ldots N\}$ with N being a search range set by the user. In some examples, N is set to be greater than the number of pulse position modulation symbols in the preamble 162. Once the demodulated signal matches the pre-stored barker code, the transmitter is assured that the receiver is in the channel probing phase, and the payload and the training sequence will follow the barker code in the received signal. Moreover, the transmitter knows that the matching index $i_s+mL_w$ is the position in the received signal where the barker code 164 begins, and the index $i_s+mL_w+L_b-1$ is the position where the barker code 164 ends. This information enables the receiver 144 to obtain information for estimating the channel response.

Because the payload 166 follows the barker code 164, the receiver 144 assumes that the payload 166 begins at the index $i_s+mL_w+L_b$. Because the payload 166 has a fixed length $L_d$, the receiver 144 demodulates the portion of the received channel probing signal from index $i_s+mL_w+L_b$ to index $i_s+mL_w+L_b+L_d-1$, and decodes the demodulated portion to obtain the index q of the training sequence. Here, the index q does not refer to the q-th sample in the received signal. Rather, there is a set of two or more training sequences that is known to both the transmitter 142 and the receiver 144, and the transmitter 142 can choose from any training sequence in the set. The index q indicates which one in the set of training sequences is selected by the transmitter 142.

The receiver 144 assumes that the training sequence starts at index $i_s+mL_w+L_b+L_d$ of the received signal, and will use the portion of the received signal from index $i_s+mL_w+L_b+L_d$ to index $i_s+mL_w+L_b+L_d+L_t-1$ to estimate the channel response, in which $L_t=L_e+L$. Let u denote the fraction of the received signal from index $i_s+mL_w+L_b+L_d$ to index $i_s+mL_w+L_b+L_d+L_t-1$. The receiver 142 converts u to the estimated channel response using a conversion matrix $C_q$ that corresponds to the index q obtained from the payload 166. This conversion can be written as:

$\widehat{CR} = C_q u$.

where $\widehat{CR}$ is the estimated channel response.

The conversion matrix $C_q$ can be constructed by the training sequence $s_q$ used by the receiver as follows:

$C_q = (T'T)^{-1}T'$ where T is the Toeplitz matrix generated by $s_q$, which is the effective training sequence used by the transmitter 142. The first column of the matrix T is $s_{qe}=[s_q; 0]$, in which 0 is the vector composed of L zeros. Referring to FIG. 32, the first row of the Toeplitz matrix T 190 is composed of all zeros except for the first element taken from $s_{qe}$. The matrix T 190 has dimensions $C_m \times c_n$ in which $c_m=L_e+L$ and $c_n=L_a+\tau+L$. The parameter $\tau$ is a compensation factor that needs to be greater than the maximum of synchronization mismatch in the previous step, i.e., the difference between the index in the received signal where the training sequence starts and index $i_s+mL_w+L_b+L_d$, which is the beginning of the training sequence 168 detected by the receiver 144.

Figure 33:
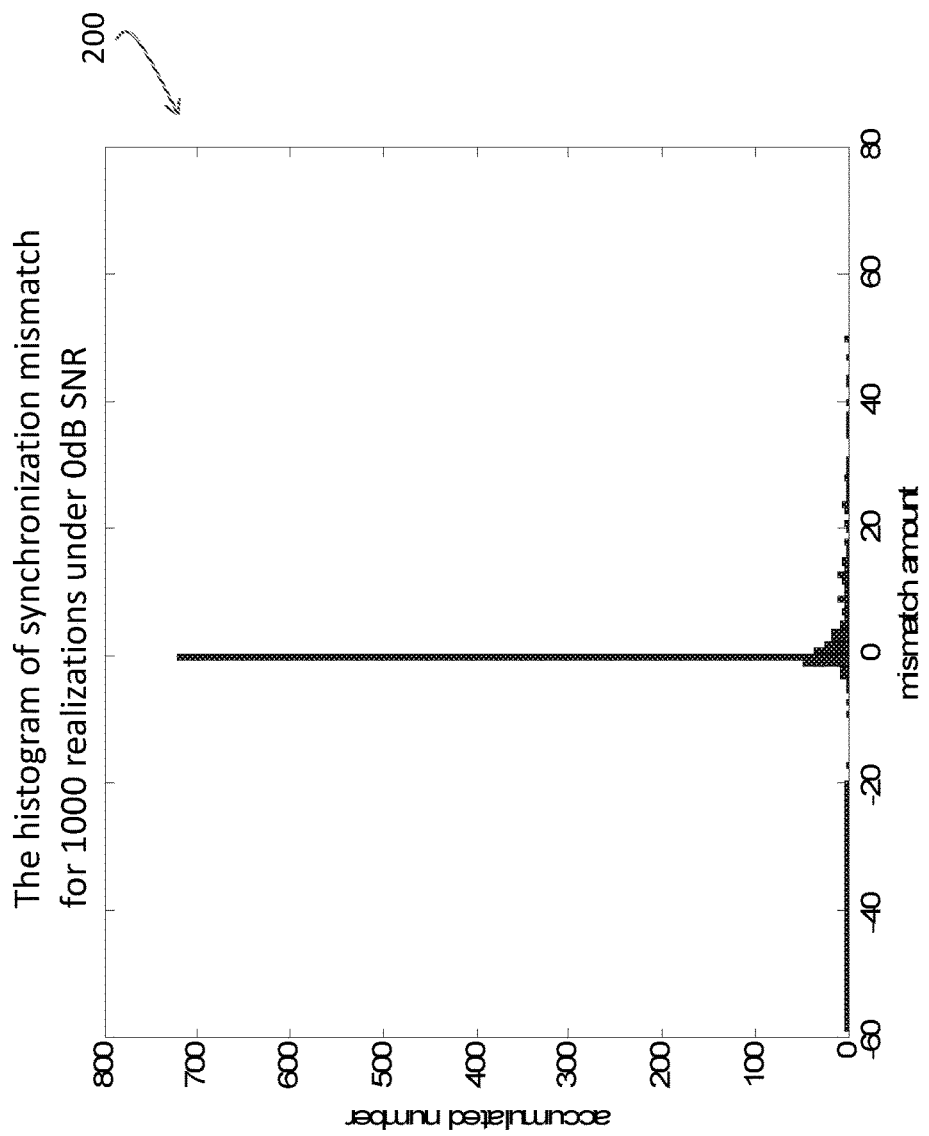
FIG. 33 is a histogram of synchronization mismatch.
Figure 34:
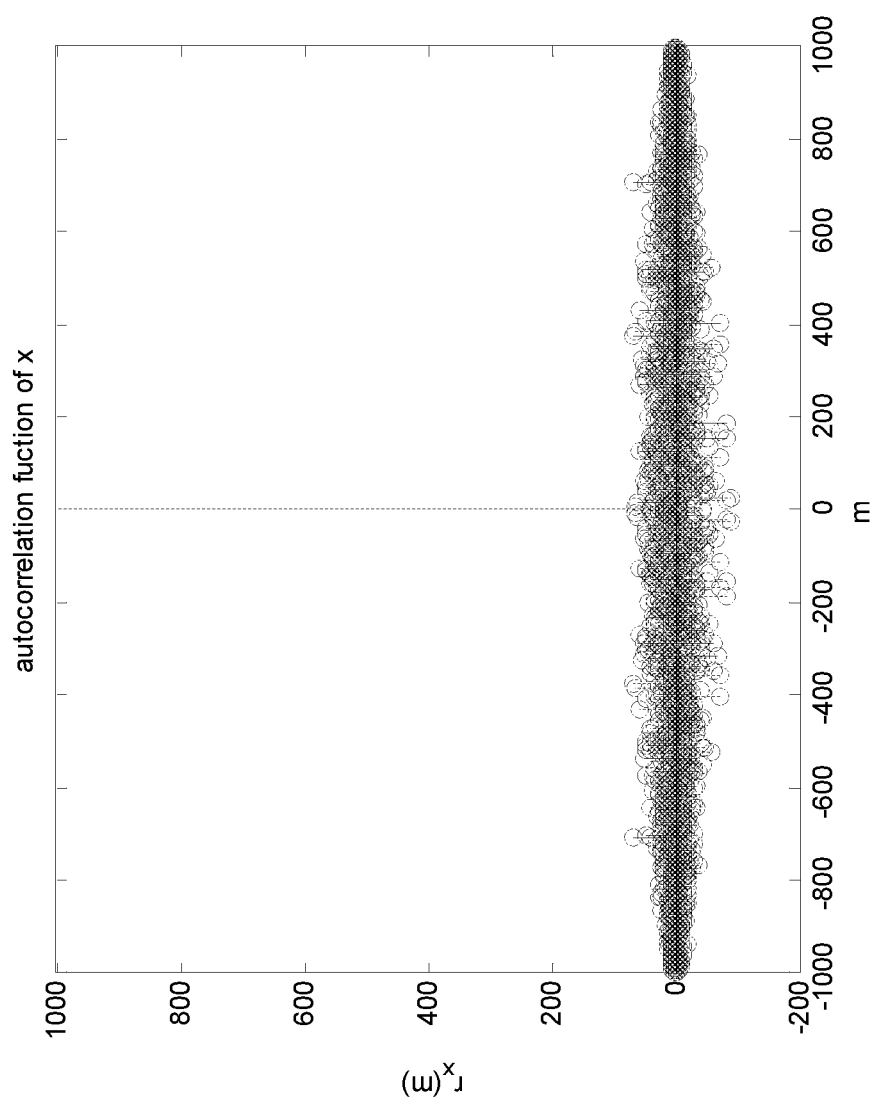
FIG. 34 is a graph of an autocorrelation function.

FIG. 33 is a graph 200 that shows an example synchronization mismatch histogram for 1000 realizations with SNR=0 dB and channel length L=200. The mismatch amount is small compared with the channel length and can be bounded by some specific value. Since larger $\tau$ takes up more system resource, the value of $\tau$ can be chosen as small as possible that can still bound the synchronization error.

It can be seen from $\widehat{CR}=C_q u$ and the dimension of the conversion matrix $C_q$ that the estimated channel response has a size larger than L, which is the size of the actual channel response. The reason why a longer channel response is estimated is that, due to the synchronization error, the estimated channel response is a shifted version of the real channel response. Estimating a longer channel response ensures that the effective channel response will be included in the estimation such that no significant tap is lost, which is important to the time reversal system that uses the multi-path channel as a matched filter to focus transmitted waveforms at the receiving device.

When the effective training sequence is specifically chosen, the channel response can be estimated more easily without using the conversion matrix $C_q$. For example, if the effective training sequence is a train of impulses separated by D in which D≥L, then the channel response can be simply estimated by averaging the windows of size D in the received signal. Let $v_i$ denote the fraction of the received signal from index $i_s+mL_w+L_b+L_d+iD$ to index $i_s+mL_w+L_b+L_d+iD+D-1$, then the estimated channel response can be written as $$\widetilde{CR} = \sum_0^K \frac{v_i}{K+1}$$

where $K=(L_e+L)/D$ is the number of windows. In some examples, if $L_e+L$ is large enough, K is large enough to provide sufficient accuracy for the estimated channel response $\widetilde{CR}$.

Correlation Based Channel Probing Handshaking

The following describes a correlation based handshaking method for channel probing. In this method, a single sequence is used for the purpose of both time synchronization and channel response estimation.

The transmitter 142 transmits a pseudo random (PN) sequence x to the receiver 144 through the multipath channel 146. The sequence x can be, e.g., a train of discrete random variables having probability mass function (pmf) shown in the equation below:

$$X(i) = \begin{cases} 1 & \text{with probality } 0.5 \\ -1 & \text{with probality } 0.5 \end{cases}, i = 1, 2, \ldots N$$

The autocorrelation function of the pseudo random sequence x is defined in the following equation:

$$r_x(m) = \sum_{i=0}^{N-1} x(i)x(i+m)$$

One important feature of a pseudo random code used here is that the autocorrelation function of a long pseudo random code tends to be a delta function. For example, referring to FIG. 34, considering the autocorrelation function of a pseudo random code having a length of 1000, the autocorrelation function has a very high value at m=0 while being significantly suppressed at other places.

In the following description, several notations are used. L: the length of channel response; N: the length of pseudo random code; and α: the parameter related to the threshold for channel probing.

The received signal y is the convolution result of the pseudo random code x and channel h, as shown in the following equation $$y(n) = \sum_{i=0}^{L} h(i)x(n-i).$$

The cross correlation function $r_{yx}(m)$ defined in the equation below is equivalent to the convolution of autocorrelation of the pseudo random code x and the channel h.

$$r_{yx}(n) = \sum_{i=0}^{N} x(i)y(i+n) = \sum_{i=0}^{L} h(i)r_x(n-i)$$

The following describes an algorithm for synchronization by correlation. The transmitter computes the cross correlation $r_{yx}(m)$, and finds its maximum amplitude $$corr_{max} = \max |r_{yx}(m)|$$

Based on $corr_{max}$, the transmitter finds the synchronization index $i_s$ of the received signal y as follows $$i_s = 1;$$

$$\text{WHILE} |r_{yx}(i_s)| < \alpha \times corr_{max}$$

$$i_s \Leftarrow i_s + 1$$

The parameter α can be selected by experiments, and range from 0 to 1. For example, according to an ultra-wide band channel model used in the simulation, the parameter a is chosen to be around 0.2. After obtaining the index $i_s$, the estimated channel response $\tilde{h}$ can be determined by truncating the cross correlation function $r_{yx}(m)$ as follows:

$$\tilde{h} = r_{yx}(i_s:i_s+L-1)$$

In an exemplary embodiment, the receiver 144 may include a circuit used to capture the channel state information (CSI) for the wireless channel 146. The channel state information may be used to estimate the wireless channel response for each of the subcarriers in a wireless signal. The channel state information may be a complex vector, comprising both amplitude and phase information related to the wireless channel. In some embodiments, only the channel amplitude information may be determined and/or exported and/or processed. In some embodiments, only the channel phase information may be determined and/or exported and/or processed. In preferred embodiments, both the channel amplitude and phase information may be determined and/or exported and/or processed as part of an event monitoring system application. In embodiments, channel state information signals may be processed in a processor such as a microprocessor and/or a DSP, a computer, an FPGA, an ASIC, and the like, and may be processed locally, on resources integrated with, or in close proximity to, the chip or system that generates the channel state information signals, and/or the channel state information signals may be processed remotely at a distance computing device that may be configured for performing signal processing, and/or the channel state information signals may be processed using at least some cloud resources.

In embodiments, the channel state information may be determined by a standardized mechanism, such as exists for the 802.11 signaling protocol. In some embodiments, the channel state information may be determined by monitoring and recording parameters in the radio receiver and/or by monitoring the probing signal, or training sequence, or training preamble passed between a receiver and a transmitter. In the laboratory demonstration, the circuit used to capture the channel state information included a USRP (National Instruments' Universal Software Radio Peripheral platform) and/or an Intel 5300 chip.

In embodiments, certain portions of a wireless protocol packet structure may be used to estimate channel state information and/or the channel frequency response. In an exemplary 802.11 network, long preambles that follow short preambles may be used to determine the channel state information. Exemplary 802.11 communication systems may utilize orthogonal frequency division multiplexing (OFDM). Each orthogonal frequency-division multiplexing channel may include multiple sub-carriers. An orthogonal frequency-division multiplexing channel may include more than 20 subcarriers, more than 30 subcarriers, more than 40 subcarriers, 48 subcarriers, 56 subcarriers, 64 subcarriers, or 114 subcarriers, etc. In embodiments, some of the subcarriers in an orthogonal frequency-division multiplexing signal may be null subcarriers or may be pilot subcarriers. In embodiments, only some of the subcarriers in an orthogonal frequency-division multiplexing symbol may be data subcarriers.

In embodiments, a circuit may provide channel state information for some or all of the subcarriers. For example, in some exemplary embodiments, the Intel 5300 chip and/or USRP may export the channel state information for 30 subcarriers in the orthogonal frequency-division multiplexing channel. In embodiments, further processing of the channel state information may be performed to mitigate variations in the channel state information owing to imperfect timing and/or frequency synchronization. In embodiments, the channel state information from one sub-band may be arranged as a vector and may be referred to as an intra-band fingerprint. In some embodiments, the channel state information from one sub-band may the average of multiple channel state information determinations and some determinations may be trimmed or discarded. In embodiments, a sub-band channel state information for a given channel may be measured and/or determined once, twice, ten times, 30 times, 50 times, 100 times and the like. In embodiments, some or all of the sub-band channel state information may be used to form an intra-band fingerprint.

The example provided above, where the channel state information is reported for a certain number of subcarriers, is merely an example and is not meant to be limiting in any way. The channel state information from any number of subcarriers may be utilized in the event monitoring systems described herein. Also, the number of channel measurements that may be performed, or the number of WiFi packets that are exchanged in order to determine channel state information and intra-band fingerprints, are exemplary and are not meant to be limiting in any way. For example, an event monitoring system that monitors events may constantly send probe signals that can be used to determine estimated channel responses and events.

In embodiments, multiple different center frequency, frequency bandwidth, and/or antenna intra-band fingerprints may be combined and/or concatenated into a composite or inter-band fingerprint. In embodiments, the inter-band finger print may form a composite channel response. This composite channel response may be used to determine the events occurring in a venue. In embodiments, the accuracy of an event monitoring system using a composite channel response may be higher than the accuracy achieved using a single intra-band fingerprint.

In an exemplary embodiment, two long preambles in an 802.11 frame can be used to determine the channel state information for a wireless channel between wireless devices (e.g., the transmitter 142 and the receiver 144). For example, one of the wireless devices may be a wireless router/access point and may support a wireless hotspot (e.g., at a home, or at a business). The wireless router/access point may be a standard device that has not been specifically modified and/or arranged to work with the systems and methods described herein. In other words, the systems and methods described herein can take advantage of such existing wireless devices and their methodologies to determine event information. In this exemplary embodiment, when the second wireless device (e.g., a computer, a smart phone, a tablet, etc.) is in range of the router/access point, the second wireless device may receive WiFi signals from the router/access point and may process the long preambles included in the WiFi signals to determine an environment specific signature between itself and the router/access point. In some implementations, the second wireless device may include software and/or firmware for enabling the second wireless device to operate with the system. In some implementations, the second wireless device is not joined to the hotspot. Rather, the second wireless device may be a passive device that can receive the standard preamble information from the router/access point. In this way, the second wireless device may be referred to as a "sniffer." In embodiments, the two long preambles are sent in one frame, e.g., for each orthogonal frequency-division multiplexing channel. In embodiments, the orthogonal frequency-division multiplexing channels can have bandwidths of, e.g., 20 MHz or 40 MHz.

As described above, the system can determine channel state information and associate the channel state information with various events. For example, in one instance, the second wireless device can store channel state information and associate it with a particular event (e.g., "door open and window closed"). When the particular event occurs at a later time, the second wireless device may provide an indication (e.g., an alert). In some implementations, when the second wireless device has access to the internet (e.g., by joining the WiFi network, the second wireless device may upload acquired environment information (e.g., channel state information associated with events). The environment information may be uploaded to a resource (e.g., a cloud-based resource) such as one or more servers, hard drives, storage units, and/or databases that are configured to store such environment information.

In some implementations, the channel state information associated with various events can be uploaded to the resource (e.g., a database in the cloud), and the information can be used to associate channel state information specific signatures with known events. In some examples, the device that trains the event classifiers may have a display that presents a user interface to show a floor plan with objects (e.g., doors and windows) associated with events. When the user taps on a door, the door may toggle between a closed position and an open position. Suppose the door is in the open position. The user may tap on a button to start a training session so that the system starts to collect channel state information and train the event classifier to recognize parameters associated with the "door open" event. After the training for the "door open" event is completed, the user may tap on the door to toggle the door to the closed position, and then tap on the button to start a training session so that the system starts to collect channel state information and train the event classifier to recognize parameters associated with the "door closed" event. The user can initiate training of the classifier for other events in a similar manner.

Each of the transmitter(s) and the receiver(s) in an event monitoring system can include one or more processors and one or more computer-readable mediums (e.g., RAM, ROM, SDRAM, hard disk, optical disk, and flash memory). The one or more processors can perform various calculations described above. The calculations can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire and fiber optics.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention. For example, the frame structure of the channel probing signal, the format for the preamble 162, barker code 164, payload 166, and the training sequence 168 can be different from those described above. The transmitter 142 and the receiver 144 can include more components that are not shown in the figures. For example, standard components such as analog-to-digital converters, digital-to-analog converters, and power amplifiers have been omitted from the figures.

Although in the examples above we show one transmitter and one receiver, there can be multiple transmitters and multiple receivers. The transmitter or receiver of the monitoring system can be either at fixed locations or be mobile. The transmitter or receiver of the monitoring system can have single antenna or multiple antennas. The time reversal monitoring system can monitor human as well as animals such as a cat, a dog, a horse, or a chicken, etc. When a special event is detected by the monitoring system, the system can give alarm signals via, e.g., audio, video, short message service, or e-mail, etc. When the system sends out the alarms signals, it can use, e.g., 3G, 4G-LTE, 5G, WiFi, etc. Although in the examples above, we show that the channel state information is obtained via WiFi, it can also be signals by LTE/HSPA macro cell, pico cell, femto cell, hotspot, etc. The bandwidth of the monitoring system can be, e.g., 20 MHz, or less than 20 MHz by concatenating CSIs from different antennas, in different frequency subcarriers/bands/channels, at different time instances, etc. The time reversal monitoring system can be standalone, used to assist other monitoring systems to reduce false alarm, or used to assist other monitoring systems to improve sensitivity, etc. The time reversal monitoring system can be programmable.

In some examples, a customized transmitter and receiver can be used in channel sounding to obtain the channel impulse response (time domain). In some examples, commercial WiFi devices can be used for channel sounding, and the channel estimation output can be read as the channel frequency response. The receiver can be a commercial WiFi device that estimates the channel, and the channel frequency response is extracted from the receiver device. A computer performs the computations related to training the classifier and calculated the equations due to the limited data processing capability of the commercial WiFi device. In some examples, if the WiFi receiver has a power data processor, the computations related to training the classifier can be performed by the receiver and all equations calculated at the receiver.

The sampling frequency for the channel state information h[1], h[2], h[L], etc., can be chosen according to the system bandwidth. For example, at least equal the system bandwidth (double side). A higher sampling frequency is better. For the number of taps L, the higher the number the better. In some examples, we can gradually increase L so that the collected channel has the most energy. For example, if L=30 and L=50 both result in similar channel state information, we can use L=30.

The format of the probing signal can be different from those shown in FIGS. 27 and 29, and the handshaking process can be different from those described above. For example, if commercial WiFi devices are used to transmit and receive wireless signals, the handshaking process will follow the WiFi protocol.

Figure 38:
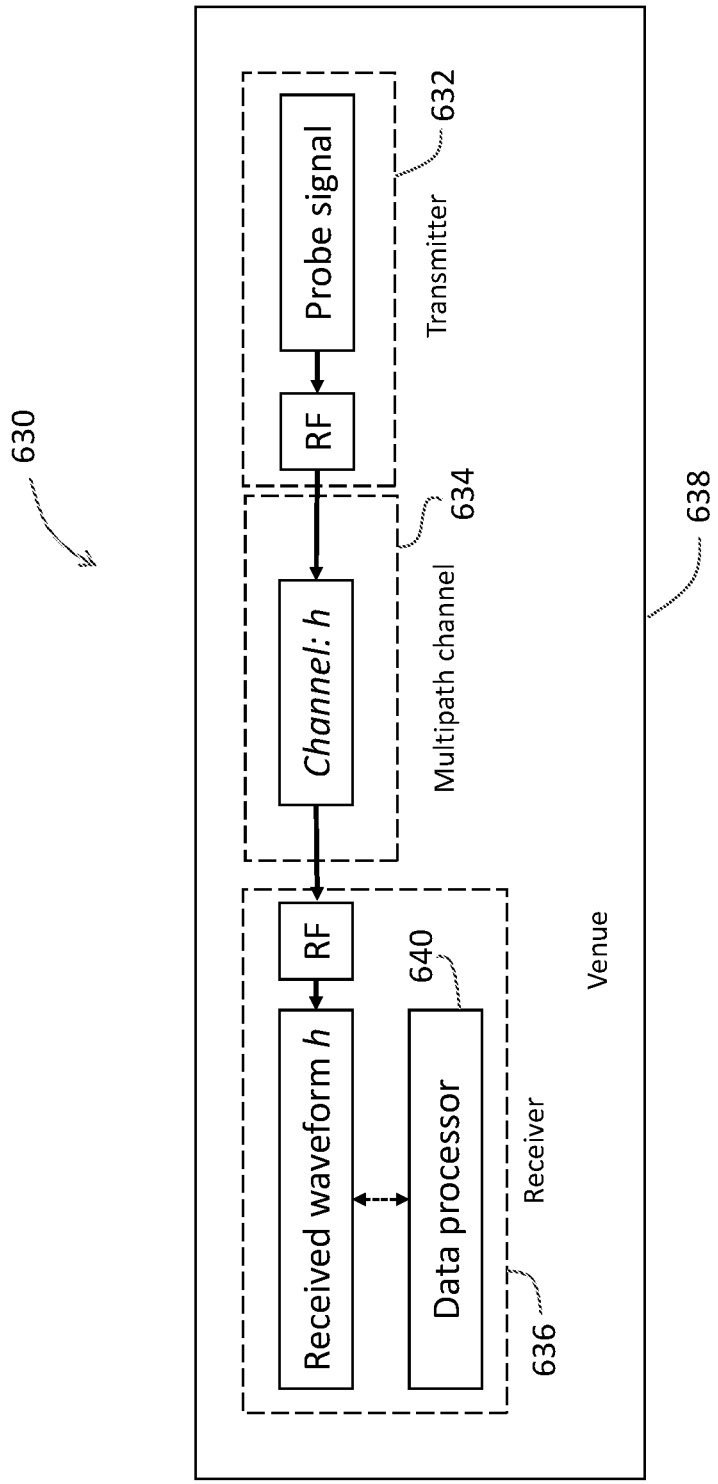
FIGS. 38-40 are diagrams showing implementations of an event detection system or a human motion detection system.

The event detection system or the human motion detection system can be implemented in many ways. For example, referring to FIG. 38, an event detection system or a human motion detection system 630 can include a transmitter 632 and a receiver 636 that are placed in a venue 638, in which the transmitter 632 sends wireless signals to the receiver 636 through a multipath channel 634 that is influenced by events or human motion to be detected by the system 630. In this example, the receiver 636 includes a data processor 640 for performing various data processing steps described above.

Figure 39:
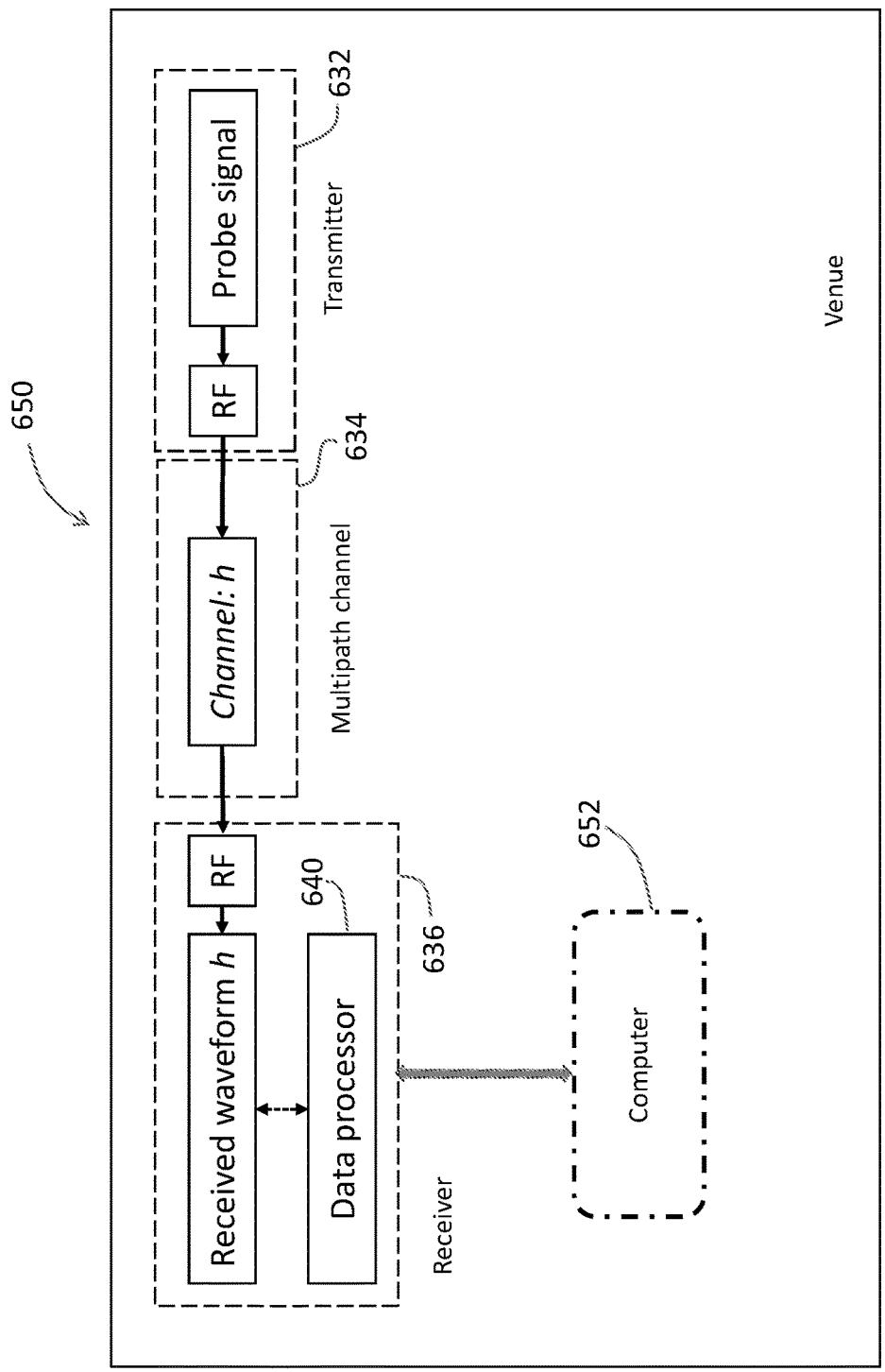

In some implementations, referring to FIG. 39, an event detection system or a human motion detection system 650 can include a transmitter 632, a receiver 636, and a computer 652. The receiver 636 includes a data processor 640 that performs basic data processing, while most of the complex computations are performed by the computer 652 that communicates with the receiver 636.

Figure 40:
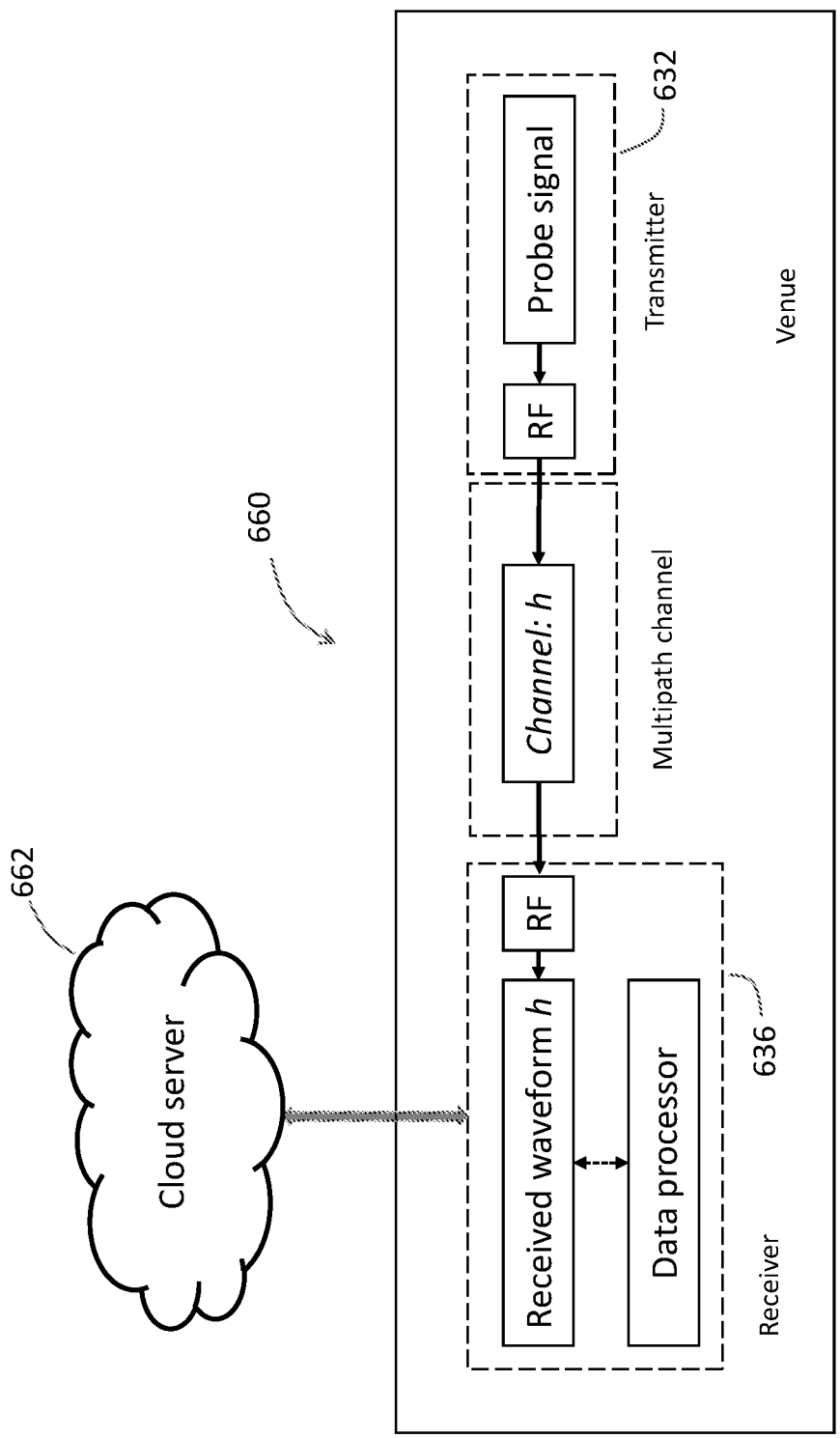

In some implementations, referring to FIG. 40, an event detection system or a human motion detection system 660 can include a transmitter 632 and a receiver 636, in which the receiver 636 includes a data processor 640 that performs basic data processing. The receiver 636 communicates with a cloud server 662, which performs most of the complex computations.

Accordingly, other embodiments are within the scope of the following claims.

What is claimed is:

1. An apparatus for detecting a plurality of events, comprising:
    a processor;
    a storage device storing a set of instructions that when executed by the processor cause the processor to:
        train at least one classifier configured to classify channel state information and detect an event based on the classification of the channel state information, in which the training of the at least one classifier includes:
            for each of a plurality of known events to be detected by the apparatus, during a time period in which the known event occurs in a venue, obtain at least one set of training channel state information (CSI) of a wireless multipath channel between a wireless transmitter and a wireless receiver in the venue, in which the at least one set of training channel state information is derived from at least one first probing signal sent from the wireless transmitter through the wireless multipath channel to the wireless receiver, and train the at least one classifier based on the plurality of known events and the at least one set of training channel state information associated with each of the plurality of events;

during a period when a current event is occurring, receive a set of measured channel state information of a wireless multipath channel between the wireless transmitter and the wireless receiver, in which the set of measured channel state information is derived from at least one second probing signal sent from the wireless transmitter through a wireless multipath channel and received at the wireless receiver; and apply the classifier to at least one of the set of measured channel state information or data derived from the set of measured channel state information to determine which of the known events matches the current event;

wherein each of the wireless transmitter and the wireless receiver has at least one antenna, wherein each set of training channel state information is derived from one of the at least one first probing signal sent through a wireless multipath channel from one of the at least one wireless transmitter antenna to one of the at least one wireless receiver antenna during a time period in which one of the known events occurs, and wherein each set of measured channel state information is derived from one of the at least one second probing signal sent through a wireless multipath channel from one of the at least one wireless transmitter antenna to one of the at least one wireless receiver antenna.

2. The apparatus of claim 1 in which at least one of:
(a) the known events comprise at least one of a door closed event, a door open event, a window closed event, a window open event, a room with no human present event, or a room with human present event,
(b) at least one of the set of training channel state information or the set of measured channel state information comprises at least one of a channel impulse response or a channel frequency response associated with the wireless multipath channel between the wireless transmitter and the wireless receiver, or
(c) the each of the at least one first probing signal and the at least one second probing signal comprises at least one of an impulse signal or a pseudo-random sequence.

3. The apparatus of claim 1 in which training the at least one classifier comprises using principal component analysis to train the at least one classifier based on the plurality of known events and the at least one set of training channel state information associated with each of the plurality of known events.

4. The apparatus of claim 1 in which at least one of:
(a) the storage device further stores instructions that when executed by the processor cause the processor to:
estimate a particular linear phase offset associated with more than one component of a particular channel state information due to at least one of a sampling frequency offset (SFO) or a symbol timing offset (STO),
estimate a particular initial phase offset associated with the more than one components of the particular channel state information due to at least one of a carrier frequency offset (CFO) or a common phase offset (CPO), and
generate a particular corrected channel state information based on the particular channel state information, the estimated particular linear phase offset, and the estimated particular initial phase offset,
(b) a linear phase offset associated with a channel state information is estimated based on component-wise product of the channel state information and a shifted version of the channel state information, or
(c) an initial phase offset associated with a channel state information is estimated based on the angle of the average of the complex-valued channel state information components on each subcarrier.

5. The apparatus of claim 1 in which the storage device further stores instructions that when executed by the processor cause the processor to at least one of:
(a) reduce or eliminate phase distortion in the set of training channel state information prior to using the set of training channel state information to train the at least one classifier, or
(b) reduce or eliminate phase distortion in the set of measured channel state information prior to applying the classifier to at least one of the set of measured channel state information or data derived from the set of measured channel state information.

6. The apparatus of claim 1 in which each of the at least one classifier is configured to compute, for each of some of the sets of training channel state information, a similarity value representing a similarity between the set of measured channel state information and the set of training channel state information, and
wherein applying the classifier to at least one of the set of measured channel state information or data derived from the set of measured channel state information comprises identifying one of the sets of training channel state information that is most similar to the set of measured channel state information, and identifying the known event associated with the identified set of training channel state information.

7. The apparatus of claim 6 in which computing the similarity value between the set of measured channel state information and the set of training channel state information comprises computing an inner product of a first vector associated with the set of measured channel state information and a second vector associated with the set of training channel state information.

8. The apparatus of claim 6 in which the storage device further stores instructions that when executed by the processor cause the processor to compute similarity values, each similarity value representing a similarity between one of the sets of training channel state information and the other sets of training channel state information,
wherein a parameter derived from similarities between the one of the sets of training channel state information and the other sets of training channel state information is modeled with a statistical distribution, and
wherein the storage device further stores instructions that when executed by the processor cause the processor to estimate a scale parameter and a location parameter of the statistical distribution of the parameter derived from the similarities of the one of the sets of training channel state information and the other sets of training channel state information.

9. The apparatus of claim 1 in which at least one of:
(a) the storage device further stores instructions that when executed by the processor cause the processor to:
apply a sliding timing window to a series of sets of measured channel state information, in which the timing window is divided into a plurality of time periods and each time period corresponds to one of the sets of measured channel state information;
apply the classifier to each of the plurality of sets of measured channel state information having a timestamp within the timing window to identify one of the plurality of known events for each of the time periods of the timing window, and
detect the current event based on the known events associated with the time periods of the timing window, or
(b) detecting the current event comprises determining the known event that occurs within a sliding timing window that is divided into a plurality of time periods for a largest number of time periods.

10. The apparatus of claim 1 in which the storage device further stores instructions that when executed by the processor cause the processor to:
apply a sliding timing window to a series of sets of measured channel state information, in which the timing window is divided into a plurality of time periods and each time period corresponds to one of the sets of measured channel state information,
determine a variance of the measured channel state information having timestamps within the timing window, and
detect human motion based on the variance of the measured channel state information.

11. The apparatus of claim 10 in which determining the variance of the measured channel state information comprises:
selecting a particular set of measured channel state information having a timestamp within the timing window,
compute, for each of other sets of measured channel state information having a timestamp within the timing window, a similarity value representing a similarity between the particular set of measured channel state information and the other set of measured channel state information, and
determine the variance of the measured channel state information based on the similarity values.

12. The apparatus of claim 10 in which at least one of:
(a) at least one of the transmitter or the receiver has two or more antennas, each pair of transmitter antenna and receiver antenna form a link between the transmitter and the receiver, at least two links are formed between the transmitter and the receiver,
wherein determining the variance of the measured channel state information comprises determining an average of similarity values associated with different links for each time period in the timing window, and determining a variance of the averaged similarity values, or
(b) detecting human motion comprises detecting human motion when the variance of the measured channel state information having timestamps within the timing window is greater than a threshold.

13. The apparatus of claim 1 in which at least one of:
(a) the at least one classifier comprises a statistics based classifier, and training the at least one classifier comprises:
for each link between each transmitter antenna and each receiver antenna,
receiving a plurality of sets of training channel state information associated with a particular known event, and
identifying a representative set of training channel state information that is representative of the plurality of sets of training channel state information associated with the particular known event; and
training the at least one classifier using the representative sets of training channel state information, or
(b) training the at least one classifier comprises:
computing a plurality of intra-class time-reversal resonating strength parameter values, each of the intra-class time-reversal resonating strength parameter values being computed based on a representative set of channel state information associated with a particular known event and the other sets of channel state information associated with the particular known event, and
training the at least one classifier based on the plurality of intra-class time-reversal resonating strength parameter values.

14. The apparatus of claim 1 in which at least one of:
(a) training the at least one classifier comprises:
compensating phase offsets in the sets of training channel state information associated with each known event prior to identifying a representative set of training channel state information associated with the known event;
estimating location and scale parameters of a parameter representing (1−TR) or TR associated with the known event, in which TR represents intra-class time-reversal resonating strength parameter values computed based on the representative set of training channel state information associated with the known event; and
establishing a training database that includes information about, for each link between a transmitter antenna and a receiver antenna, for each known event to be detected, the location and scale parameters of the parameter representing (1−TR) or TR, and the representative set of channel state information associated with the known event and the link; or
(b) applying the classifier to at least one of the set of measured channel state information or data derived from the set of measured channel state information comprises:
compensating a phase offset, if any, of each set of measured channel state information,
for each link between each transmitter antenna and each receiver antenna, for each known event,
computing a second set of intra-class time-reversal resonating strength parameter values, each of the intra-class time-reversal resonating strength parameter values being computed based on the set of measured channel state information and a representative set of channel state information associated with the link and the known event, and
determining which of the known events matches the current event based on information derived from the second set of intra-class time-reversal resonating strength parameter values.

15. The apparatus of claim 1 in which the storage device further stores instructions that when executed by the processor cause the processor to perform at least one of:

(a) update the at least one classifier based on the set of measured channel state information and information about which of the known events matches the current event, or (b) update a storage based on the set of measured channel state information, a set of auxiliary information associated with the set of measured channel state information, an output associated with the at least one classifier, and information about which of the known events matches the current event.

16. A method for monitoring events using WiFi signals, the method comprising:

for each of a plurality of known events that may occur in a venue, transmitting at least one WiFi signal from a transmitter to a receiver in the venue during at least one time period when the known event occurs, wherein the at least one WiFi signal complies with IEEE 802.11 standard, and each of the transmitter and the receiver has at least one antenna;

for each WiFi signal received at the receiver, estimating a set of channel state information from the WiFi signal, in which the set of channel state information is associated with the known event that is associated with the WiFi signal, wherein the set of channel state information is derived from the WiFi signal sent from one of the at least one transmitter antenna to one of the at least one receiver antenna during a time period when the known event occurs;

training, using principal component analysis, a classifier based on the known events and the sets of channel state information associated with the known events; and during a monitoring phase, transmitting at least one WiFi signal from the transmitter to the receiver during a second time period, determining a second set of channel state information from one of the at least one WiFi signal received at the receiver during the second time period, wherein the second set of channel state information is derived from the WiFi signal sent from one of the at least one transmitter antenna to one of the at least one receiver antenna during the second time period, and applying the classifier to the second set of channel state information or data derived from the second set of channel state information to determine which of the known events occurred during the second time period.

17. The method of claim 16, in which training, using principal component analysis, a classifier comprises:

compensating phase offsets in the sets of channel state information;

generating feature vectors based on the sets of channel state information;

using principle component analysis to generate new feature vectors having a reduce number of dimensions; and using a support vector machine (SVM) to train a classifier that maps an input feature vector to one of the plurality of known events.

18. The method of claim 17, in which applying the classifier to at least one of the second set of channel state information or data derived from the second set of channel state information to determine which of the known events occurred during the second time period comprises:

compensating a phase offset in the second set of channel state information;

generating a second feature vector based on the second set of channel state information;

applying principal component analysis to the second feature vector to generate a third feature vector having a reduced number of dimensions; and applying the support vector machine to the third feature vector to generate an output having information about which of the known events occurred during the second time period.

19. The method of claim 16, wherein the human motion is detected by at least one of (a) comparing a noise level with a threshold, (b) tracking antenna correlation, or (c) tracking a change of time interval between two taps in a channel impulse response.

* * * * *